(12) United States Patent
Zheng

(10) Patent No.: US 8,027,321 B2
(45) Date of Patent: Sep. 27, 2011

(54) METHOD AND SYSTEM FOR INTERCONNECTING DIGITAL SUBSCRIBER LINE NETWORK AND RADIO COMMUNICATION NETWORK

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 708 days.

(21) Appl. No.: 12/132,360

(22) Filed: Jun. 3, 2008

(65) Prior Publication Data

US 2009/0003296 A1 Jan. 1, 2009

Related U.S. Application Data

(63) Continuation of application No. PCT/CN2006/003265, filed on Dec. 4, 2006.

(30) Foreign Application Priority Data

Dec. 3, 2005 (CN) .......................... 2005 1 0126663
Dec. 9, 2005 (CN) .......................... 2005 1 0129382

(51) Int. Cl.
*H04W 4/00* (2009.01)
(52) U.S. Cl. ......... 370/338; 370/328; 370/401; 370/352
(58) Field of Classification Search .................. 370/338, 370/328, 329, 401, 352
See application file for complete search history.

(56) References Cited

U.S. PATENT DOCUMENTS

| | | | |
|---|---|---|---|
| 7,570,616 B2 * | 8/2009 | Henrikson | 370/331 |
| 2002/0023160 A1 | 2/2002 | Garrett et al. | |
| 2002/0191635 A1 * | 12/2002 | Chow et al. | 370/463 |
| 2003/0115610 A1 * | 6/2003 | Cho | 725/111 |
| 2004/0143652 A1 * | 7/2004 | Grannan et al. | 709/223 |
| 2004/0248594 A1 * | 12/2004 | Wren, III | 455/465 |
| 2005/0233749 A1 * | 10/2005 | Karaoguz et al. | 455/442 |
| 2006/0003796 A1 * | 1/2006 | Vireday et al. | 455/550.1 |
| 2007/0259660 A1 * | 11/2007 | Stein et al. | 455/426.1 |
| 2007/0298760 A1 * | 12/2007 | Leis et al. | 455/404.1 |

FOREIGN PATENT DOCUMENTS

| | | |
|---|---|---|
| CN | 1589041 A | 3/2005 |
| JP | 2004072198 A | 3/2004 |

OTHER PUBLICATIONS

International Search Report for International Application No. PCT/CN2006/0003265, dated Mar. 15, 2007, with English translation thereof.

* cited by examiner

Primary Examiner — Ricky Ngo
Assistant Examiner — Rasheed Gidado

(57) ABSTRACT

A method and system for interconnecting a DSL network and a radio communication network are disclosed. The DSL network carries data transmitted in the radio communication network so that the radio communication network and the DSL network are interconnected. The xDSL is adopted to perform the base station transmission. The scheme may function as a radio extension of the wire access of the DSL network and is suitable to fixed wireless, nomadic connectivity, laptop and mobile access applications.

19 Claims, 41 Drawing Sheets

METHOD AND SYSTEM FOR INTERCONNECTING DIGITAL SUBSCRIBER LINE NETWORK AND RADIO COMMUNICATION NETWORK

CROSS-REFERENCE TO RELATED APPLICATIONS

This application is a continuation of International Application No. PCT/CN2006/003265, filed Dec. 4, 2006. This application claims the benefit of Chinese Application No. 200510126663.9, filed Dec. 3, 2005, and Chinese Application No. 200510129382.9, filed Dec. 9, 2005. The disclosure of the above applications are incorporated herein by reference.

FIELD

The present disclosure relates to Digital Subscriber Line (DSL) network and radio communication network technologies and to methods and systems for interconnecting a DSL network and a radio communication network.

BACKGROUND

The statements in this section merely provide background information related to the present disclosure and may not constitute prior art.

The 3$^{rd}$ generation (3G) radio communication network and 2$^{nd}$ generation (2G) radio communication network employ similar structures, as shown in FIG. 1. A 3G or 2G radio communication network includes a Radio Access Network (RAN) and a Core Network (CN). The RAN is adapted to perform all functions related to radio communications while the CN is adapted to process all voice calls and data connections within the radio communication system and the switching and routing to an external network. The CN can be logically divided into a Circuit Switched (CS) Domain and a Packet Switched (PS) Domain. The RAN, CN and Mobile Stations (MS) form a complete 3G or 2G radio communication network.

The RAN usually includes Base Stations (BS) and Base Station Controllers (BSCs). The BS is called Base Transceiver Station (BTS) in the Global System for Mobile communications (GSM), General Packet Radio Service (GPRS), IS-95, and Code Division Multiple Access (CDMA) 2000 system. The BS is called Node B in Wideband CDMA (WCDMA) and Time Division-Synchronous Code Division Multiple Access (TD-SCDMA) system. The BSC is called Radio Network Controller (RNC) in the WCDMA system. The CDMA2000 also includes a logical entity Packet Control Function (PCF) between the BSC and the Packet Data Serving Node (PDSN), the PCF is used for packet data service support and can be set up in combination with the BSC as a part of the RAN or as an independent entity.

In the Worldwide Interoperability for Microwave Access (WiMAX) network defined by Standard 802.16, the RAN is called Access Service Network (ASN); the CN is called Connectivity Service Network (CSN), and the architecture of the WiMAX network is shown in FIG. 2. In FIG. 2, the BS can be connected to the CSN via an ASN Gateway (ASN-GW), the BS and the ASN-GW can be set up in a same entity physically or be set up separately; or the BS can be divided into two elements, BTS and BSC, as in the 3G or 2G network.

The networks described above are all radio communication networks, and a brief description on DSL network is given as follows.

The DSL network architecture is evolving from PPP over ATM to Ethernet aggregation and connectivity based IP QoS-enabling architecture, and the architecture of the DSL network in such technology background is shown in FIG. 3.

With reference to FIG. 3, T is a reference point between a Terminal Equipment (TE) in a Customer Premises Network (CPN) and a DSL MOdulator & DEModulator (Modem). U is a reference point between the DSL Modem and a DSL Access Multiplexer (DSLAM) of an access point. In the Access Network, there is an Aggregation Network between the DSLAM and an edge node of DSL network. The edge node of the DSL network may be a Broadband Remote Access Server (BRAS) or a Broad Network Gateway (BNG) or an Edge Router (ER). In FIG. 3, the edge node is a BRAS. V is an Ethernet Aggregation reference point between the DSLAM and the BRAS in the access network. A10 is a reference point between the access network and the Service Provider (SP) and A10 can be used for connecting Application Service Provider (ASP) to a Network Service Provider (NSP) with access network or for connecting the NSP to a visiting access network. The CPN network is connected to the access network with DSL access technique.

At present, the interconnection of the 3G or 2G or WiMAX based radio communication network and the DSL network is a branch of Fixed-Mobile Convergence (FMC) and a goal waiting to be made.

Furthermore, 2G or 2.5G or 3G network adopts E1 or T1 technology for BS transmission with reference to FIG. 42, which is a schematic diagram of E1 networking at the Iub interface of existing WCDMA. WCDMA R99 employs Asynchronous Transfer Mode (ATM) transmission on the Iub interface between the Node B and the RNC. The ATM transmission can be carried by Time Division Multiplexing (TDM), e.g., by E1 or T1. The base station usually adopts multiple line bonding on E1 or T1, i.e., Inverse Multiplex over ATM (IMA), which is shown in FIG. 42 as n*E1. The transmission rate of E1 is 2 MHz and the transmission rate of T1 is 1.5 MHz, therefore, the maximum bandwidth provided by WCDMA for a user is 2 Mbps only.

With the development and construction of radio networks, data services have taken more and more share in radio networks and need far more bandwidth than voice services do. Furthermore, because the prices of data service are low, the share of data services in radio networks will keep growing while radio networks further develop; accordingly data services will need higher and even huge transmission bandwidth, especially when HSDPA or HSUPA and CDMA 1X DO are introduced. For example, in the HSDPA or CDMA 1x Do, 9 Mbps is needed for service traffics on the downlink and 1 Mbps is needed on the uplink, on the physical layer of the HSDPA or CDMA 1x Do, where overheads of lower layers should also be taken into consideration, the transmission rate needs to be 15 Mbps on the downlink and 1.5 Mbps on the uplink.

If operators continue to use E1 or T1 transmission, the rapid development of the networks will be hindered and the profitability of operators will be significantly affected because of high costs and low returns, therefore the BS transmission is a technical problem that needs solution at present.

SUMMARY

The present disclosure discloses a method for interconnecting a Digital Subscriber Line (DSL) network and a radio communication network. The method is applicable for fixed wireless, nomadic connectivity, laptop and mobile access applications.

The present disclosure discloses a system for interconnecting a DSL network and a radio communication network in order to significantly improve the base station transmission rate in the radio communication network.

The technical scheme of the present disclosure is as follows.

A method for interconnecting a DSL network and a radio communication network includes:

setting a first logic unit in the radio communication network to interconnect with a DSL Modem in the DSL network at a reference point T; and the first logic unit and the DSL Modem in the DSL network constitute a first processing unit;

setting a second logic unit in the radio communication network to interconnect with an edge node in the DSL network at a reference point A10; and the second logic unit and the edge node in the DSL network constitute a second processing unit;

carrying data of the radio communication network between the first processing unit and the second processing unit over the DSL network.

The present disclosure also provides another method for interconnecting a Digital Subscriber Line (DSL) network and a radio communication network, including:

setting a first logic unit in the radio communication network to interconnect with an Ethernet convergence reference point V in the DSL network;

setting a second logic unit in the radio communication network to interconnect with an edge node in the DSL network at a reference point A10; and the second logic unit and the edge node in the DSL network constitute a second processing unit; and carrying data of the radio communication network between the first logic unit and the second processing unit over a convergence network of the DSL network.

The present disclosure also provides a tight coupling method and a loose coupling method for interconnecting a DSL network and a radio communication network in the case of interconnection between a 3G or 2G or WiMAX radio communication network and a DSL network. According to the two methods, the DSL network carries the data transmitted in the radio communication network so that the radio communication network and the DSL network are interconnected. The present disclosure may function as a radio extension of the wire access of the DSL network and is suitable to fixed wireless, nomadic connectivity, laptop and mobile access applications. Therefore, the present disclosure provides a new evolution path for DSL network operators concerning radio network development.

The tight coupling scheme provided by the present disclosure is on the basis of the Wireless or Mobile over DSL, which compensates the disadvantages of the wireless or mobile access technique and DSL access technique and extends the network coverage. According to this scheme, the construction of a 3G or 2G or WiMAX access network makes full use of the wire resources of existing DSL network. Therefore the cost of the 3G or 2G or WiMAX access network construction is lowered.

The loose coupling scheme of the present disclosure enables the radio network and the DSL network to share the core network resources of the two networks as much as possible, so the authentication, billing and customer care procedures can be performed in a unified manner and the service costs are lowered.

The present disclosure also provides a system for interconnecting a DSL network and a radio communication network, and the DSL network is interconnected with a base station in the radio communication network; the system includes a base station and a DSL network with a DSL Modem and a DSL Access Multiplexer (DSLAM), in which the base station is adapted to interconnect with the DSL Modem via a wire line for processing radio access of a user station, and is further adapted to transmit data from the user station to the DSL Modem or transmit data from the DSL Modem to the user station;

the DSL Modem is adapted to interconnect with the DSLAM via twisted pair lines, and is further adapted to transmit data from the base station to the DSLAM after modulation or transmit data from the DSLAM to the base station after demodulation.

The present disclosure also provides a system for interconnecting a DSL network and a radio communication network, and the DSL network is interconnected with a base station in the radio communication network; the system further includes a base station, a DSL network with a DSL Access Multiplexer (DSLAM) and an edge node in the DSL network, in which the base station is adapted to interconnect with the DSLAM via twisted pair lines for processing radio access of a user station and is further adapted to transmit data from a user station to the DSLAM or transmit data from the DSLAM to the user station;

the DSLAM is adapted to interconnect with the edge node in the DSL network via a wire line and is further adapted to transmit data from the base station to the edge node in the DSL network after demodulation or transmit data from the edge node in the DSL network to the base station after modulation.

The present disclosure also discloses two systems for interconnecting the DSL network and the radio communication network, and xDSL transmission technique is adopted as the base station transmission technique. Compared with the E1 or T1 transmission method of the prior art, the present disclosure significantly improves the base station transmission rate; moreover, the xDSL access is convenient with rich transmission resources and low transmission cost. Because the present disclosure adopts xDSL transmission technique, the construction of a 3G or 2G or WiMAX access network can make full use of the wire resources of existing DSL network and the cost of the 3G or 2G or WiMAX access network construction is lowered. In a word, xDSL transmission is advantageous and a preferred choice for base stations.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 5 is a schematic illustrating the user plane protocol stack according to Mode 1 of the various embodiments shown in FIG. 4a.

FIG. 6 is a schematic illustrating the control plane protocol stack according to Mode 1 of the various embodiments shown in FIG. 4a.

FIG. 7 is a schematic illustrating another user plane protocol stack according to Mode 1 of the various embodiments shown in FIG. 4a.

FIG. 8 is a schematic illustrating another control plane protocol stack according to Mode 1 of the various embodiments shown in FIG. 4a.

FIG. 9 is a schematic illustrating the user plane protocol stack according to Mode 2 of the various embodiments shown in FIG. 4a.

FIG. 10 is a schematic illustrating the control plane protocol stack according to Mode 2 of the various embodiments shown in FIG. 4a.

FIG. 11 is a schematic illustrating the user plane protocol stack according to Mode 3 of the various embodiments shown in FIG. 4a.

FIG. 12 is a schematic illustrating the control plane protocol stack according to Mode 3 of the various embodiments shown in FIG. 4a.

FIG. 26 is a schematic illustrating the user plane protocol stack according to Mode 1 of the various embodiments shown in FIG. 25a.

FIG. 27 is a schematic illustrating the control plane protocol stack according to Mode 1 of the various embodiments shown in FIG. 25a.

FIG. 28 is a schematic illustrating the user plane protocol stack Mode 2 of the various embodiments shown in FIG. 25a.

FIG. 29 is a schematic illustrating the control plane protocol stack according to Mode 2 of the various embodiments shown in FIG. 25a.

FIG. 30 is a schematic illustrating the user plane protocol stack according to Mode 3 of the various embodiments shown in FIG. 25a.

FIG. 31 is a schematic illustrating the control plane protocol stack according to Mode 3 of the various embodiments shown in FIG. 25a.

DETAILED DESCRIPTION

Figure 1:
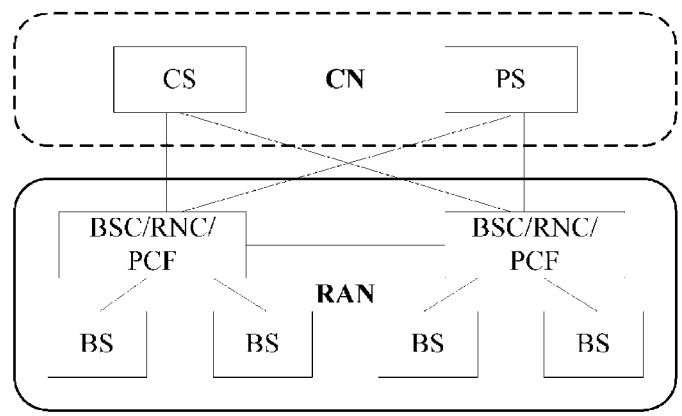
FIG. 1 is a schematic illustrating the architecture of a 3G or 2G based radio communication network in the prior art.
Figure 2:
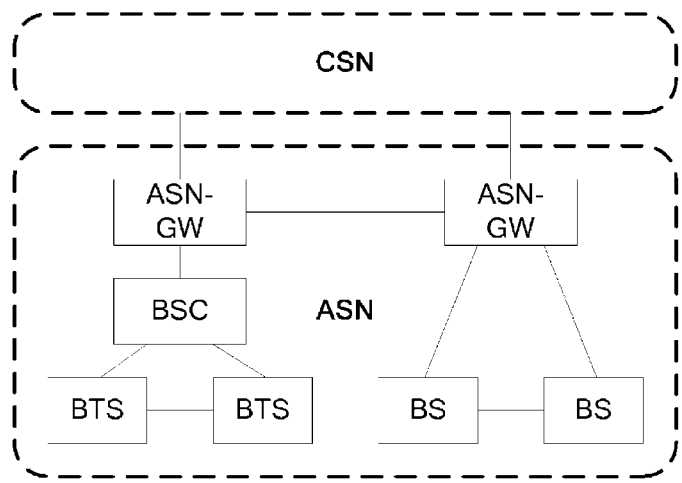
FIG. 2 is a schematic illustrating the architecture of a WiMAX based radio communication network in the prior art.
Figure 3:
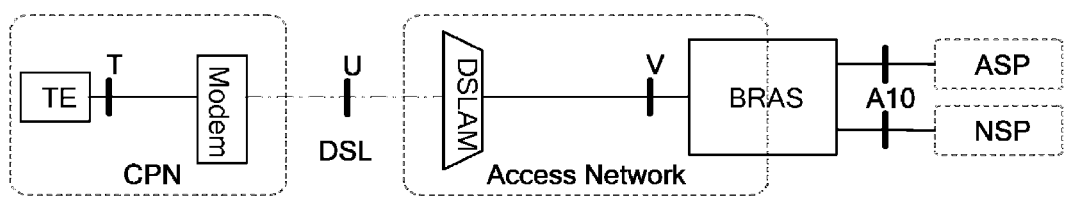
FIG. 3 is a schematic illustrating the architecture of a general DSL network in the prior art.

The following description is merely exemplary in nature and is not intended to limit the present disclosure, application, or uses.

Reference throughout this specification to "one embodiment", "an embodiment", "specific embodiment", or the like in the singular or plural means that one or more particular features, structures, or characteristics described in connection with the embodiment is included in at least one embodiment of the present disclosure. Thus, the appearances of the phrases "in one embodiment" or "in an embodiment", "specific embodiment", or the like in the singular or plural in various places throughout this specification are not necessarily all referring to the same embodiment. Furthermore, the particular features, structures, or characteristics may be combined in any suitable manner in one or more embodiments.

According to various embodiments of the present disclosure, a first Wireless Adaptor WA1 and a second wireless adaptor WA2 are defined, and the functions of WA1 and WA2 are as below.

For WCDMA, GSM, GPRS and TD-SCDMA networks, WA1 and WA2 can be in one of the following modes.

(1) WA1 or WA2 is equivalent to RNC or BSC, and WA1 and WA2 do not co-exist; in other words, WA1 or WA2 has the first function of base station management.

(2) WA1 or WA2 is equivalent to RNC+Serving GPRS Support Node (SGSN) or BSC+Mobile Switching Center (MSC), WA1 and WA2 do not co-exist; in other words, WA1 or WA2 has the first function of base station management and the second function of user station control and management; the user station refers to all terminal users.

(3) WA2 is equivalent to RNC+SGSN+Gateway GPRS Support Node (GGSN) or BSC+MSC+Gateway Mobile Switching Center (GMSC), and WA1 does not exist; in other words, WA2 has the first function of base station management, the second function of user station control and management, and the third function of connecting external networks.

(4) WA1 is equivalent to RNC or BSC, and WA2 is equivalent to SGSN or MSC; in other words, WA1 has the first function of base station management, at the same time, WA2 has the second function of user station control and management.

(5) WA1 is equivalent to RNC or BSC, and WA2 is equivalent to SGSN+GGSN or MSC+GMSC; in other words, WA1 has the first function of base station management, at the same time, WA2 has the second function of user station control and management and the third function of connecting external networks.

(6) WA1 is equivalent to RNC+SGSN or BSC+MSC, and WA2 is equivalent to GGSN or GMSC; in other words, WA1 has the first function of base station management the second function of user station control and management, and at the same time, WA2 has the third function of connecting external networks.

For IS-95 and CDMA2000 networks, WA1 and WA2 have the following functions.

(1) WA1 or WA2 is equivalent to BSC, and WA1 and WA2 do not co-exist; in other words, WA1 or WA2 has the first function of base station management.

(2) WA1 or WA2 is equivalent to BSC+PCF or BSC+MSC, and WA1 and WA2 do not co-exist; in other words, WA1 or WA2 has the first function of base station management and the second function of user station control and management.

(3) WA2 is equivalent to BSC+PCF+PDSN or BSC+MSC+GMSC, and WA1 does not exist; in other words, WA2 has the first function of base station management, the second function of user station control and management, and the third function of connecting external networks.

(4) WA1 is equivalent to BSC, and WA2 is equivalent to PCF or MSC; in other words, WA1 has the first function of base station management, at the same time, WA2 has the second function of user station control and management.

(5) WA1 is equivalent to BSC, and WA2 is equivalent to PCF+PDSN or MSC+GMSC; in other words, WA1 has the first function of base station management, at the same time, WA2 has the second function of user station control and management and the third function of connecting external networks.

(6) WA1 is equivalent to BSC+PCF or BSC+MSC, and WA2 is equivalent to PDSN or GMSC; in other words, WA1 has the first function of base station management and the second function of user station control and management, and at the same time, WA2 has the third function of connecting external networks.

For WiMAX networks, WA1 and WA2 have the following functions.

WA1 or WA2 is equivalent to BSC, and WA1 and WA2 do not co-exist; in other words WA1 or WA2 has the first function of base station management.

(2) WA1 or WA2 is equivalent to ASN-GW, and WA1 and WA2 do not co-exist; in other words, WA1 or WA2 has the first function of base station management and the second function of user station control and management.

(3) WA1 or WA2 is equivalent to BSC+ASN-GW, and WA1 and WA2 do not co-exist; in other words, WA1 or WA2 has the first function of base station management and the second function of user station control and management.

(4) WA1 is equivalent to BSC, and WA2 is equivalent to ASN-GW; in other words, WA1 has the first function of base station management, at the same time, WA2 has the second function of user station control and management.

For a 2G or 3G network, the user station refers to a mobile station, and for a WiMAX network, the user station refers to a mobile station or a fixed terminal.

The interconnection method according to various embodiments of the present disclosure is applicable to fixed wireless, nomadic connectivity, laptop and mobile access applications, as a radio extension of the wire broadband wired access. And the method provides an evolution path for DSL network operators to develop radio networks.

A detailed description is given with reference to the attached figures, with the PS domain of WCDMA as an example.

Figure 4A:
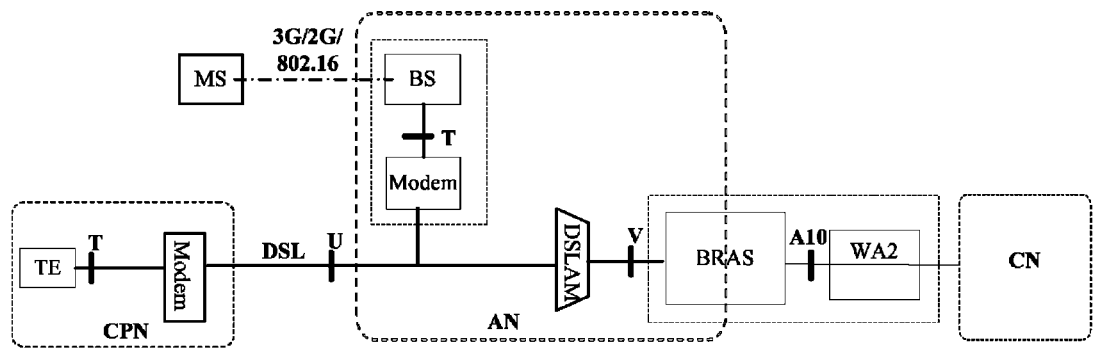
FIG. 4a is a schematic illustrating the interconnection between a DSL network and a radio communication network according to various embodiments of the present disclosure.
Figure 4B:
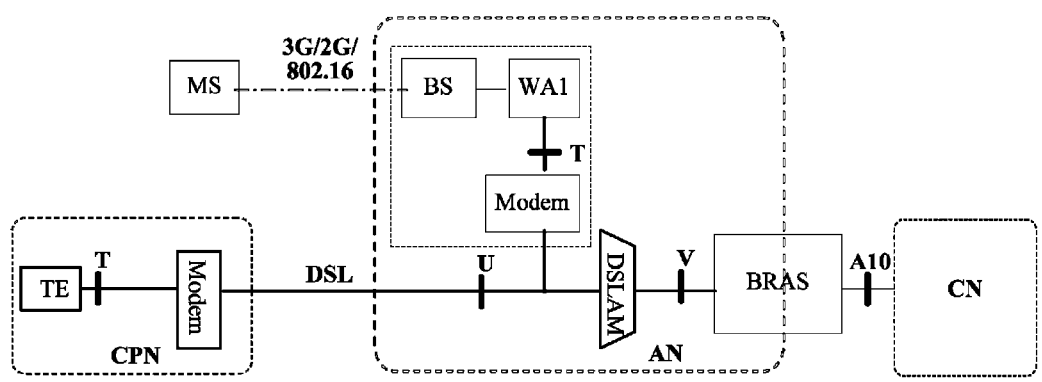
FIG. 4b is a schematic illustrating the interconnection between a DSL network and a radio communication network according to various embodiments of the present disclosure.
Figure 4C:
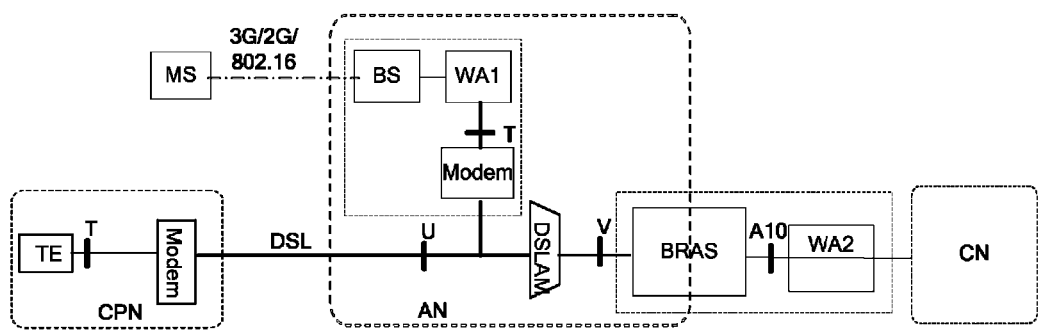
FIG. 4c is a schematic illustrating the interconnection between a DSL network and a radio communication network according to various embodiments of the present disclosure.

Interconnection Scheme 1:

FIGS. 4a, 4b and 4c show three various embodiments of the present disclosure. According to the various embodiments, the BS or WA1 in the radio communication network interconnects with the reference point U in the general DSL network through a DLS Modem, and WA2 or the CN of the radio communication network interconnects with the edge node of a general DSL network at a reference point A10. Therefore, the interconnection between the radio communication network and the DSL network is achieved. The edge node of the DSL network may be a BRAS, a Broadband Network Gateway (BNG) or an Edge Router (ER). For simplicity, in the descriptions of the various embodiments of the present disclosure, the BRAS is used as an example but not for limiting. The advantage of such an interconnection method is that, the method allows a radio communication network, for example the access network of 3G or 2G or WiMAXW, to fully utilize the resources of existing DSL networks, so that the construction cost of the radio communication networks can be reduced; therefore, this type of interconnections are categorized as a tightly coupled schemes. The differences among the three various embodiments are that, the embodiments shown in FIG. 4a only involve WA2, the embodiments shown in FIG. 4b only involve WA1, and the embodiments shown in FIG. 4c involve both WA1 and WA2.

With reference to FIGS. 4a, 4b and 4c, during data communication, the UE establishes a Radio Resource Control (RRC) connection via the control plane protocol stack, negotiates with the Core Network and establishes a Radio Access Bearer (RAB). The RAB establishment is accompanied with the establishment of the user plane Radio Bearer (RB). After RAB is successfully established, the user will be able to transmit data via the established user plane RB. The compression and decompression functions in the Packet Data Convergence Protocol (PDCP) can be either enabled or disabled. Signaling setup process begins after the RRC connection between the UE and the UMTS Terrestrial Radio Access Network (UTRAN) is successfully established. In this process, the UE establishes a signaling connection to the CN through the RNC, which is also called a "Non-Access Stratum (NAS) signaling setup", and the signaling connection is used for NAS signaling interaction between the UE and the CN for NAS information, such as authentication, service request, and connection setup. The user plane data and control plane data transmission procedures in which the compression and decompression functions are active are described as follows, In this example, the Radio Network Layer (RNL) of the Uu interface includes PDCP, Radio Link Control (RLC) and Media Access Control (MAC) on the user plane, and RRC, RLC and MAC on the control plane.

With reference to FIG. 4a, the base station BS for the control and management of the radio access is connected with the reference point T in the DSL network, and relays the data in the radio communication network to the wired network via a DSL Modem. WA2 is configured and is connected to the BRAS through the reference point A10, and relays the data in the DSL network to the core network. In this way, the interconnection between the wired network and the radio network is achieved. In this interconnection method, the network elements BS and DSL Modem can be either separate or integrated; and the network elements the BRAS and WA2 can be either logically separate or integrated. The term "separate" means that the two network elements are independent of each other. The term "integrated" means two or more network elements are integrated into one network elements. This interpretation also applies to similar content hereafter.

For FIG. 4a, there are three implementation modes as follows.

Mode (1): WA2 is equivalent to an RNC in function, written as WA2=RNC.

Mode (2): WA2 is equivalent to an RNC and an SGSN in function, written as WA2=RNC+SGSN.

Mode (3): WA2 is equivalent to an RNC, an SGSN and a GGSN in function, written as WA2=RNC+SGSN+GGSN.

The three modes are described respectively from the perspective of protocol stacks as follows.

Figure 5:
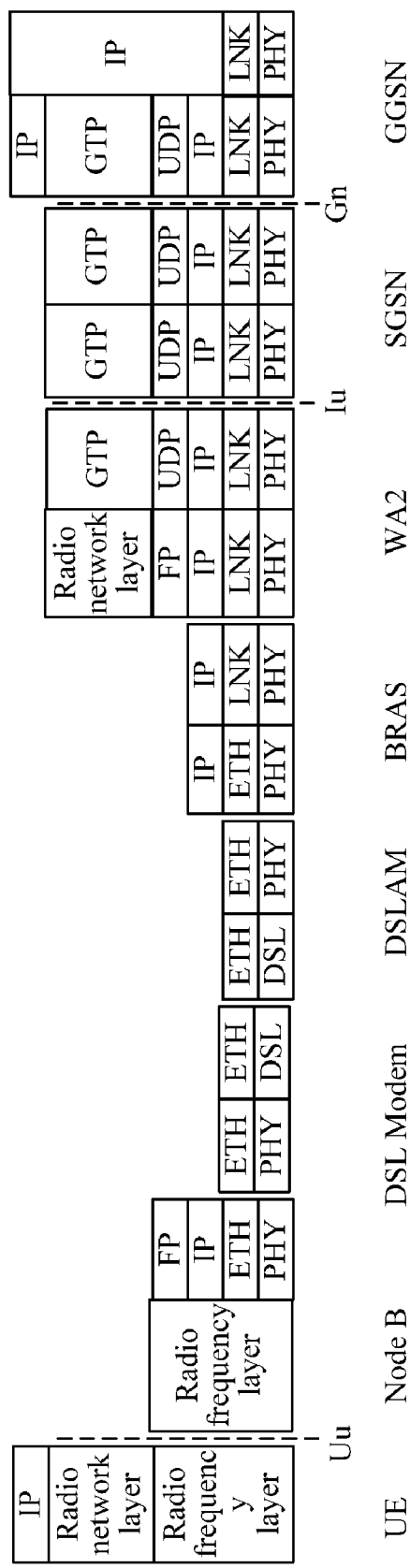
Figure 6:
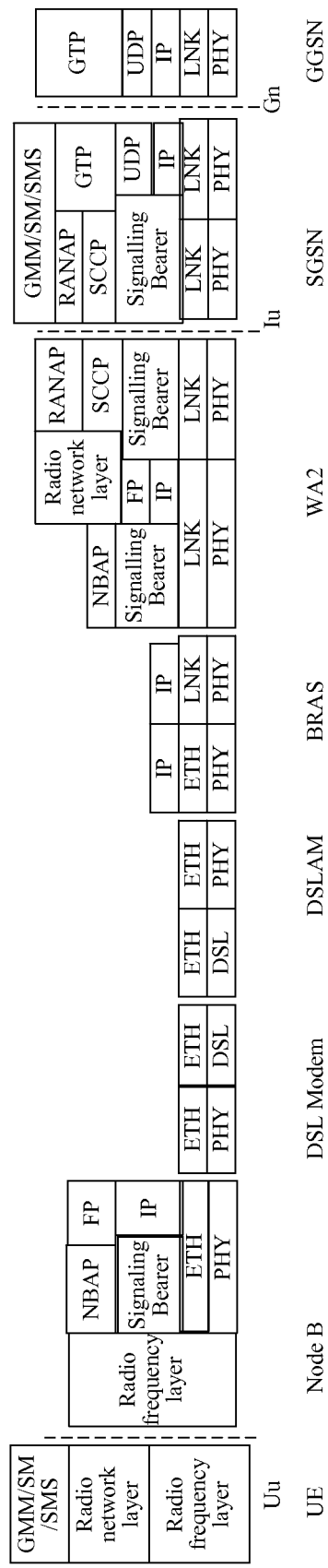

FIGS. 5 and 6 show the structures of the protocol stacks of the user plane and control plane respectively in Mode (1) in the various embodiments as shown in FIG. 4a. According to the structures of the protocol stacks:

For the user plane data on the uplink, the data in the application layer of the UE is encapsulated into a packet and sent to the radio network layer (RNL), and the packet may be an IP packet or a PPP packet of the user. RNL compresses the header of the packet, adds a header according to the protocol, such as RLC/MAC header, and sends the packet to the radio frequency layer (RFL) in the physical layer. RFL encodes and modulates the packet and sends the packet to UTRAN via the Uu interface. The RFL in a Node B in the UTRAN receives the packet, encapsulates the packet into a frame of the framing protocol (FP), adds an IP header to the FP frame (i.e., IP processing) to form an IP packet, and sends the IP packet to WA2 via Iub interface. Here an IP packet consisting of an IP header and an FP frame (i.e., the payload of the IP packet) is called an FP/IP frame, and this also applies to similar terms hereafter.

The framing protocol (FP)/IP frame between the Iub interfaces of Node B and WA2, can be directly borne over the DSL network. For example, a layer-2 bridging technique, such as Ethernet bridging, may be used between Node B and WA2 for transmission. In this case the DSL Modem and the DSLAM are both layer-2 network elements. Alternatively, a layer-3 routing technique, such as IP layer-3 routing, may be used between Node B and WA2 for transmission, and in this case the DLS Modem and DSLAM are both layer-3 network elements for transmission. For the protocol stack shown in FIG. 5, the detailed implementation procedure is as follows.

Node B encapsulates a FP/IP frame into Ethernet (ETH) frames, sends the ETH frames to a DSL Modem through wire lines in the physical layer (PHY) of the Ethernet. The PHY of the Ethernet of the DSL Modem decapsulates the data into ETH frames, modulates the ETH frames according to Data Over Cable Service Interface Specification (DOCSIS) to convert the ETH frames to DSL physical frames suitable for transmission over a twisted pair lines in the wired network, and sends the DSL physical frames to DSLAM through a twisted pair lines. DSLAM performs DOCSIS demodulation on the DSL physical frames to obtain ETH frames, sends the ETH frames to the BRAS by bearing the ETH frames on the Ethernet PHY between DSLAM and the BRAS. The Ethernet PHY of the BRAS decapsulates the data to ETH frames, process the ETH frames with the MAC headers to obtain an IP packet, re-encapsulates the IP packet at the Data-Link Layer (LNK), the BRAS sends the re-encapsulated data to WA2 by bearing the data on the physical layer PHY between the BRAS and WA2 for further processing.

In this case, WA2 is equivalent to the RNC in function; the processing on WA2 is similar to that of the user plane on existing RNC. In particular, WA2 receives data from PHY, de-encapsulates the data in LNK to obtain an FP/IP frame, and converts the FP/IP frame into an FP frame. The FP/IP frame of the framing protocol between the Iub interfaces of Node B and WA2 is borne on the DSL network, and it can be considered as WA2 obtaining the FP/IP frame from the Iub interface. WA2 then de-encapsulates the FP/IP frame to obtain the packet in the RNL. WA2 processes the packet in the transport network layer and the radio network layer of the Iu interface, and sends the packet to a network element in the CN through GTP tunnel. The processing of the transport network layer of the Iu interface includes processings of GTP user plane (GTP-U), UDP, IP, LNK, and PHY layers. The processing of the radio network layer of the Iu interface is the processing of the Iu UP protocol used for transmitting user data related to RAB.

In the CN, the SGSN performs the radio network layer and transport network layer processing of the Iu interface, receives data from a GTP tunnel and sends data to the GGSN through another GTP tunnel via the Gn interface. The data received by the GGSN from the GTP tunnel of the Gn interface may be a user IP packet or PPP packet of the UE, and the GGSN sends the data in the form of IP packet or PPP packet to an external network via the Gi interface. In other words, in this case, the processing of the CN is similar to that in prior art.

Similarly, UE receives a packet sent from the CN to the UE by a reversed procedure.

For the control plane data on the uplink, the UE encapsulates in the RNL a signaling message, such as GMM, SM, SMS messages or RRC layer signaling messages, into a packet. The RNL adds a header according to the protocol, such as RLC/MAC header, and sends the packet to the RFL in the physical layer. The RFL encodes and modulates the packet and sends the packet to UTRAN via the Uu interface. The RFL in the Node B in the UTRAN receives the packet and encapsulates the packet in an Iub interface radio network layer frame, such as FP frame, and sends the packet to WA2 via the transport network layer of the Iub interface, such as IP or ETH or PHY. The IP layer or signaling bearer layer of the radio network layer and the transport network layer of the Iub interfaces between Node B and WA2 is borne on the DSL network. The IP layer is with respect to FP and the signaling bearer is with respect to NBAP, and this also applies to similar content hereafter. The radio network layer includes FP or Node B Application Protocol (NBAP, where NBAP frames only exist between Node B and RNC), and the signaling bearer layer includes Simple Control Transmission Protocol (SCTP) layer and IP layer. For example, a layer-2 bridging technique, such as Ethernet bridging, can be used between Node B and WA2 for transmission, and in this case the DSL Modem and the DSLAM are both layer-2 network elements. Alternatively, a layer-3 routing technique, such as IP layer-3 routing, can be used between Node B and WA2 for transmission, and in this case the DLS Modem and DSLAM are both layer-3 network elements for transmission.

For the protocol stack shown in FIG. 6, the detailed implementation procedure is as follows.

Node B encapsulates an FP/IP frame or NBAP/SCTP/IP frame (IP packet processed by NBAP, SCTP or IP) into Ethernet (ETH) frames, sends the ETH frames to the DSL Modem through the wire line in the physical layer (PHY) of the Ethernet. The PHY of the Ethernet of the DSL Modem decapsulates the data into ETH frames, modulates the ETH frames according to DOCSIS to convert the ETH frames to DSL physical frames suitable for transmission over a twisted pair lines in the wired network, and sends the DSL physical frames to DSLAM through a twisted pair lines. DSLAM performs DOCSIS demodulation on the DSL physical frames to obtain ETH frames, sends the ETH frames to the BRAS by bearing the ETH frames on the Ethernet PHY between the DSLAM and the BRAS. The Ethernet PHY of the BRAS decapsulates the received data to ETH frames, processes the ETH frames with the MAC headers to obtain an IP packet, re-encapsulates the IP packet at the LNK. BRAS sends the re-encapsulated data to WA2 for further processing by bearing the data on the physical layer PHY between the BRAS and WA2.

In this case, WA2 is equivalent to an RNC in function. The processing in WA2 is similar to that in an RNC control plane in the prior art. In particular, WA2 receives data from PHY, de-encapsulates the data at LNK, and obtains FP/IP frames or signaling bearer data. For the FP/IP frames, FP frames are obtained after the IP header is removed. For the signaling bearer layer data, NBAP frames are obtained after SCTP and IP processing. Because the FP/IP frames or NBAP of the framing protocol between the Iub interfaces of Node B and WA2 are borne on the DSL network, it can be considered as WA2 obtaining FP/IP frames or NBAP frames from the Iub interface. If WA2 receives an NBAP frame, the corresponding processing for the NBAP frame is implemented. If WA2 receives an FP/IP frame, WA2 removes the IP header from the FP/IP frame to obtain an FP frame, and de-encapsulates the FP frame to obtain the packet in RNL. WA2 processes the packet in the transport network layer and radio network layer of the Iu interface, and sends the packet to a network element in the CN. The processing in the transport network layer of the Iu interface includes processings in SCCP, signaling bearer, LNK and PHY. The processing in the radio network layer of the Iu interface includes processing in RANAP.

In the CN, the SGSN performs the transport network layer and the radio network layer processing of the Iu interface, obtains a signaling message of the UE such as GMM, SM and SMS, and continues to perform the subsequent processing according to prior art. In other words, the processing of the CN is similar to that in prior art.

Similarly, the UE receives a signaling message sent from the CN to the UE by a reversed procedure.

Figure 7:
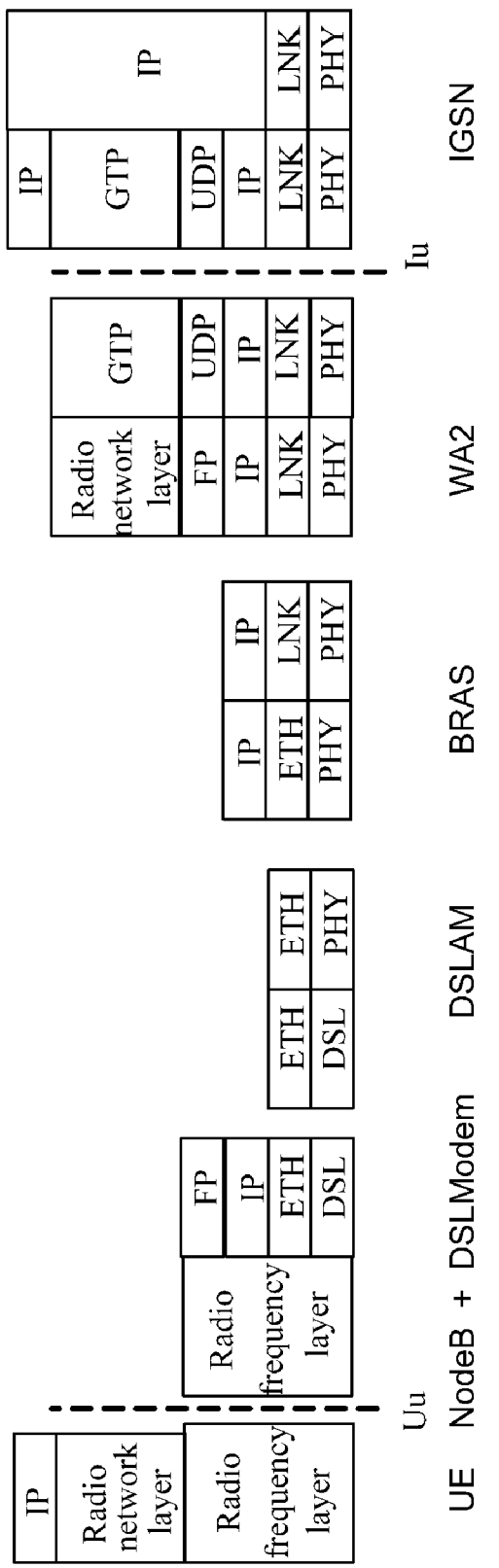
Figure 8:
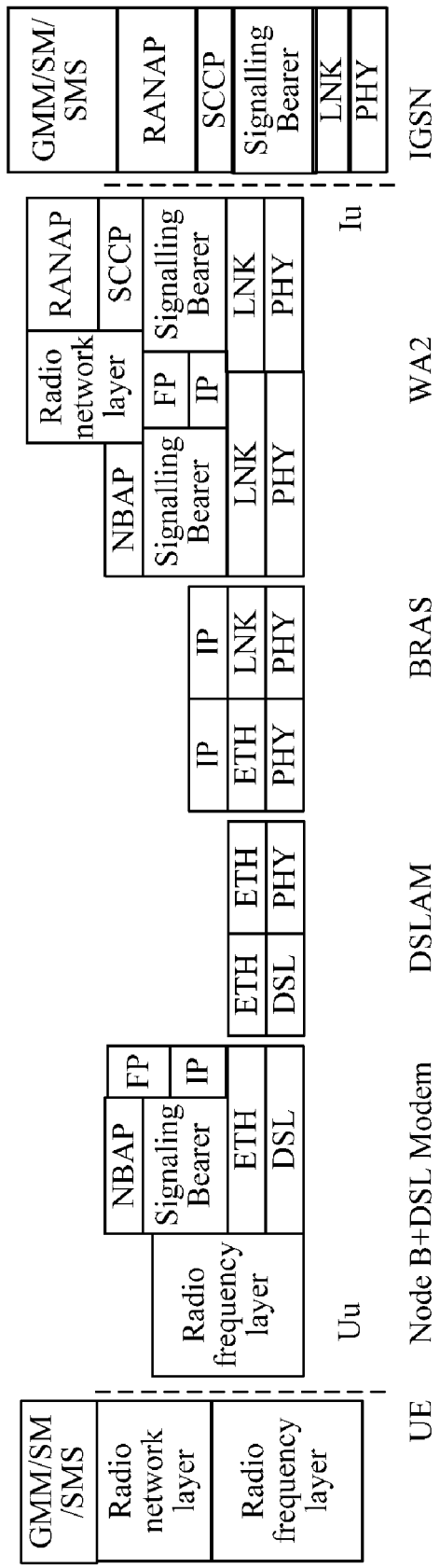

FIGS. 7 and 8 show the structures of the protocol stacks of another user plane and another control plane respectively in Mode (1) in the various embodiments as shown in FIG. 4a. The difference between the protocol stacks shown in FIGS. 7 and 8 and the protocol stacks shown in FIGS. 5 and 6 is that, Node B and DSL Modem are integrated into one logical entity, written as "Node B+DSL Modem". The SGSN and GGSN in the core network are integrated into a new network element written as IGSN (Integrated GPRS Support Node). The change of the structure of the protocol stack makes the processing steps change accordingly. In the following, explanations of the differences from FIGS. 5 and 6 are given, and the steps that are the same are omitted.

For the user plane data on the uplink, the UE sends a packet via Uu interface to UTRAN, the Node B+DSL Modem in UTRAN encapsulates the packet into a FP frame, adds IP header to the FP frame (i.e., IP processing) to form an IP packet, and sends the IP packet to WA2 via the Iub interface. The FP/IP frames of the framing protocol between the Iub interfaces of the Node B+DSL Modem and WA2 are borne on the DSL network. Specifically, a layer-2 bridging or layer-3 routing technique can be used. In other words, Node B+DSL Modem encapsulates FP/IP frames into ETH frames, and modulates the frames according to DOCSIS to convert the ETH frames to DSL physical frames suitable for transmission in a twisted pair lines of the wired network, and sends the DSL physical frames to DSLAM via a twisted pair lines. The subsequent process is similar to that in FIG. 5. In other words, compared with FIG. 5, the user plane data can reach WA2 via DSLAM and the BRAS.

In the CN, the IGSN performs the transport network layer and radio network layer processing of the Iu interface. The data that the IGSN receives from the GTP tunnel may be a user IP packet or PPP packet of the UE. The IGSN then sends the data in the form of user IP packets or PPP packets to an external network.

Similarly, UE receives a packet sent from the CN to the UE by a reversed procedure.

For the control plane data on the uplink, The UE sends a signaling message to a UTRAN via the Uu interface. The RFL in the Node B+DSL Modem in the UTRAN receives the packet and encapsulates the packet into a radio network layer frame of the Iub interface, such as an FP frame, and sends the frame to WA2 via the transport network layer of the Iub interface. The radio network layer of the Iub interface between Node B+DSL Modem, such as FP or NBAP, and the IP layer or signaling bearer layer of the transport network layer are borne on the DSL network. Specifically, a layer-2 bridging technique or a layer-3 routing technique may be used. In other words, Node B+DSL Modem encapsulates FP/IP frames or NBAP/SCTP/IP frames into ETH frames, and modulates the frames according to DOCSIS to convert the ETH frames to DSL physical frames suitable for the transmission in a twisted pair lines of the wired network, and sends the data to DSLAM via a twisted pair lines. The subsequent process is similar to that in FIG. 6. Compared with FIG. 6, the user plane data can reach WA2 via DSLAM and the BRAS.

In the CN, the IGSN performs the transport network layer and the radio network layer processing of the Iu interface, obtains a signaling message of the UE such as GMM, SM and SMS message, and continues to perform subsequent processing according to prior art.

Similarly, UE receives a signaling message sent from the CN to the UE by a reversed procedure.

Figure 9:
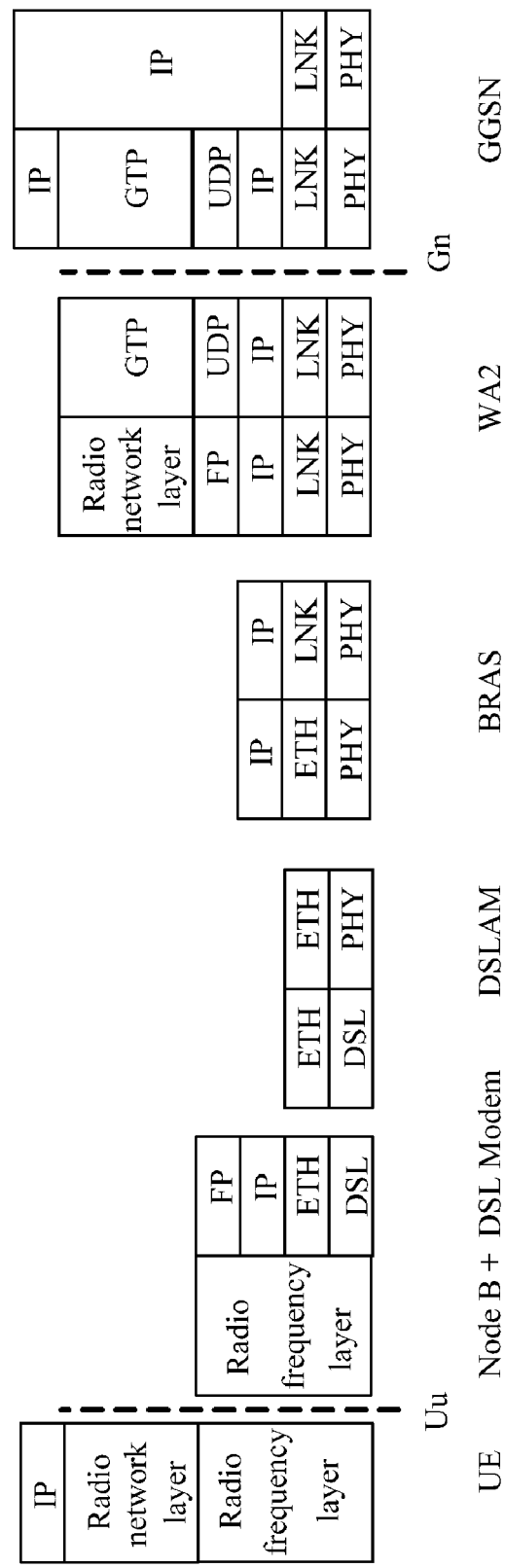
Figure 10:
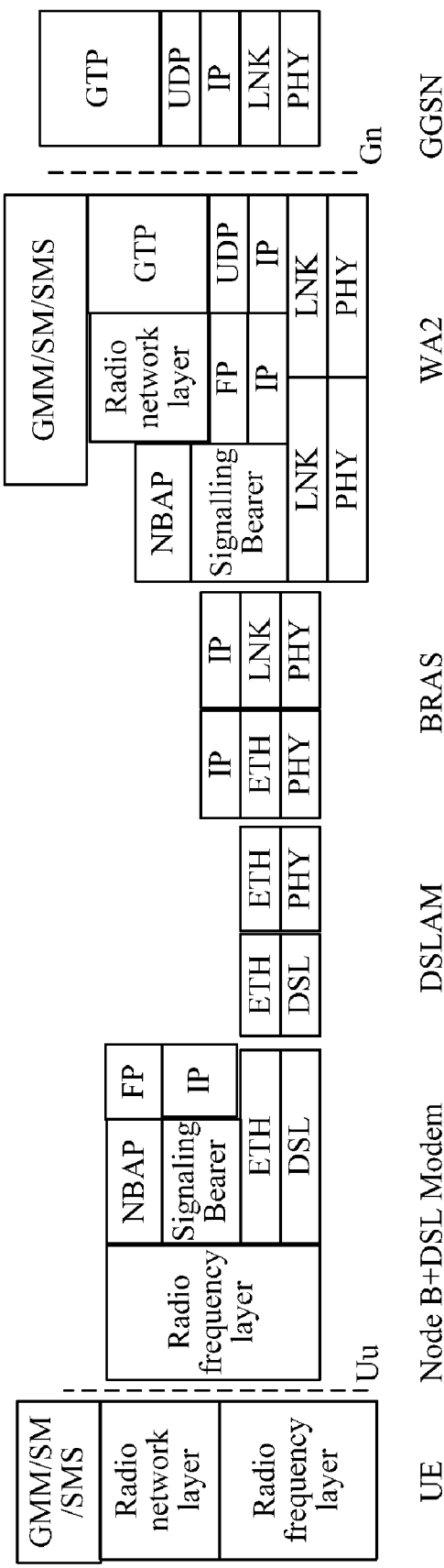

FIGS. 9 and 10 show the structures of the protocol stacks of the user plane and control plane respectively in Mode (2) in the various embodiments as shown in FIG. 4a. The difference between the protocol stacks shown in FIGS. 9 and 10 and the protocol stacks shown in FIGS. 7 and 8 is that, WA2 is equivalent to an RNC and an SGSN in function. In this way, GGSN processing is needed for the CN, and SGSN processing is not needed. The change of the structure of the protocol stack makes the processing steps change accordingly. In the following, explanations of the differences from FIGS. 7 and 8 are given, and the steps that are the same are omitted.

For the user plane data on the uplink, WA2 receives data from PHY, de-encapsulates the data in LNK to obtain an FP/IP frame, and converts the FP/IP frame into an FP frame. Because the FP/IP frame of the framing protocol between the Iub interfaces of Node B+DSL Modem and WA2 is borne on the DSL network, it can be considered as WA2 obtaining the FP/IP frame from the Iub interface. WA2 then de-encapsulates the FP/IP frame to obtain the packet in the RNL. WA2 processes the packet in the protocol stack of the Gn interface, and sends the packet to a network element in the CN through GTP tunnel. The processing of Gn interface protocol stack includes processings of GTP user plane (GTP-U), UDP, IP, LNK, and PHY layers.

In the CN, the GGSN performs protocol stack processing of the Gn interface. The data received by the GGSN from the GTP tunnel of the Gn interface may be a user IP packet or PPP packet of the UE. The GGSN sends the data in the form of IP packet or PPP packet to an external network.

Similarly, UE receives a packet sent from the CN to the UE by a reversed procedure.

For the control plane data uplink, WA2 receives data from PHY, de-encapsulate the data in LNK to obtain a FP/IP frame or signal bearer layer data. For the FP/IP frame, the IP header is removed to obtain a FP frame, and for signal bearer layer data, an NBAP frame is obtained after SCTP and IP processing. Because the FP/IP frame or NBAP of the framing protocol of the Iub interfaces between Node B+DSL Modem and WA2 is borne on the DSL network, it can be considered as WA2 obtaining the FP/IP frame or NBAP frame from the Iub interface. If WA2 receives an NBAP frame, then WA2 will process the NBAP frame accordingly. If WA2 receives an FP/IP frame, WA2 will de-encapsulate the FP/IP frame to obtain the packet in RNL. After RNL processing, WA2 obtains a signaling message of the UE such as a GMM, SM, SMS message or RRC layer signaling message, and processes the messages accordingly, such as establishing connections or measurement reports. In other words, WA2 completes the control plane functions of RNC and SGSN. The user plane GTP tunnel between WA2 and GGSN is established, maintained or released through the Gn interface control plane protocol. The Gn interface protocol stack includes GTP control plane (GTP-C), UDP, IP, LNK, and PHY layers.

Similarly, UE receives a signaling message sent from the CN to the UE by a reversed procedure.

In the implementation of the Mode (2) in the various embodiments as shown in FIG. 4a, Node B and DSL Modem can be actually independent of each other, i.e., Node B and DSL Modem are two independent logical entities. In this case, this part of the process is similar to the process shown in FIGS. 5 and 6, which will not be detailed here.

Figure 11:
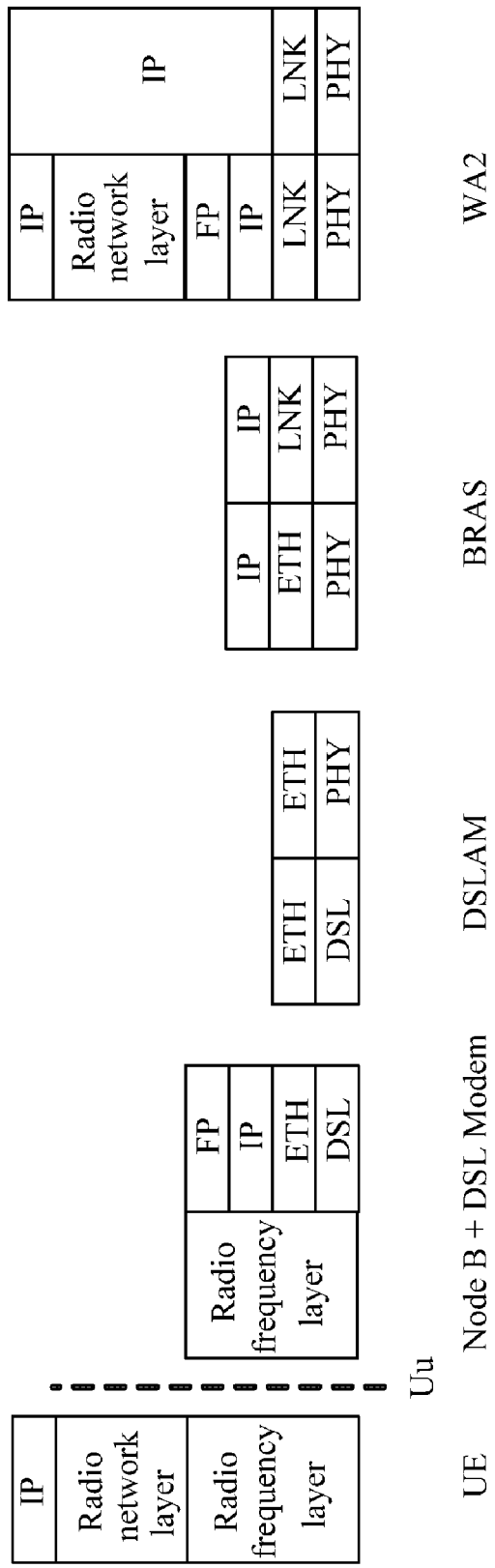
Figure 12:
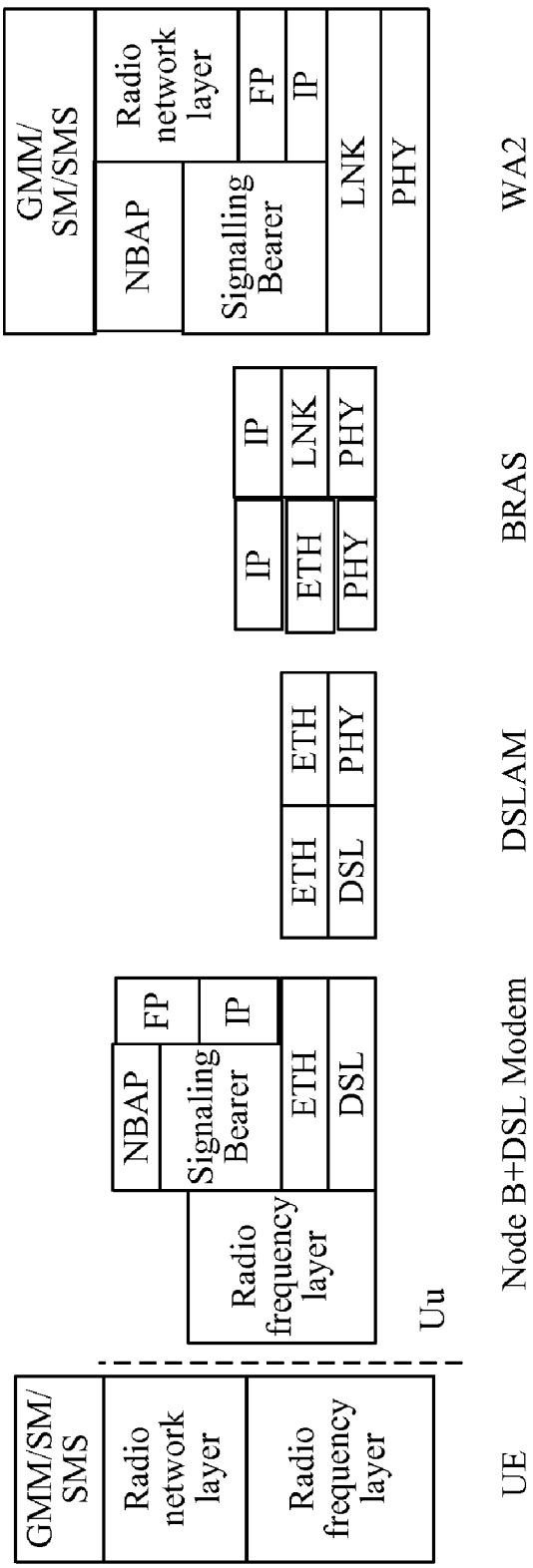

FIGS. 11 and 12 show the structures of the protocol stacks of the user plane and control plane respectively in Mode (3) in the various embodiments as shown in FIG. 4a. The difference between the protocol stacks shown in FIGS. 11 and 12 and the protocol stacks shown in FIGS. 7 and 8 is that, WA2 is equivalent to an RNC, an SGSN and a GGSN in function. In this way, the processing of SGSN and GGSN is not needed for the CN, and other processes are as normal. The change of the structure of the protocol stack makes the processing steps change accordingly. In the following, explanations of the differences from FIGS. 7 and 8 are given, and the steps that are the same are omitted.

For the user plane data on the uplink, WA2 receives data from PHY, de-encapsulates the data in LNK to obtain an FP/IP frame, and converts the FP/IP frame into an FP frame. Because the FP/IP frame of the framing protocol between the Iub interfaces of Node B+DSL Modem and WA2 is borne on the DSL network, it can be considered as WA2 obtaining the FP/IP frame from the Iub interface. WA2 then de-encapsulates the FP/IP frame to obtain the packet in the RNL. WA2 routes the packet to an external network through the CN.

In the CN, SGSN and GGSN processing is not performed, and routing is done.

Similarly, UE receives a packet sent from the CN to the UE by a reversed procedure.

For the control plane data on the uplink, WA2 receives data from PHY, de-encapsulate the data in LNK to obtain a FP/IP frame or signal bearer layer data. For a FP/IP frame, the IP header is removed to obtain a FP frame, and for signal bearer layer data, an NBAP frame is obtained after SCTP and IP processing. Because the FP/IP frame or NBAP of the framing protocol of the Iub interfaces between Node B+DSL Modem and WA2 is borne on the DSL network, it can be considered as WA2 obtaining the FP/IP frame or NBAP frame from the Iub interface. If WA2 receives an NBAP frame, WA2 will process the NBAP frame accordingly. If WA2 receives an FP/IP frame, WA2 will de-encapsulate the FP/IP frame to obtain the packet in RNL. After RNL processing, WA2 obtains the signaling message of the UE such as a GMM, SM, SMS message or RRC layer signaling message, and processes the messages accordingly, such as establishing connections or measurement reports. In other words, WA2 completes the control plane functions of RNC, SGSN and GGSN.

In the CN, SGSN and GGSN processing is not performed, and routing is done.

Similarly, UE receives a signaling message sent from the CN to the UE by a reversed procedure.

In the implementation of the Mode (3) in the various embodiments as shown in FIG. 4a, Node B and DSL Modem can be independent of each other, i.e., Node B and DSL Modem are two independent logical entities. In this case, this part of the process is similar to the process shown in FIGS. 5 and 6, which will not be detailed here.

As shown in FIG. 4b, WA1 is configured in the base station BS used for the control and management of the radio access. The BS connects with the reference point T in the DSL network through WA1, and relays the data in the radio communication network to the wired network via a DSL Modem. The BRAS in the wired network relays data in the DSL network to the core network through the reference point A10. Therefore, the interconnection between the wired network and the radio network is achieved. In this interconnection mode, the network elements BS, WA1 and DSL Modem can be logically separated or integrated.

For FIG. 4b, there are further two implementation modes as follows.

Mode (4): WA1 is equivalent to an RNC in function, written as WA1=RNC;

Mode (5): WA1 is equivalent to an RNC and an SGSN in function, written as WA2=RNC+SGSN;

The two modes are described respectively from the perspective of protocol stacks as follows.

Figure 13:
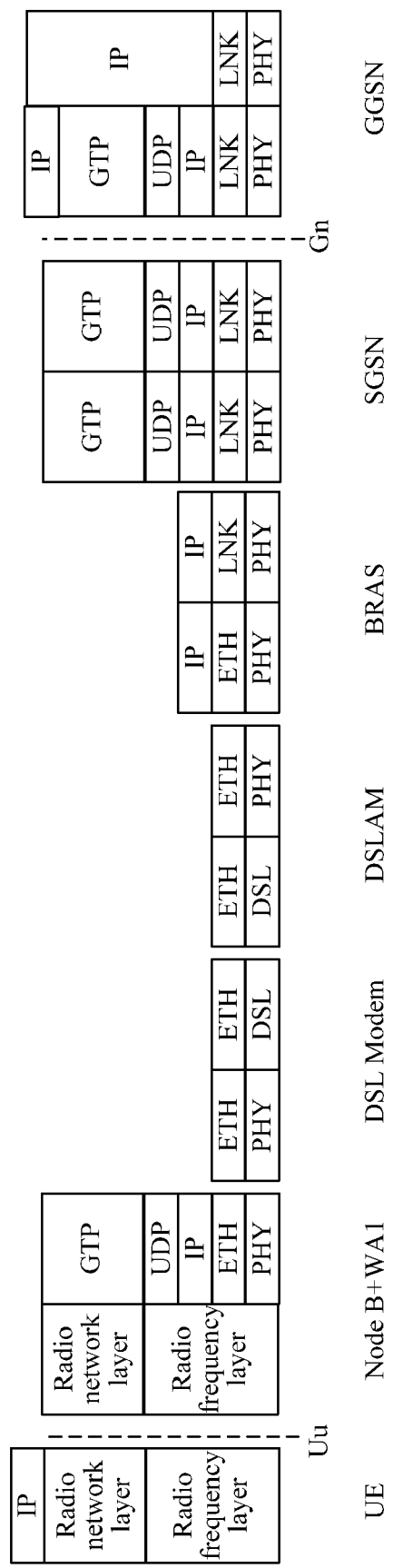
FIG. 13 is a schematic illustrating the user plane protocol stack according to Mode 4 of the various embodiments shown in FIG. 4b.
Figure 14:
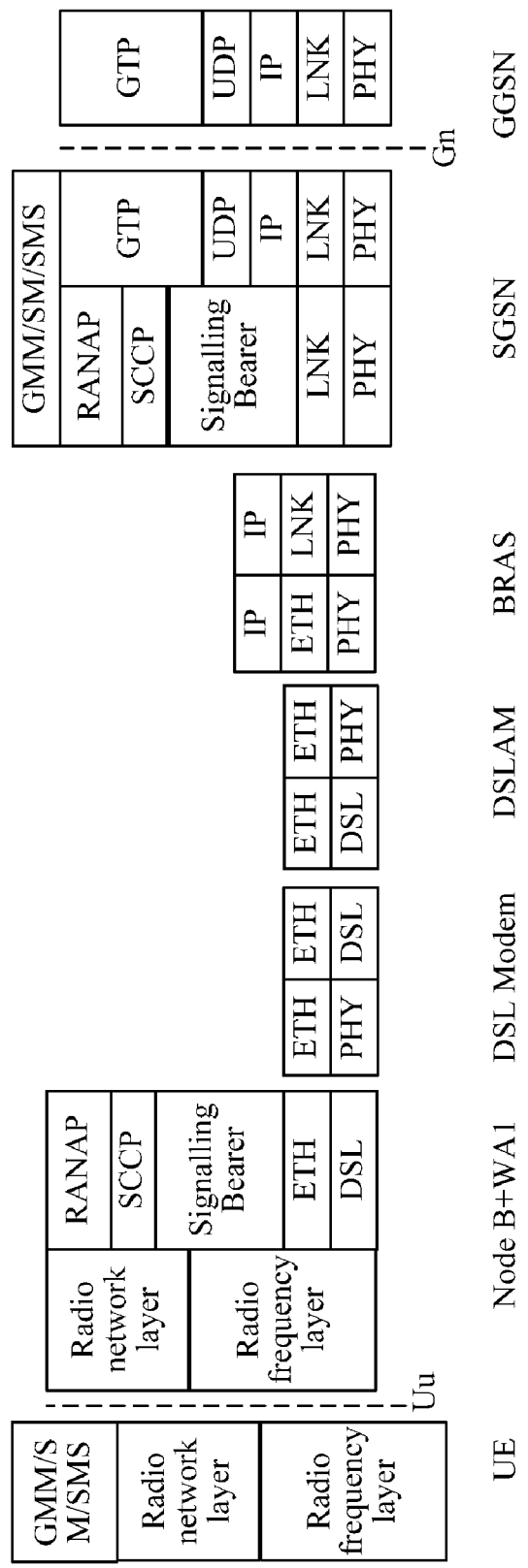
FIG. 14 is a schematic illustrating the control plane protocol stack according to Mode 4 of the various embodiments shown in FIG. 4b.

FIGS. 13 and 14 show the structures of the protocol stacks of the user plane and control plane respectively in Mode (4) in the various embodiments as shown in FIG. 4b. In this embodiment, WA1 is configured in Node B. Node B with a WA1 is referred to as Node B+WA1.

For the user plane data on the uplink, the data in the application layer of the UE is encapsulated into a packet, and sent to the RNL, and the packet may be an IP packet or a PPP packet of the user. RNL compresses the header of the packet, adds a header according to the protocol, such as RLC/MAC header, and sends the packet to the RFL in the physical layer. RFL encodes and modulates the packet and sends the packet to UTRAN via the Uu interface. Because WA1 is equivalent to RNC in function, upon receiving packets, the RFL in the Node B+WA1 in UTRAN removes the protocol header, reassembles the packets and decompresses the header, and forwards the packets to the CN via GTP tunnel. The GTP tunnel protocol, UDP and IP between the WA1 in Node B and the CN are borne on the DSL network. Specifically, the transmission between WA1 and the SGSN in the CN can be implemented by a layer-2 bridging technique or a layer-3 routing technique. With respect to the protocol stack as shown in FIG. 13, the detailed implementation procedure is as follows.

Node B+WA1 encapsulates a FP/IP frame or NBAP/SCTP/IP frame (IP packet processed by NBAP, SCTP and IP) into ETH frames, sends the ETH frames to the DSL Modem through the wire line in the physical layer (PHY) of the Ethernet. The PHY of the Ethernet of the DSL Modem decapsulates the data into ETH frames, modulates the ETH frames according to DOCSIS to convert the ETH frames to DSL physical frames suitable for transmission over twisted pair lines in the wired network, and sends the DSL physical frames to DSLAM through a twisted pair lines. DSLAM performs DOCSIS demodulation on the DSL physical frames to obtain ETH frames, sends the ETH frames to the BRAS by bearing the ETH frames on the Ethernet PHY between DSLAM and the BRAS. The Ethernet PHY of the BRAS decapsulates the data to ETH frames, process the MAC headers in the ETH frames to obtain an IP packet, re-encapsulates the IP packet at the LNK. BRAS sends the re-encapsulated data to the CN for further processing by bearing the data on the PHY between the BRAS and the CN.

In the CN, the SGSN performs radio network layer and transport network layer processing of Iu interface, receives data from the GTP tunnel and sends the data to the GGSN through the GTP tunnel via the Gn interface. The data received by the GGSN from the GTP tunnel of the Gn interface may be a user IP packet or PPP packet of the UE, and the GGSN sends the data in the form of IP packet or PPP packet to an external network via the Gi interface. In other words, in this case, the processing of the CN is similar to that in prior art.

Similarly, UE receives a packet sent from the CN to the UE by a reversed procedure.

For the control plane data on the uplink, the UE encapsulates in the RNL a signaling message, such as a GMM, SM, SMS messages or RRC layer signaling message, into a packet. The RNL adds a header according to the protocol, such as RLC/MAC header, and sends the packet to the RFL in the physical layer. The RFL encodes and modulates the packet and sends the packet to UTRAN via the Uu interface. In response to a packet, the RFL in the Node B+WA1 in UTRAN removes the protocol header, reassembles the packet and sends the data to the RRC protocol of the RNL, parses the signaling message and performs corresponding processing, such as connection establishment and measurement reports. For a GMM or SM or SMS message, Node B+WA1 forwards the corresponding message to the CN via the radio network layer (such as NANAP) and transport network layer of the Iu interface. The transport network layer includes SCCP/M3UA/SCTP/IP/LNK/PHY, where M3UA/SCTP/IP is the Signaling Bearer as shown in the FIG. 14. The radio network layer, such as NANAP, and the transport network layer, such as SCCP/M3UA/SCTP/IP, of the Iu interface between the WA1 in Node B and the CN, are borne on the DSL network. Specifically, the transmission between WA1 and the SGSN in the CN can be implemented by a layer-2 bridging technique or a layer-3 routing technique. For the protocol stack shown in FIG. 14, the detailed implementation procedure is as follows.

Node B+WA1 encapsulates a RANAP/SCCP/M3UA/SCTP/IP frame (i.e., an IP packet processed by RANAP, SCCP, M3UA, SCTP and IP) into Ethernet (ETH) frames, sends the ETH frames to the DSL Modem through the wire line in the physical layer (PHY) of the Ethernet. The PHY of the Ethernet of the DSL Modem decapsulates the received data into ETH frames, the DSL Modem modulates the ETH frames according to DOCSIS to convert the ETH frames to DSL physical frames suitable for transmission over a twisted pair lines in the wired network, and sends the DSL physical frames to DSLAM through a twisted pair lines. DSLAM performs DOCSIS demodulation on the DSL physical frames to obtain ETH frames, sends the ETH frames to the BRAS by bearing the ETH frames on the Ethernet PHY between DSLAM and the BRAS. The Ethernet PHY of the BRAS decapsulates the data to ETH frames, processes the ETH frames with the MAC headers to obtain an IP packet, re-encapsulates the IP packet at the LNK. BRAS sends the re-encapsulated data to the CN for further processing by bearing the data on the PHY between the BRAS and the CN.

In the CN, the SGSN performs the transport network layer and the radio network layer processing of the Iu interface, obtains a signaling message such as a GMM, SM and SMS from RANAP, and continues to perform subsequent processing according to prior art.

Similarly, UE receives a signaling message sent from the CN to the UE by a reversed procedure.

Figure 15:
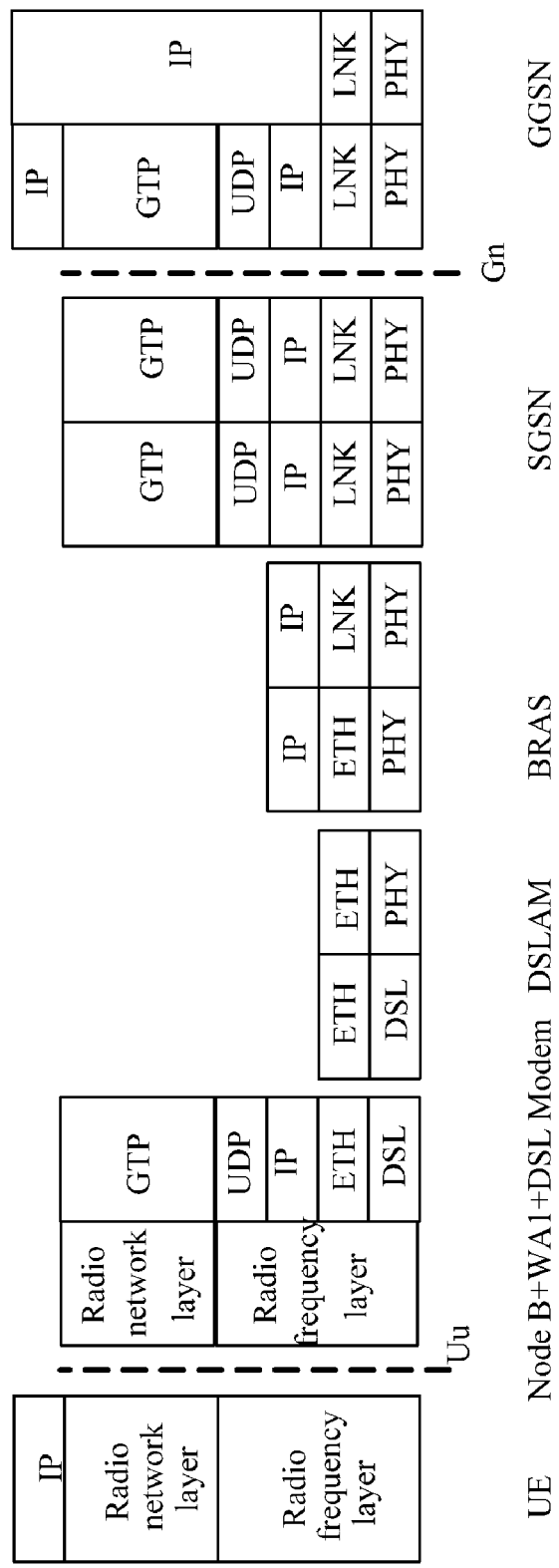
FIG. 15 is a schematic illustrating another user plane protocol stack according to Mode 4 of the various embodiments shown in FIG. 4b.
Figure 16:
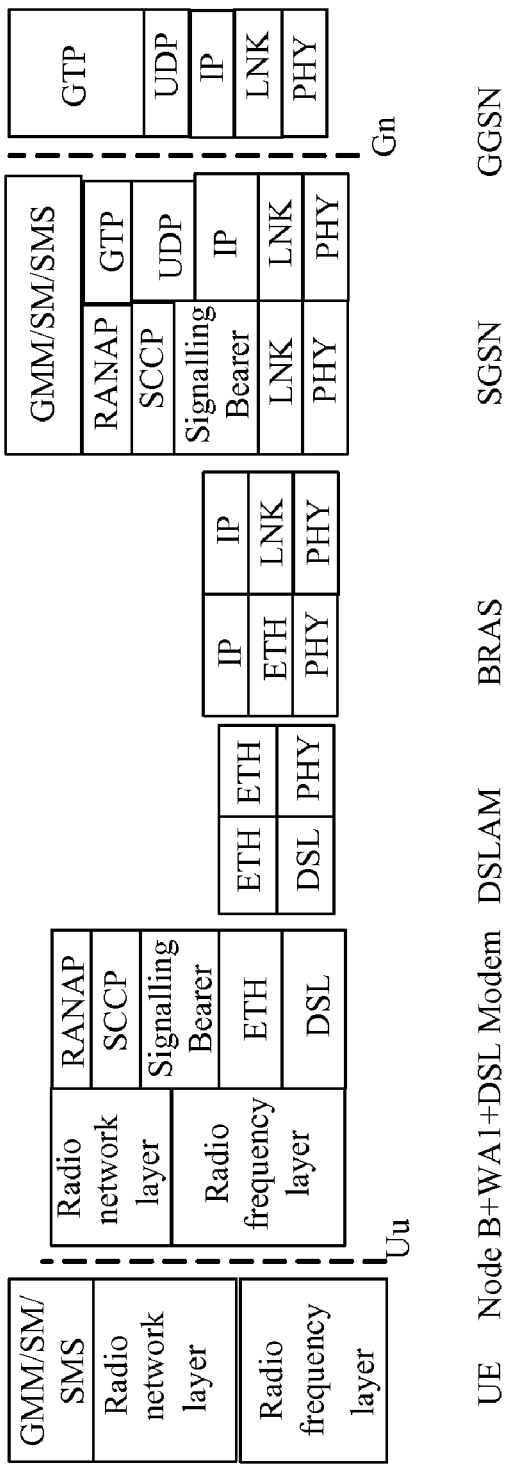
FIG. 16 is a schematic illustrating another control plane protocol stack according to Mode 4 of the various embodiments shown in FIG. 4b.

FIGS. 15 and 16 show the structures of the protocol stacks of another user plane and another control plane respectively in Mode (4) in the various embodiments as shown in FIG. 4b. The difference between the protocol stacks shown in FIGS. 15 and 16 and the protocol stacks shown in FIGS. 13 and 14 is that, Node B+WA1 and DSL Modem are integrated into one logical entity, which is written as "Node B+WA1+DSL Modem". The change of the structure of the protocol stack makes the processing steps change accordingly. In the following, explanations of the differences from FIGS. 13 and 14 are given, and the steps that are the same are omitted.

For the user plane data on the uplink, UE sends a packet to UTRAN via the Uu interface, the RFL in the Node B+WA1+

DSL Modem in UTRAN receives the packet, removes the protocol header, reassembles the packet and decompresses the header, and forwards the packet to the CN via GTP tunnel. The GTP tunnel protocol, UDP and IP between the WA1 and the CN are borne on the DSL network. The detailed implementation process is as follows.

Node B+WA1+DSL Modem encapsulates a GTP/UDP/IP frame into Ethernet ETH frames, and modulates the ETH frames according to DOCSIS to convert the ETH frames to DSL physical frames suitable for transmission in twisted pair lines of the wired network, and sends the DSL physical frames to DSLAM via the twisted pair lines. The subsequent process is similar to that in FIG. 13. In other words, compared with FIG. 13, the user data can reach the CN via DSLAM and the BRAS.

Similarly, UE receives a packet sent from the CN to the UE by a reversed procedure.

For the control plane data on the uplink, UE sends a signaling message via the Uu interface to UTRAN. The RFL in the Node B+WA1+DSL Modem in the UTRAN receives the packet, removes the protocol header, reassembles the packet, sends the packet to the RRC protocol of the RNL, parses the signaling message, and performs corresponding processing, such as establishing connections and measurement reporting. For a GMM/SM/SMS message, Node B+WA1 forwards the corresponding message to the CN via the radio network layer (such as NANAP) and transport network layer of the Iu interface. The transport network layer of the Iu interface includes SCCP/M3UA/SCTP/IP/LNK/PHY. M3UA/SCTP/IP is the Signaling Bearer as shown in the FIG. 16. The radio network layer (such as NANAP) and the transport network layer (such as SCCP/M3UA/SCTP/IP) of the Iu interface between WA1 in Node B and the CN are borne on the DSL network, and the detailed implementation procedure is as follows.

Node B+WA1+DSL Modem encapsulates RANAP/SCCP/M3UA/SCTP/IP frames into ETH frames, and modulates the ETH frames according to DOCSIS to convert the ETH frames to DSL physical frames suitable for transmission in a twisted pair lines of the wired network, and sends the DSL physical frames to DSLAM via a twisted pair lines. The subsequent process is similar to that in FIG. 14. In other words, compared with FIG. 14, the control plane data can reach the CN via DSLAM and the BRAS.

Similarly, UE receives a signaling message sent from the CN to the UE by a reversed procedure.

Furthermore, for the various embodiments as shown in FIGS. 13-16, the SGSN and GGSN in the core network can be integrated into a new network element referred to as an IGSN. The process of IGSN is similar to that described in FIGS. 7 and 8, which will not be detailed.

Figure 17:
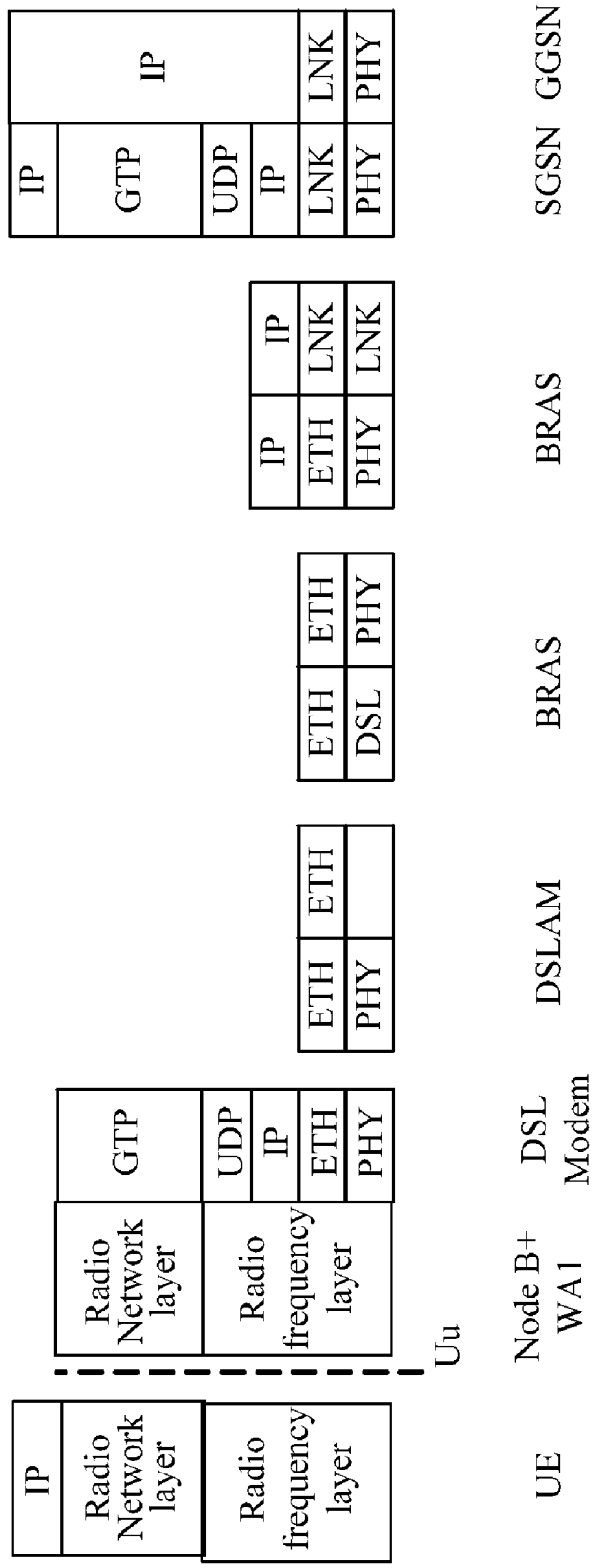
FIG. 17 is a schematic illustrating the user plane protocol stack according to Mode 4 of the various embodiments shown in FIG. 4b.
Figure 18:
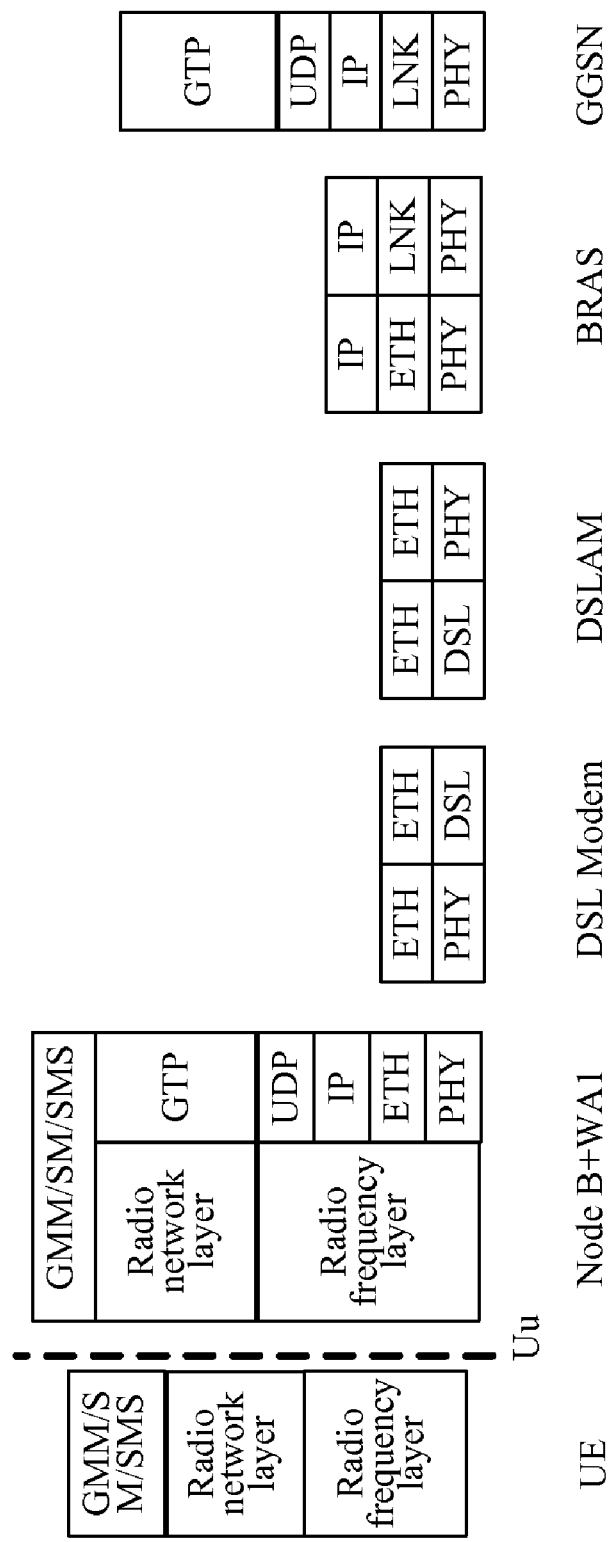
FIG. 18 is a schematic illustrating the control plane protocol stack according to Mode 5 of the various embodiments shown in FIG. 4b.

FIGS. 17 and 18 show the structures of the protocol stacks of the user plane and control plane respectively in Mode (5) in the various embodiments as shown in FIG. 4b. The difference between the protocol stacks shown in FIGS. 17 and 18 and the protocol stacks shown in FIGS. 13 and 14 is that, WA1 is equivalent to an RNC and an SGSN in function. In this way, GGSN processing is needed for the CN, and SGSN processing is not needed. The change of the structure of the protocol stack makes the processing steps change accordingly. In the following, explanations of the differences from FIGS. 13 and 14 are given, and the steps that are the same are omitted.

For the user plane data on the uplink: UE sends data to UTRAN via the Uu interface, because WA1 is equivalent to an RNC and an SGSN in function, the RFL in the Node B+WA1 in UTRAN receives the packet, removes the protocol header, reassembles the packet and decompresses the header, and forwards the packet to the CN via the Gn interface of the GTP tunnel. The GTP tunnel protocol, UDP and IP between the WA1 and the CN are borne on the DSL network.

In the CN, the GGSN performs protocol stack processing of the Gn interface. The data received from the GTP tunnel may be a user IP packet or PPP packet of the UE, and the GGSN sends the data in the form of IP packet or PPP packet to an external network.

Similarly, UE receives a packet sent from the CN to the UE by a reversed procedure.

For the control plane data on the uplink, UE sends a signaling message to the UTRAN via the Uu interface, because WA1 is equivalent to an RNC and an SGSN in function, the RFL of the Node B+WA1 in the UTRAN receives the packet, removes the protocol header, reassembles the packet, sends the data to RNL, and obtains the signaling message of the UE such as a GMM, SM, SMS message or RRC layer signaling message after the processing at the RNL layer. The user plane GTP tunnel is established, maintained or released via the control plane GTP protocol of the Gn interfaces between Node B+WA1 and the GGSN, and the GTP tunnel protocol, UDP and IP between Node B+WA1 and the GGSN are borne on the DSL network. The processing of the Gn interface protocol stack includes processings of GTP control plane (GTP-C), UDP, IP, LNK, and PHY layers.

Similarly, UE receives a signaling message sent from the CN to the UE by a reversed procedure.

As shown in FIG. 4c, WA1 is configured in the base station BS used for the control and management of the radio access. The BS connects with the reference point T in the DSL network through WA1, relays data in the radio communication network to the wired network via a DSL Modem. WA2 is configured and connected to the BRAS through reference point A10, and relays data in the DSL network to the core network. Therefore, the interconnection between the wired network and the radio network is achieved. In the interconnection method, the network elements BS, WA1 and DSL Modem can be logically separate or integrated, and the network elements the BRAS and WA2 can be logically separate or integrated.

For FIG. 4c, there are further three implementation modes as follows.

Mode (6): WA1 is equivalent to an RNC in function, and WA2 is equivalent to an SGSN in function, written as WA1=RNC, WA2=SGSN.

Mode (7): WA1 is equivalent to an RNC in function, and WA2 is equivalent to a GGSN in function, written as WA1=RNC, WA2=GGSN.

Mode (8): WA1 is equivalent to an RNC and an SGSN in function, and WA2 is equivalent to a GGSN in function, written as WA1=RNC+SGSN, WA2=GGSN;

The three modes are described respectively from the perspective of protocol stacks as follows.

Figure 19:
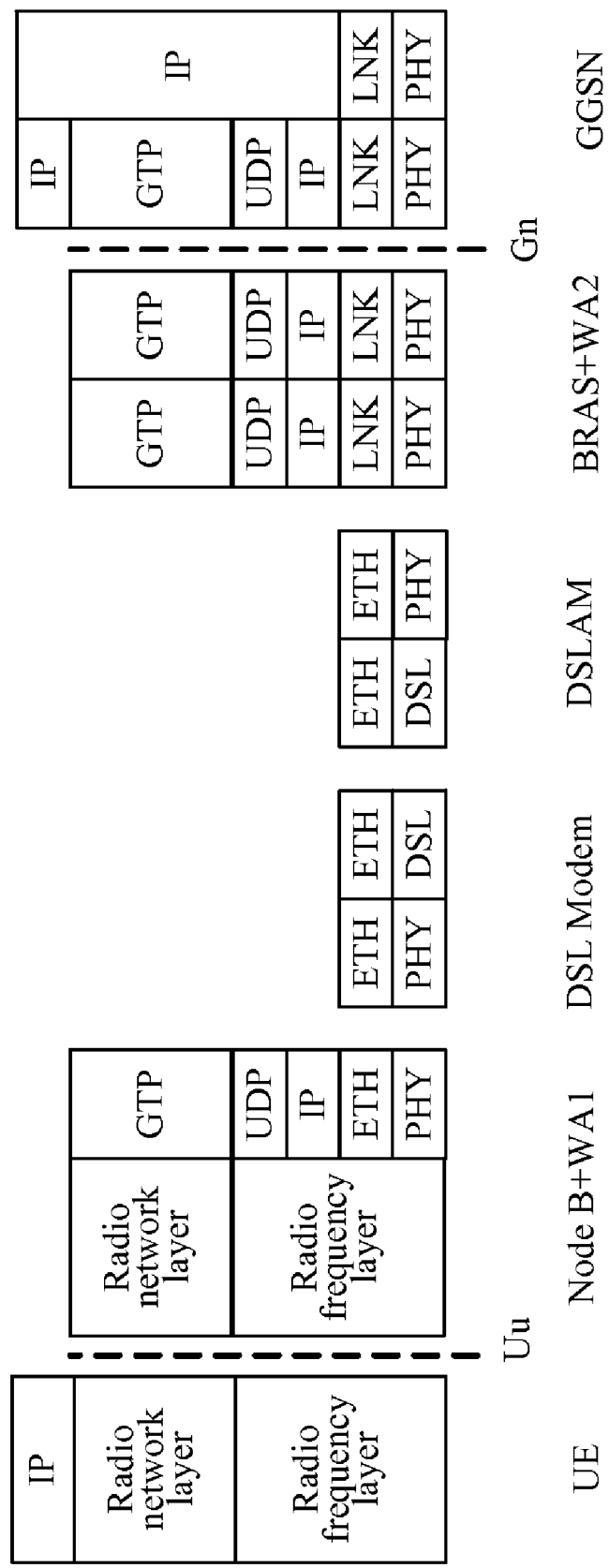
FIG. 19 is a schematic illustrating the user plane protocol stack according to Mode 6 of the various embodiments shown in FIG. 4c.
Figure 20:
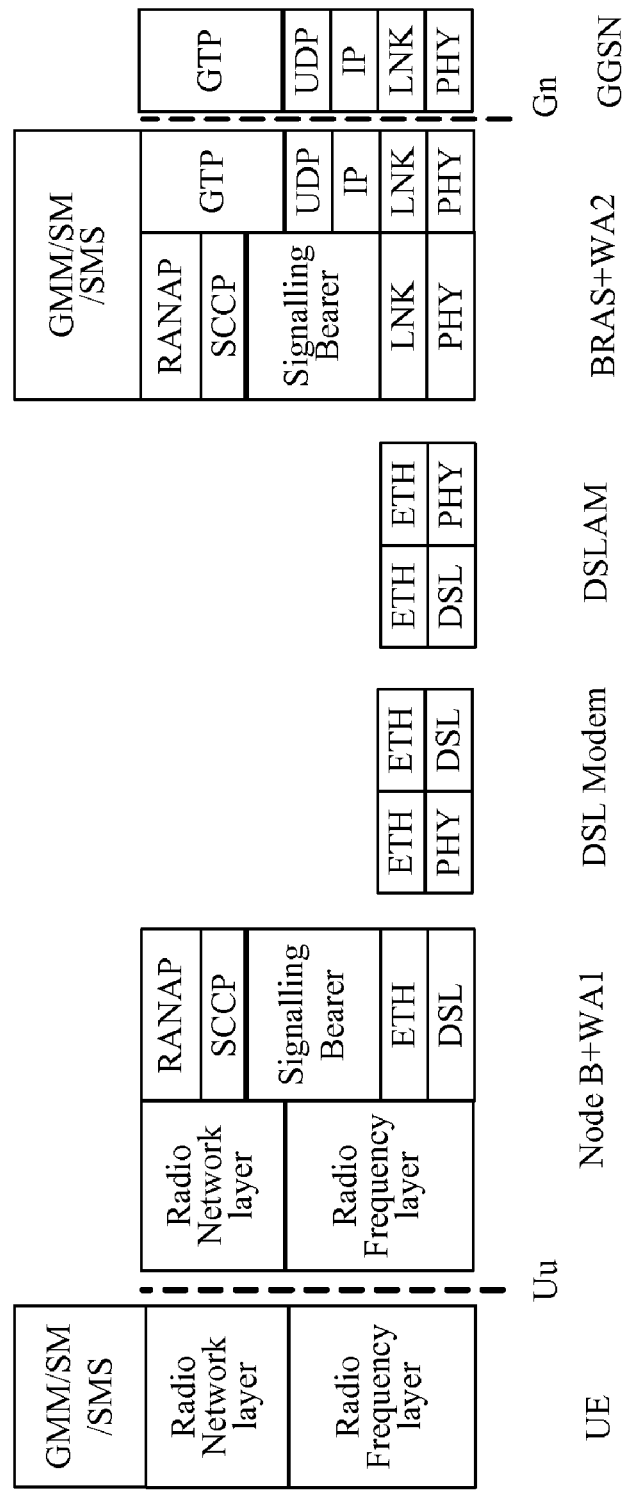
FIG. 20 is a schematic illustrating the control plane protocol stack according to Mode 6 of the various embodiments shown in FIG. 4c.

FIGS. 19 and 20 show the structures of the protocol stacks of the user plane and control plane respectively in Mode (6) in the various embodiments as shown in FIG. 4c. In this embodiment, WA1 is configured within Node B. The Node B with a WA1 is referred to as Node B+WA1. The BRAS and WA2 are configured as an integrated logical entity, which is referred to as BRAS+WA2.

For the user plane data on the uplink, the data of the application layer of the UE is encapsulated into a packet and sent to the RNL, and the packet may be an IP packet or a PPP packet of the user. RNL compresses the header of the packet, adds a header, such as RLC/MAC header, according to the protocol, and sends the packet to the RFL in the physical layer. RFL encodes and modulates the packet and sends the packet to UTRAN via the Uu interface. Because WA1 is equivalent to an RNC in function and WA2 is equivalent to an SGSN in function, in response to the packet, the RFL in the Node B+WA1 in UTRAN removes the protocol header, reassembles the packet and decompresses the header, and forwards the packet to the BRAS+WA2 via the Iu interface of a GTP tunnel. The GTP tunnel protocol, UDP and IP between the Iu interfaces of the WA1 and WA2 are borne on the DSL network. Specifically, the transmission between WA1 and WA2 can be implemented by a layer-2 bridging technique or a layer-3 routing technique. For the protocol stack shown in FIG. 19, the detailed implementation procedure is as follows.

Node B+WA1 encapsulates a GTP/UDP/IP frame into ETH frames and sends the ETH frames to DSL Modem via the wire line in the Ethernet physical layer PHY. The Ethernet PHY of the DSL Modem decapsulates the data to ETH frames, and performs DOCSIS modulation to convert the ETH frames to DSL physical frames suitable for transmission in a twisted pair lines in the wired network, and sends the DSL physical frames to DSLAM via a twisted pair lines. DSLAM demodulates the DSL physical frames according to DOCSIS to obtain the ETH frames, and sends the ETH frames to the BRAS+WA2 for further processing by bearing the ETH frames on the Ethernet PHY between DSLAM and the BRAS.

The BRAS+WA2 obtains ETH frames from Ethernet PHY, obtains IP packets after processing the Ethernet MAC headers in the ETH frames, obtains UDP packets after IP routing, and then the BRAS+WA2 receives data from the GTP tunnel on the Iu interface and sends the data to the CN via the GTP tunnel on the Gn interface.

In the CN, the data received by the GGSN from the GTP tunnel on the Gn interface may be a user IP packet or PPP packet of the UE, and the GGSN sends the data in the form of IP packet or PPP packet to an external network via the Gi interface. For DSL data services, the BRAS+WA2 performs IP/LINK/PHY processing on the data.

Similarly, UE receives a packet sent from the CN to the UE by a reversed procedure.

For the control plane data on the uplink, UE encapsulates in the RNL a signaling message, such as a GMM, SM, SMS message or RRC layer signaling message into a packet, the RLC adds a header according to the protocol, such as RLC/MAC header, and sends the packet to the RFL in the physical layer, and the RFL encodes and modulates the packet and sends the packet to UTRAN via the Uu interface. In response to the packet, the RFL in the Node B+WA1 in UTRAN removes the protocol header, reassembles the packet and sends the data to the RRC protocol of the RNL, parses the signaling message and performs corresponding processing, such as connection establishment and measurement reports. For a GMM/SM/SMS message, Node B+WA1 forwards the corresponding messages to Node B+WA2 via the radio network layer (such as NANAP) and transport network layer of the Iu interface. The transport network layer of the Iu interface includes SCCP/M3UA/SCTP/IP/LNK/PHY. M3UA/SCTP/IP is the Signaling Bearer as shown in the FIG. 20. The radio network layer (such as NANAP) and the transport network layer (such as SCCP/M3UA/SCTP/IP) of the Iu interfaces between WA1 and WA2 are borne on the DSL network. Specifically, the transmission between WA1 and WA2 can be implemented by a layer-2 bridging technique or a layer-3 routing technique. For the protocol stack shown in FIG. 20, the detailed implementation procedure is as follows.

Node B+WA1 encapsulates a RANAP/SCCP/M3UA/SCTP/IP frame into ETH frames, sends the ETH frames to DSL Modem by bearing the ETH frames on the Ethernet PHY between Node B+WA1 and DSL Modem. DSL Modem obtains the ETH frames after PHY processing, and modulates the frames according to DOCSIS to convert the ETH frames to DSL physical frames suitable for transmission over twisted pair lines, and sends the DSL physical frames to DSLAM via a twisted pair lines. DSLAM obtains the ETH frames by demodulating the DSL physical frames according to DOCSIS, and sends the ETH frames to the BRAS+WA2 for further processing by bearing the ETH frames on the Ethernet PHY between DSLAM and the BRAS.

The BRAS+WA2 obtains ETH frames from Ethernet PHY, obtains IP packets after processing the Ethernet MAC headers in the ETH frames, obtains UDP packets after IP routing, and then the BRAS+WA2 performs transport network layer and radio network layer processing of the Iu interface, and obtains the GMM/SM/SMS messages from RANAP. For DSL data services, the BRAS performs IP/LINK/PHY processing on the data.

Similarly, UE receives a signaling message sent from the CN to the UE by a reversed procedure.

Figure 21:
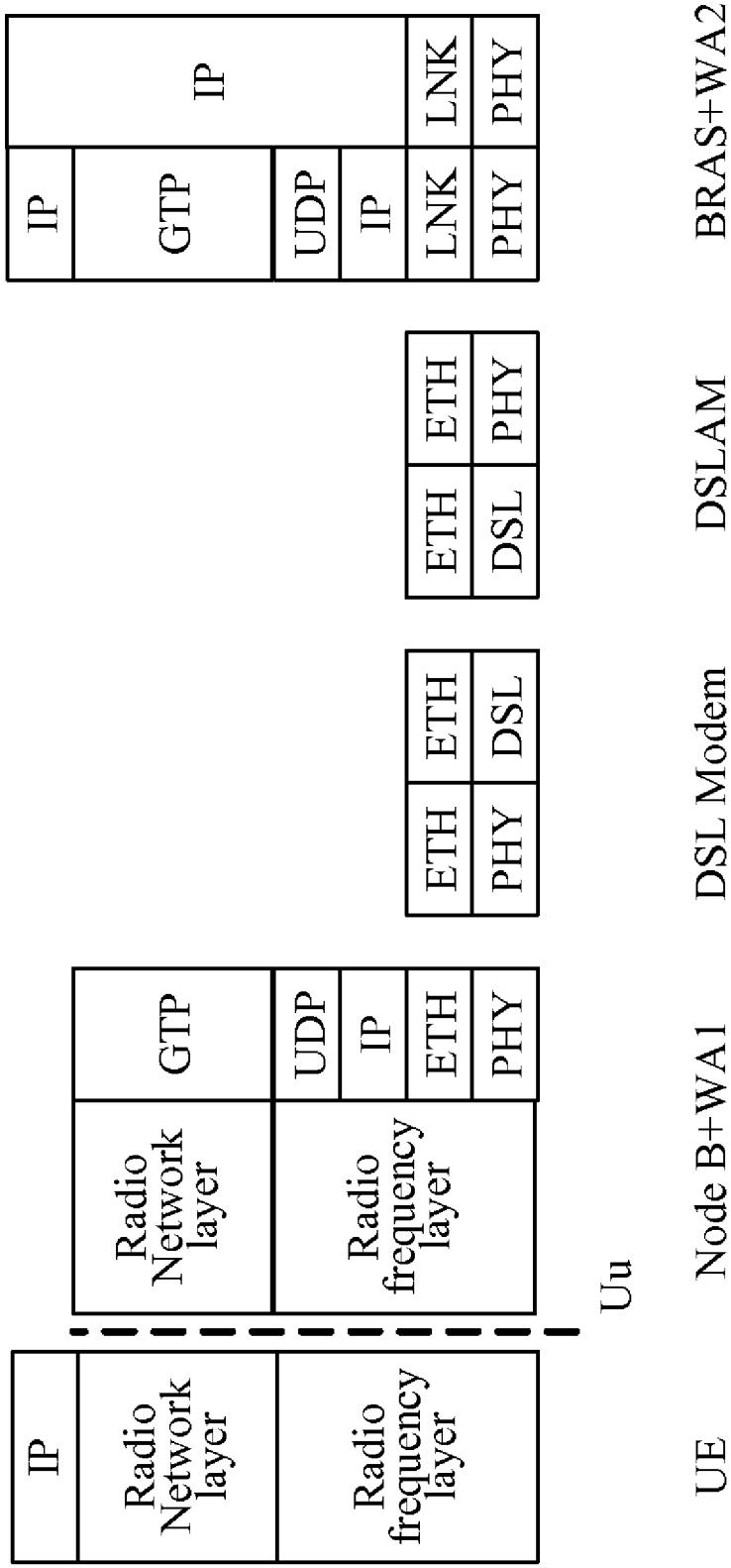
FIG. 21 is a schematic illustrating the user plane protocol stack according to Mode 7 of the various embodiments shown in FIG. 4c.
Figure 22:
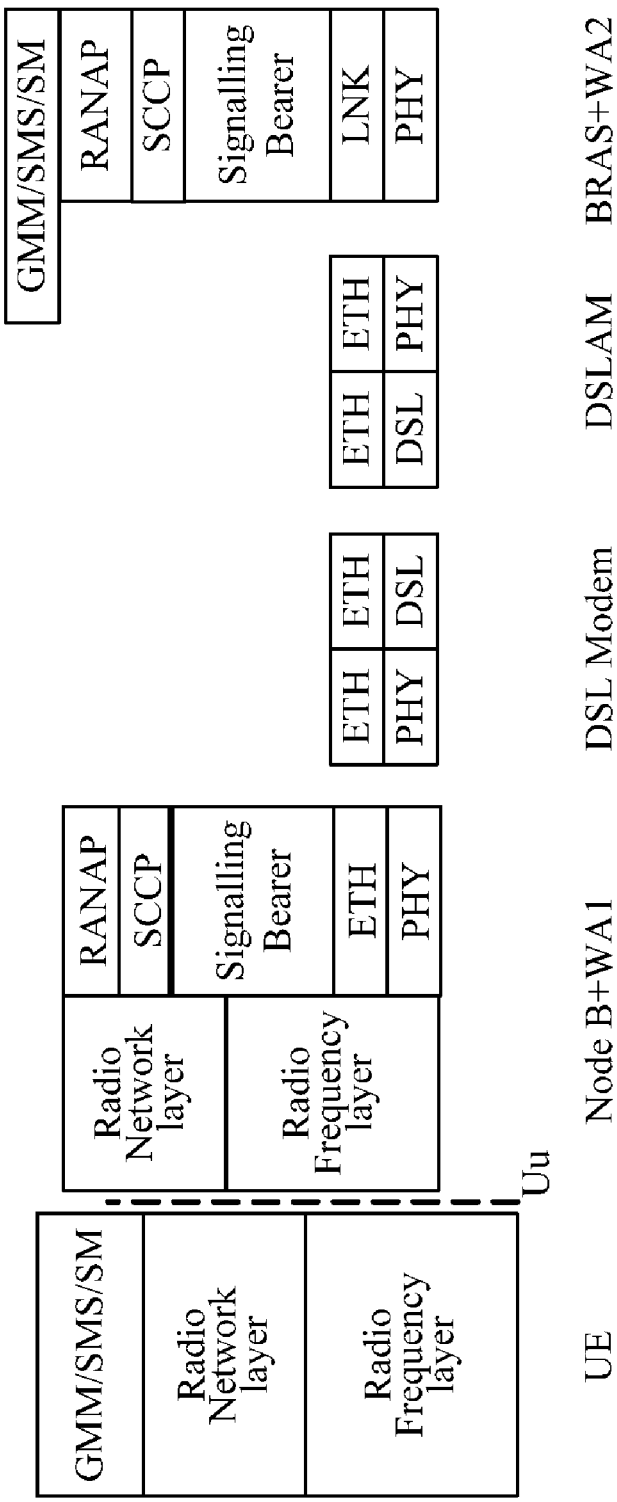
FIG. 22 is a schematic illustrating the control plane protocol stack according to Mode 7 of the various embodiments shown in FIG. 4c.

FIGS. 21 and 22 show the structures of the protocol stacks of the user plane and control plane respectively in Mode (7) in the various embodiments as shown in FIG. 4c. The difference between the protocol stacks shown in FIGS. 21 and 22 and the protocol stacks shown in FIGS. 19 and 20 is that, WA2 is equivalent to an SGSN and a GGSN in function. In this way, SGSN and GGSN processing is not needed for the CN. The change of the structure of the protocol stack makes the processing steps change accordingly. In the following, explanations of the differences from FIGS. 19 and 20 are given, and the steps that are the same are omitted.

For the user plane data on the uplink, the BRAS+WA2 obtains ETH frames after processing in Ethernet PHY, obtains IP packets after processing Ethernet MAC headers in the ETH frames, obtains UDP packets after IP routing, and then the BRAS+WA2 receives packets from the GTP tunnel on the Iu interface, performs the transport network layer and the radio network layer of the Iu interface, obtains IP packets or PPP packets of the UE, and sends the packets to an external network via the network elements in the CN. The processing of the transport network layer of the Iu interface includes processings of GTP user plane (GTP-U), UDP, IP, LNK, and PHY layers. The radio network layer of the Iu interface is the Iu UP protocol, which is used for transmitting user data related to RAB.

In the CN, SGSN and GGSN processing is not performed, and routing is done.

Similarly, UE receives a packet sent from the CN to the UE by a reversed procedure.

For the control plane data on the uplink, the BRAS+WA2 obtains ETH frames after Ethernet PHY processing, the BRAS+WA2 de-encapsulates the ETH frames in LNK to obtain data in the signaling bearing layer, converts the data into SCCP frames. Because the SCCP framing protocol of the Iu interfaces between WA1 and WA2 is borne on the DSL network, it can be considered as WA2 obtaining the SCCP frames from the Iu interface. WA2 then de-encapsulates the SCCP frames to obtain packets in RNL, such as RANAP. WA2 processes the packets according to RANAP protocol and obtains the signaling messages of the UE such as GMM, SM, and SMS messages. The transport network layer of the Iu interface includes SCCP, signaling bearer, LNK and PHY, and the radio network layer of the Iu interface includes RANAP.

In the CN, SGSN and GGSN processing is not performed, and routing is done.

Similarly, UE receives a signaling message sent from the CN to the UE by a reversed procedure.

Figure 23:
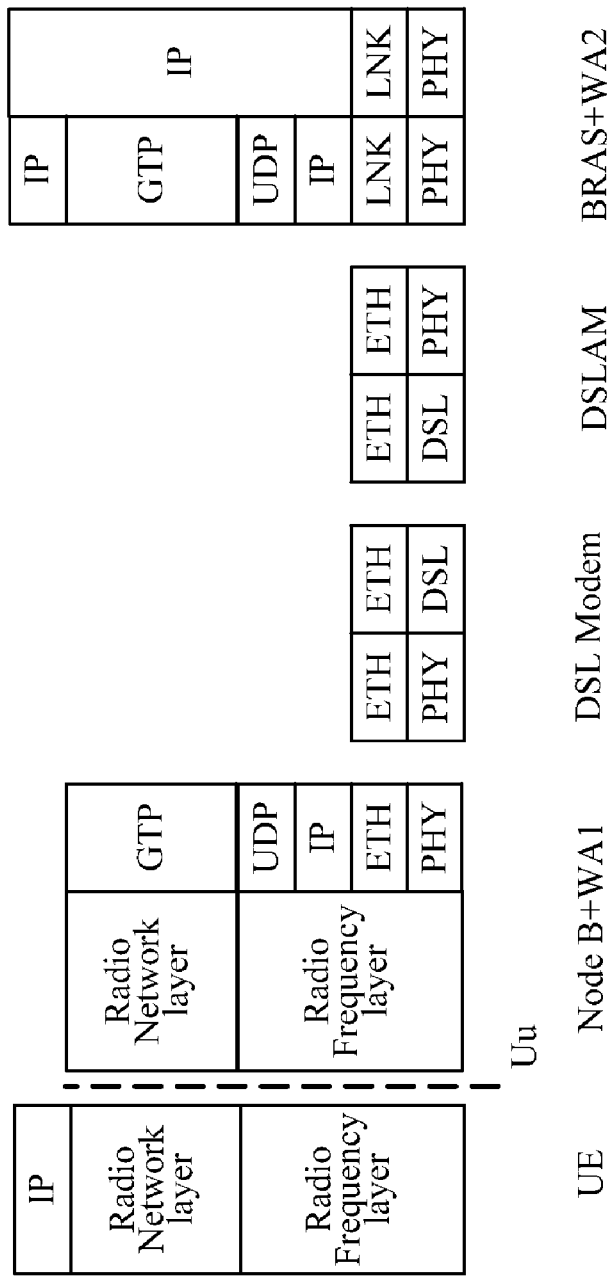
FIG. 23 is a schematic illustrating the user plane protocol stack Mode 8 of the various embodiments shown in FIG. 4c.
Figure 24:
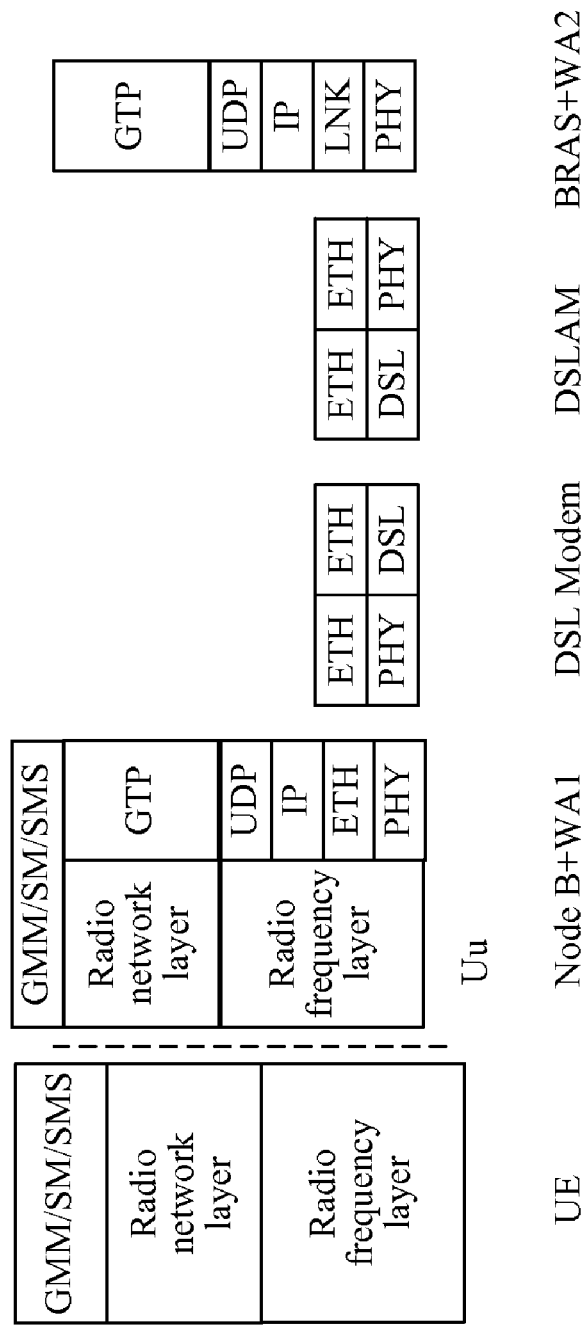
FIG. 24 is a schematic illustrating the control plane protocol stack according to Mode 8 of the various embodiments shown in FIG. 4c

FIGS. 23 and 24 show the structures of the protocol stacks of the user plane and control plane respectively in Mode (8) in the various embodiments as shown in FIG. 4c. The difference between the protocol stacks shown in FIGS. 23 and 24 and the protocol stacks shown in FIGS. 21 and 22 is that, WA1 is equivalent to an RNC and an SGSN in function, and WA2 is equivalent to a GGSN in function. In this way, SGSN and GGSN processing is not needed for the CN. The change of the structure of the protocol stack makes the processing steps change accordingly. In the following, explanations of the differences from FIGS. 21 and 22 are given, and the steps that are the same are omitted.

For the user plane data on the uplink, the UE sends data to UTRAN via the Uu interface, because WA1 is equivalent to an RNC and an SGSN in function, the RFL in the Node B+WA1 in UTRAN receives the packet, removes the protocol header, reassembles the packet and decompresses the header, and forwards the packet to WA2 via the Gn interface of the GTP tunnel. The GTP tunnel protocol, UDP and IP between WA1 and WA2 are borne on the DSL network.

WA2 performs protocol stack processing of the Gn interface. The data received from the GTP tunnel may be a user IP packet or PPP packet of the UE, and WA2 sends the data in the form of IP packet or PPP packet to the CN.

In the CN, SGSN and GGSN processing is not performed, and routing is done.

Similarly, UE receives a packet sent from the CN to the UE by a reversed procedure.

For the control plane data on the uplink, the UE sends a signaling message to the UTRAN via the Uu interface, because WA1 is equivalent to an RNC and an SGSN in function, the RFL of the Node B+WA1 in the UTRAN receives the packet, removes the protocol header, reassembles the packet, sends the data to RNL, and WA2 obtains the signaling message of the UE, such as GMM, SM, SMS messages or RRC layer signaling message, after the processing at the RNL layer. The user plane GTP tunnel is established, maintained or released via the control plane GTP protocol of the Gn interfaces between Node B+WA1 and WA2. The GTP tunnel protocol, UDP and IP between Node B+WA1 and the BRAS+ WA2 are borne on the DSL network. The Gn interface protocol stack includes GTP control plane (GTP-C), UDP, IP, LNK, and PHY layers.

In the CN, SGSN and GGSN processing is not performed, and routing is done.

Furthermore, for the various embodiments shown in FIGS. 19-24, the BRAS and WA2 can be independent of each other. In other words, the BRAS and WA2 are two independent logical entities.

Figure 25A:
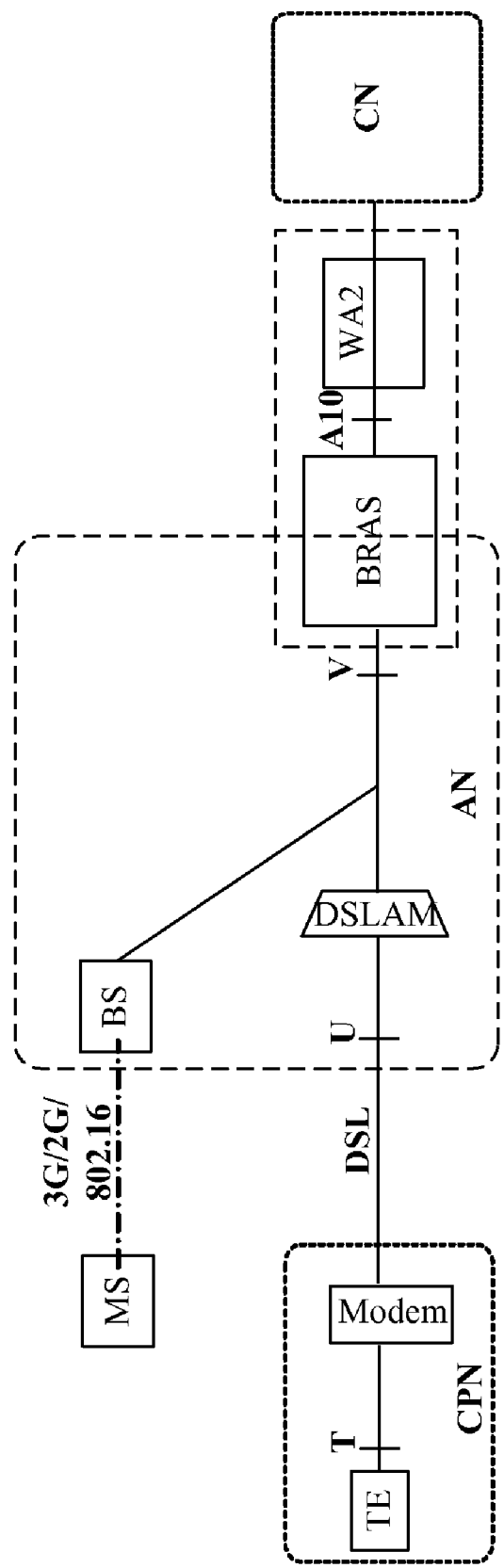
FIG. 25a is a schematic of the interconnection between a DSL network and a radio communication network according to various embodiments of the present disclosure.
Figure 25B:
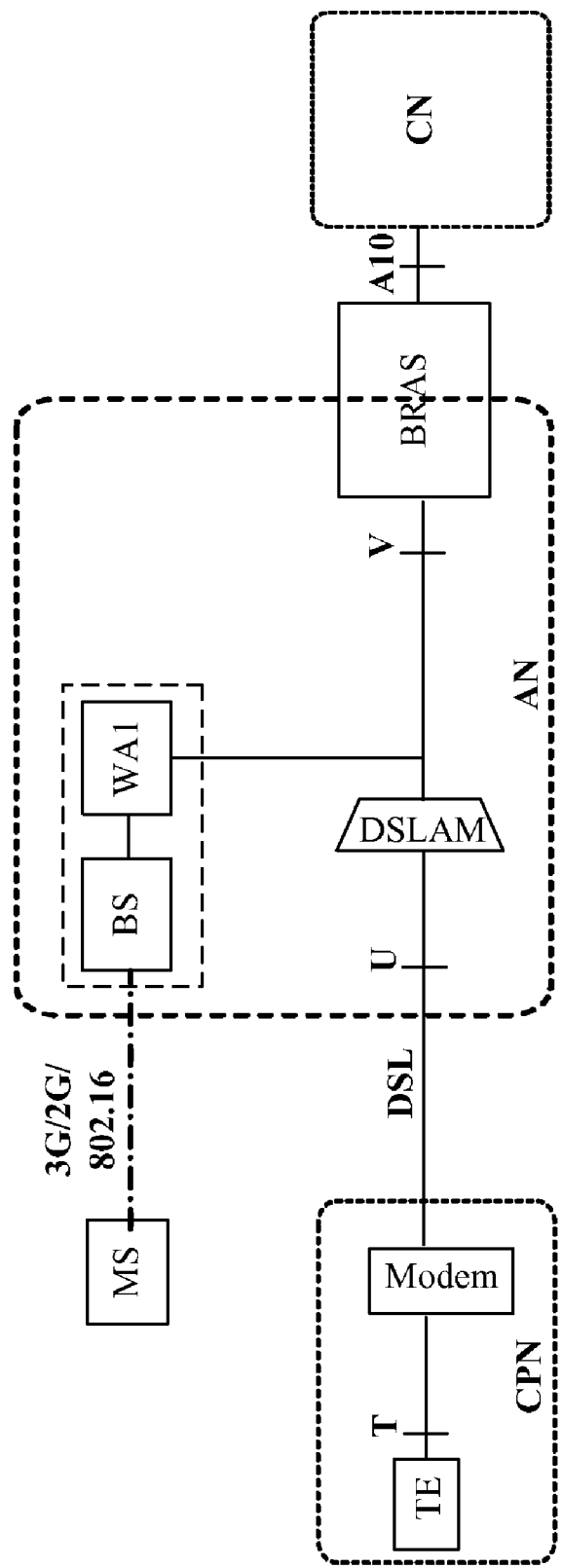
FIG. 25b is a schematic of the interconnection between a DSL network and a radio communication network according to various embodiment of the present disclosure.
Figure 25C:
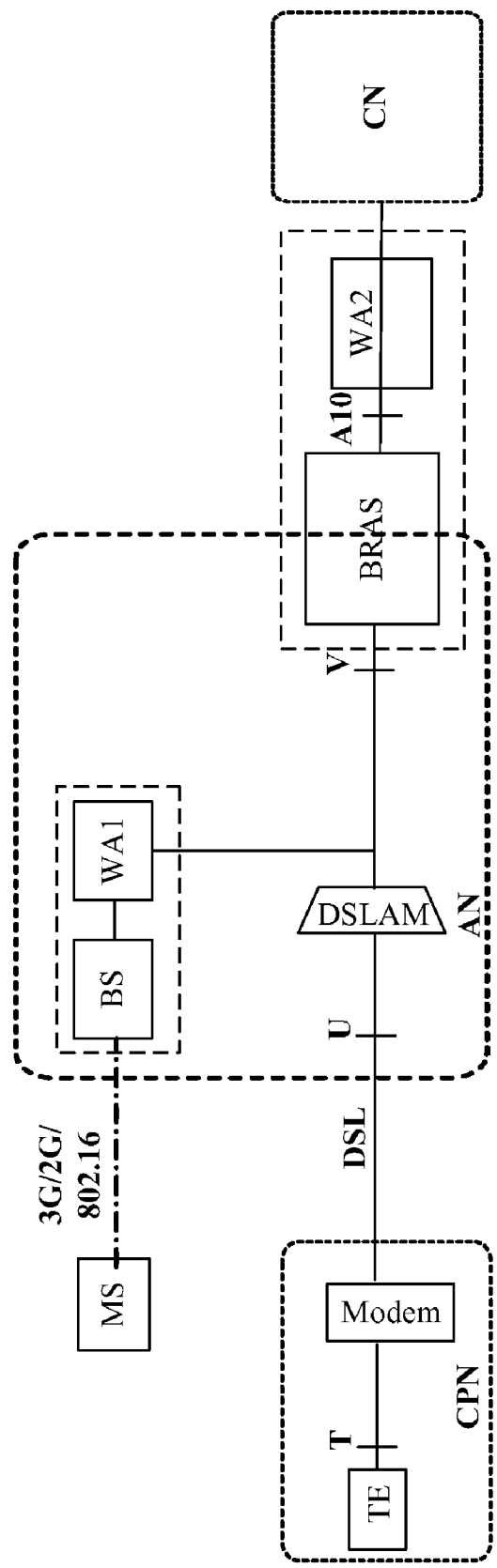
FIG. 25c is a schematic of the interconnection between a DSL network and a radio communication network according to various embodiments of the present disclosure.

Interconnection Scheme 2:

FIGS. 25a, 25b and 25c show three various embodiments of the present disclosure, according to the various embodiments, the BS or WA1 in the radio communication network interconnects with the DSL network at reference point V in the DSL network, and WA2 or CN of the radio communication network interconnects the BRAS at reference point A10, Therefore, the interconnection between the radio communication network and the DSL network is achieved. This scheme is a loosely coupled scheme, which can support unified billing, unified customer care, and unified authentication. The differences among the three various embodiments are that, the embodiments shown in FIG. 25a involve WA2, the embodiments shown in FIG. 25b involve WA1, and the embodiments shown in FIG. 25c involve WA1 and WA2.

In FIGS. 25a, 25b, and 25c, in data communication, the UE establishes an RRC connection via the control plane protocol stack, negotiates with the core network, and sets up an RAB.

The RAB setup process is accompanied by the establishment of the user plane RB. After RAB is successfully established, the user will be able to transmit data via the established user plane bearer. The compression and decompression functions of the PDCP can be active or inactive. Signaling setup process on the control plane begins after the RRC connection between the UE and the UTRAN is successfully established, where the UE establishes a signaling connection to the CN through the RNC, which is also called a "NAS signaling setup", and the signaling connection is used for NAS signaling interaction between the UE and the CN for NAS information, such as authentication, service request, and connection establishment. The user plane data and control plane data transmission procedures in which the compression and decompression functions being active are described as follows. The RNL of the Uu interface includes PDCP, RLC and MAC on the user plane, and RRC, RLC and MAC on the control plane.

As shown in FIG. 25a, the base station BS used for the control and management of the radio access is connected with the reference point V in the DSL network, relays data in the radio communication network to the wired network via the BRAS, passing through the convergence network in the DSL network. WA2 is configured to be connected to the BRAS via reference point A10, and relays data in the DSL network to the core network. Therefore, the interconnection between the wired network and the radio network is achieved. In this interconnection mode, the network elements BS and WA2 can be logically separated or integrated.

For FIG. 25a, there are further three implementation modes as follows.

Mode (1): WA2 is equivalent to an RNC in function, written as WA2=RNC.

Mode (2): WA2 is equivalent to an RNC and an SGSN in function, written as WA2=RNC+SGSN.

Mode (3): WA2 is equivalent to an RNC, an SGSN, and a GGSN in function, written as WA2=RNC+SGSN+GGSN.

The three modes are described respectively from the perspective of protocol stacks as follows.

Figure 26:
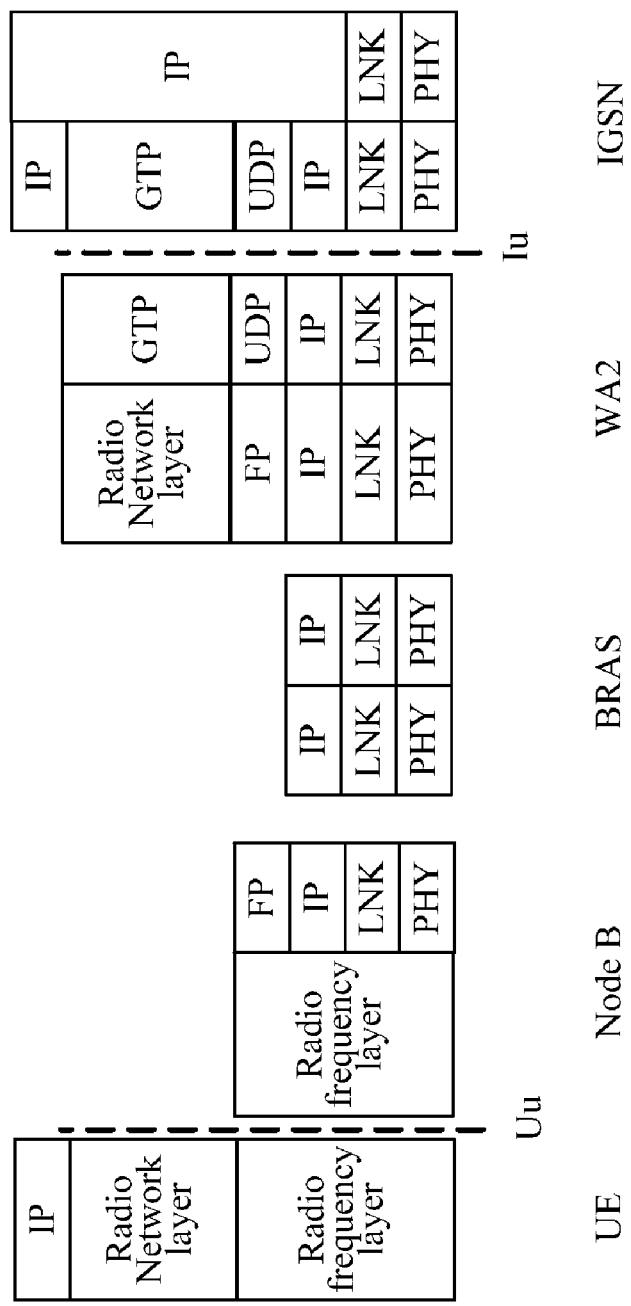
Figure 27:
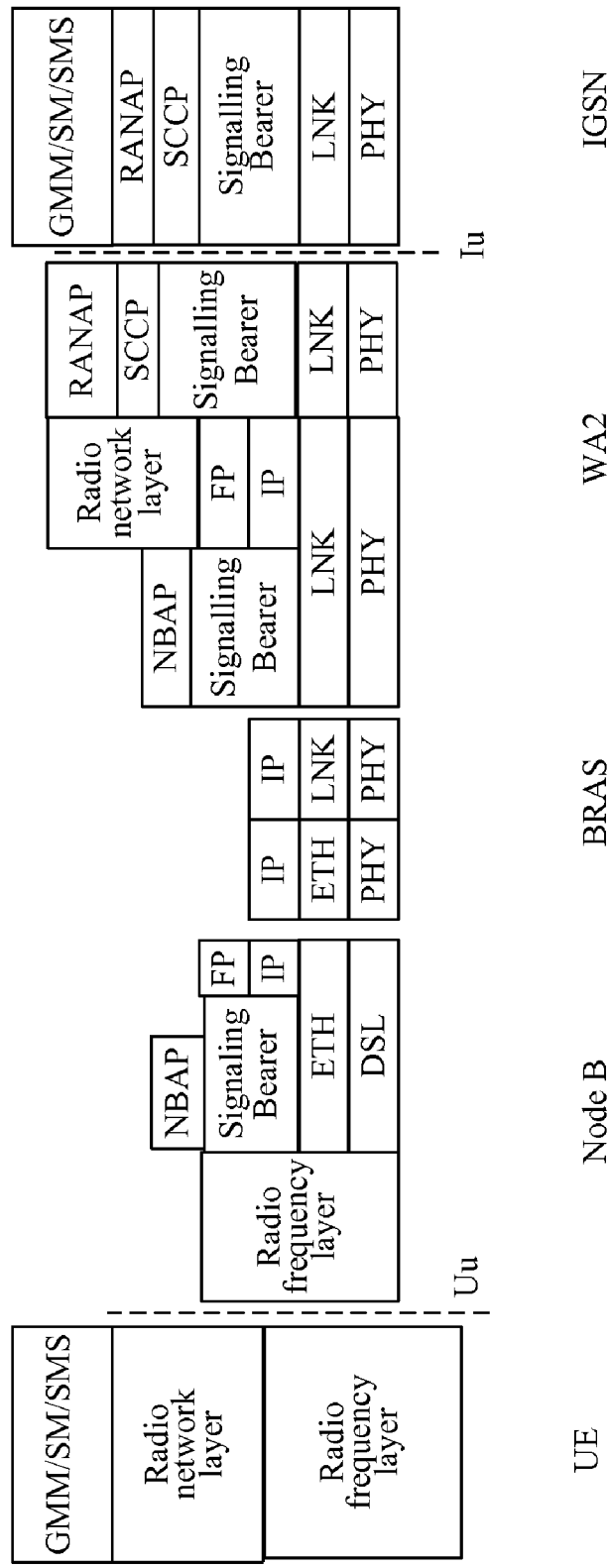

FIGS. 26 and 27 show the structures of the protocol stacks of the user plane and control plane respectively in Mode (1) in the various embodiments as shown in FIG. 25a. In various embodiments, the SGSN and GGSN in the CN are integrated into a new network element referred to as IGSN. According to the structures of the protocol stacks, the procedure is as follows.

For the user plane data on the uplink, the data of the application layer of the UE is encapsulated into a packet and sent to the RNL, and the packet may be an IP packet or a PPP packet of the user. RNL compresses the header of the packet, adds a header according to the protocol, such as RLC/MAC header, and sends the packet to the RFL in the physical layer. RFL encodes and modulates the packet and sends the packet to UTRAN via the Uu interface. The RFL in a Node B in the UTRAN receives the packet, encapsulates the packet into a framing protocol (FP) frame, adds an IP header to the FP frame (i.e., IP processing) to form an IP packet, and sends the IP packet (i.e., FP/IP frame) to WA2 via Iub interface. The FP/IP frames of the framing protocol between the Iub interfaces of Node B and WA2 are borne on the convergence network in the DSL network. For the protocol stack shown in FIG. 26, the detailed implementation procedure is as follows.

Node B encapsulates the FP/IP frame into ETH frames, and sends the ETH frames to the BRAS in the Ethernet PHY, via a convergence network in the DSL network. The BRAS converts the data received in Ethernet PHY to ETH frames, obtains IP packets by processing the Ethernet MAC headers in the ETH frames, re-encapsulates the IP packets in LINK, The BRAS sends the encapsulated data to WA2 for further processing by bearing the data on the physical layer PHY between the BRAS and WA2.

In this case, because WA2 is equivalent to a RNC in function, the processing on WA2 is similar to that of the user plane on existing RNC. Specifically, WA2 receives data from PHY, de-encapsulates the data in LNK to obtain an FP/IP frame, and converts the FP/IP frame into an FP frame. Because the FP/IP frame of the framing protocol between the Iub interfaces of Node B and WA2 is borne on the DSL network, it can be considered as WA2 obtaining the FP/IP frame from the Iub interface. WA2 de-encapsulates the FP/IP frame to obtain the packet in the RNL. WA2 processes the packet in the transport network layer and the radio network layer of the Iu interface, and sends the packet to a network element in the CN through GTP tunnel. The processing of transport network layer of the Iu interface includes processings of GTP user plane (GTP-U), UDP, IP, LNK, and PHY layers. The radio network layer of the Iu interface is the Iu UP protocol, which is used for transmitting user data related to RAB.

In the CN, the IGSN performs the transport network layer and radio network layer processing of the Iu interface. The data that the IGSN receives from the GTP tunnel may be a user IP packet or PPP packet of the UE. The IGSN then sends the data in the form of user IP packet or PPP packet to an external network.

Similarly, UE receives a packet sent from the CN to the UE by a reversed procedure.

For the control plane data on the uplink, the UE encapsulates in the RNL a signaling message into a packet, such as a GMM, SM, SMS message or RRC layer signaling message, the RNL adds a header according to the protocol, such as RLC/MAC header, and sends the packet to the RFL in the physical layer, and the RFL encodes and modulates the packet and sends the packet to UTRAN via the Uu interface. The RFL in the Node B in the UTRAN receives the packet and encapsulates the packet in a Iub interface radio network layer frame, such as FP frame, and sends the packet to WA2 via the transport network layer of the Iub interface, such as IP/ETH/PHY. The radio network layer (such as FP or NBAP) and the IP layer or signaling bearer layer of the transport network layer of the Iub interfaces between Node B and WA2 are borne on the convergence network of the DSL network. For the protocol stack shown in FIG. 27, the detailed implementation procedure is as follows.

Node B encapsulates the FP/IP frame or NBAP/SCTP/IP frame into ETH frames, and sends the ETH frames to the BRAS in the Ethernet PHY via the convergence network in the DSL network. The BRAS converts the data received in Ethernet PHY to ETH frames, obtains IP packets by processing the Ethernet MAC headers in the ETH frames, re-encapsulates the IP packets in LINK. The BRAS sends the encapsulated data to WA2 for further processing by bearing the data on the physical layer PHY between the BRAS and WA2.

Because WA2 is equivalent to t an RNC in function, the processing is similar to that of the RNC control plane in prior art. Specifically, WA2 receives data through PHY, de-encapsulates the data in LINK to obtain a FP/IP frame or signaling bearer layer data. For the FP/IP frame, a IP header is removed to obtain the FP frame, and for signaling bearer data, SCTP and IP processing are done to obtain an NBAP frame. Because the FP/IP frame or NBAP frame of the framing protocol between the Iub interfaces of Node B and WA2 are borne on the convergence network of the DSL network, it can be considered as WA2 obtaining the FP/IP frame or NBAP frame from the Iub interface. If WA2 receives an NBAP frame, the corresponding processing for that NBAP frame is implemented. If WA2 receives an FP/IP frame, WA2 removes the IP header from the FP/IP frame to obtain the FP frame, and de-encapsulates the FP frame to obtain the packet in RNL. WA2 processes the packet in the transport network layer and radio network layer of the Iu interface, and sends the packet to a network element in the CN. The processing of the transport network layer of the Iu interface includes processings of SCCP, signaling bearer, LNK and PHY. The processing of the radio network layer of the Iu interface includes RANAP processing.

In the CN, the IGSN performs the transport network layer and the radio network layer of the Iu interface, obtains a signaling message of the UE, such as a GMM, SM and SMS message, and performs subsequent processing according to prior art.

Similarly, UE receives a signaling message sent from the CN to the UE by a reversed procedure.

Figure 28:
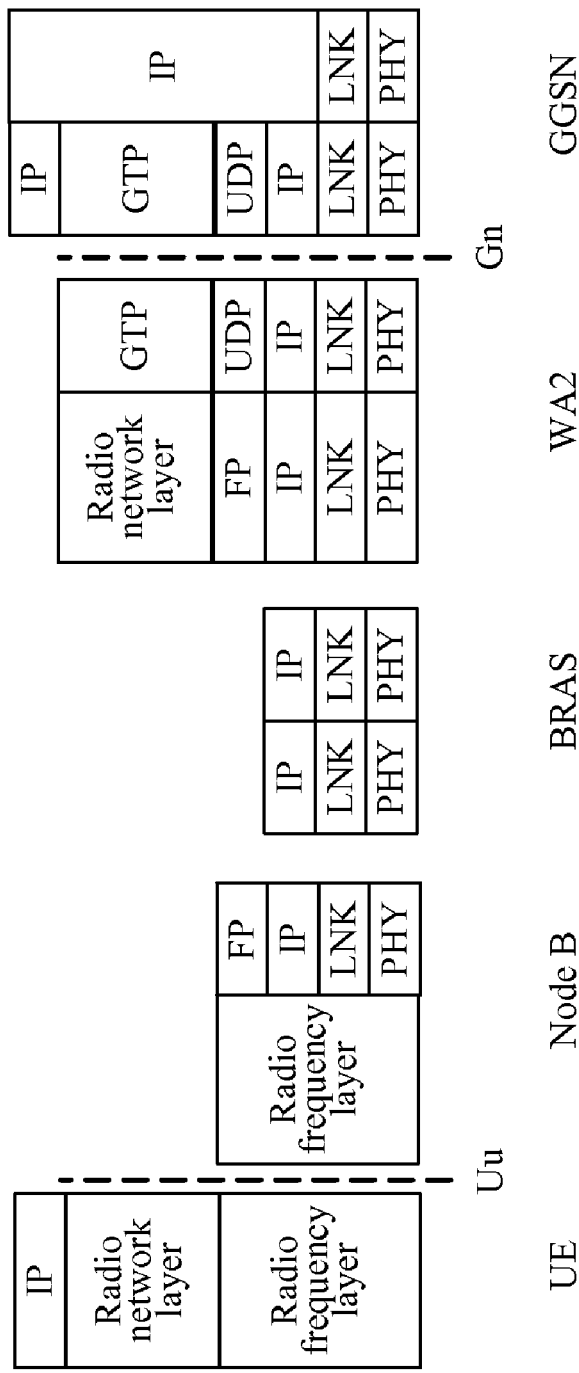
Figure 29:
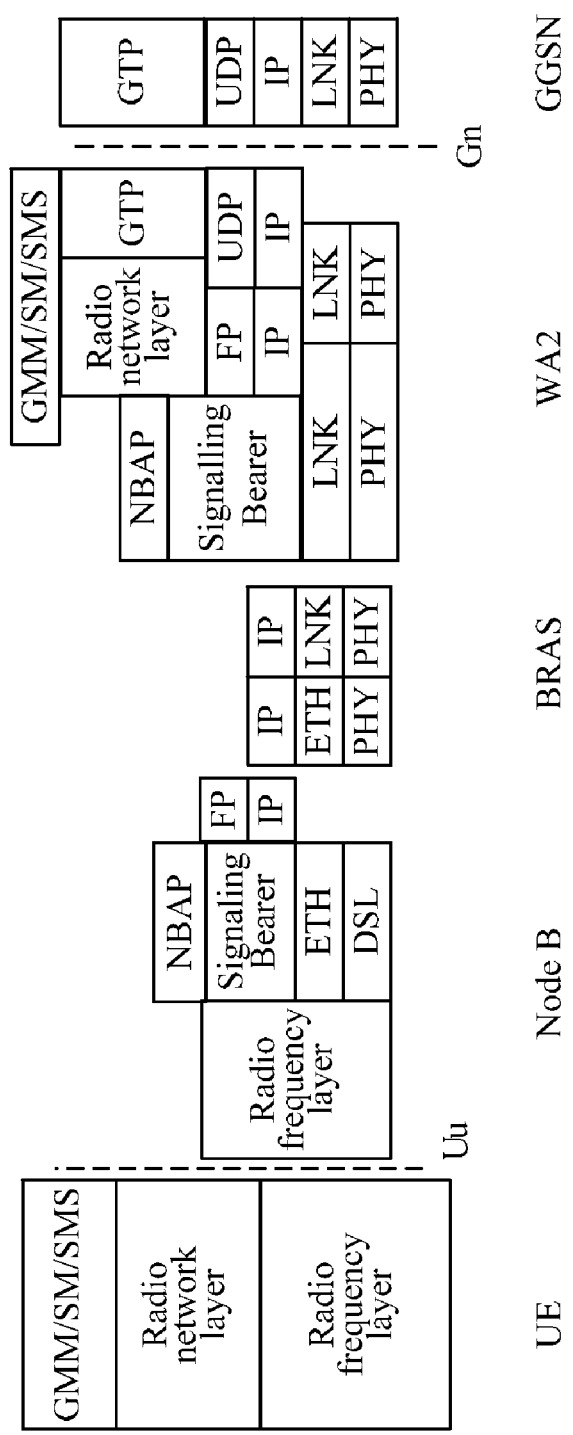

FIGS. 28 and 29 show the structures of the protocol stacks of the user plane and control plane respectively in Mode (2) in the various embodiments as shown in FIG. 25a. The difference between the protocol stacks shown in FIGS. 28 and 29 and the protocol stacks shown in FIGS. 26 and 27 is that, WA2 is equivalent to an RNC and an SGSN in function. In this way, GGSN processing is needed for the CN, and SGSN processing is not needed. The change of the structure of the protocol stack makes the processing steps change accordingly. In the following, explanations of the differences from FIGS. 26 and 27 are given, and the steps that are the same are omitted.

For the user plane data on the uplink, WA2 receives data from PHY, de-encapsulates the data in LNK to obtain an FP/IP frame, and converts the FP/IP frame into an FP frame. Because the FP/IP frame of the framing protocol between the Iub interfaces of Node B and WA2 is borne on the convergence network in the DSL network, it can be considered as WA2 obtaining the FP/IP frame from the Iub interface. WA2 then de-encapsulates the FP/IP frame to obtain the packet in the RNL. WA2 processes the packet in the protocol stack of the Gn interface, and sends the packet to a network element in the CN through GTP tunnel. The processing of Gn interface protocol stack includes processings of GTP user plane (GTP-U), UDP, IP, LNK, and PHY layers.

In the CN, the GGSN performs protocol stack processing of the Gn interface. The data received from the GTP tunnel may be a user IP packet or PPP packet of the UE, and the GGSN sends the data in the form of IP packet or PPP packet to an external network.

Similarly, UE receives a packet sent from the CN to the UE by a reversed procedure.

For the control plane data on the uplink, WA2 receives data through PHY, de-encapsulates the data in LINK to obtain a FP/IP frame or signaling bearer layer data. For the FP/IP frame, IP header is removed to obtain the FP frame, and for signaling bearer data, SCTP and IP processing are done to obtain an NBAP frame. Because the FP/IP frame or NBAP frame of the framing protocol between the Iub interfaces of Node B and WA2 are borne on the convergence network of the DSL network, it can be considered as WA2 obtaining the FP/IP frames or NBAP frames from the Iub interface. If WA2 receives an NBAP frame, WA2 processes the NBAP frame accordingly. If WA2 receives an FP/IP frame, WA2 de-encapsulate the FP/IP frame to obtain a packet in RNL. After processing in the RNL layer, WA2 obtains the signaling message of the UE, such as a GMM, SM, SMS message, or RRC layer signaling message, and processes the messages accordingly, such as connection establishment and measurement reports. In this way, WA2 completes the control plane functions of RNC, SGSN and GGSN. The user plane GTP tunnel between WA2 and GGSN is established, maintained or released through the Gn interface control plane protocol. The processing of the Gn interface protocol stack includes processings of GTP control plane (GTP-C), UDP, IP, LNK, and PHY layers.

Similarly, UE receives a signaling message sent from the CN to the UE by a reversed procedure.

Figure 30:
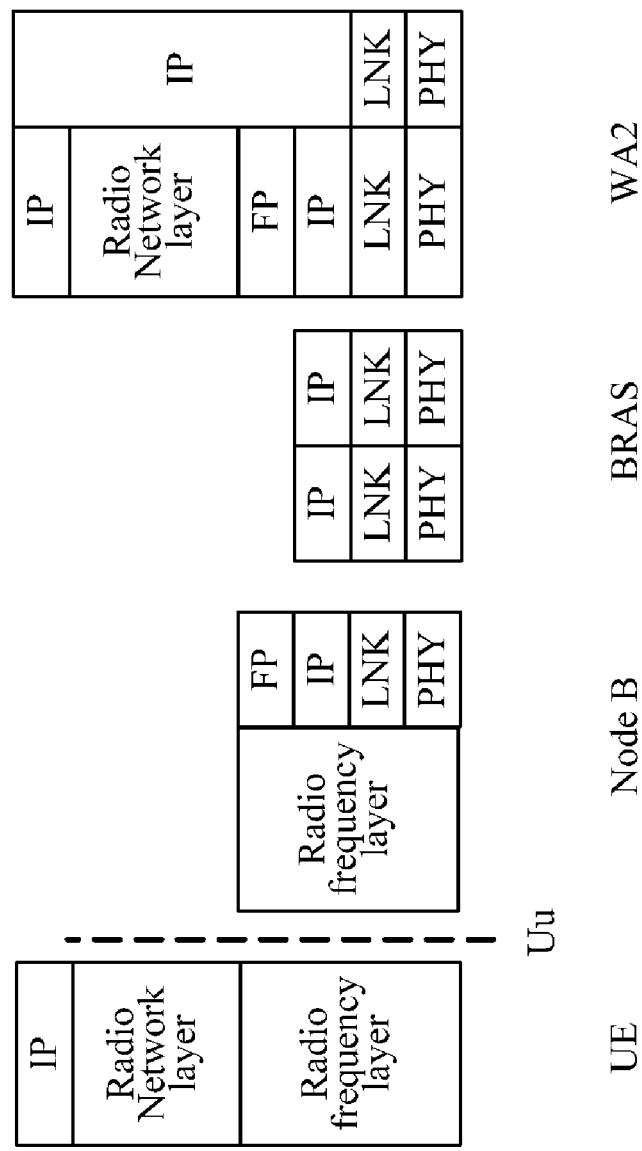
Figure 31:
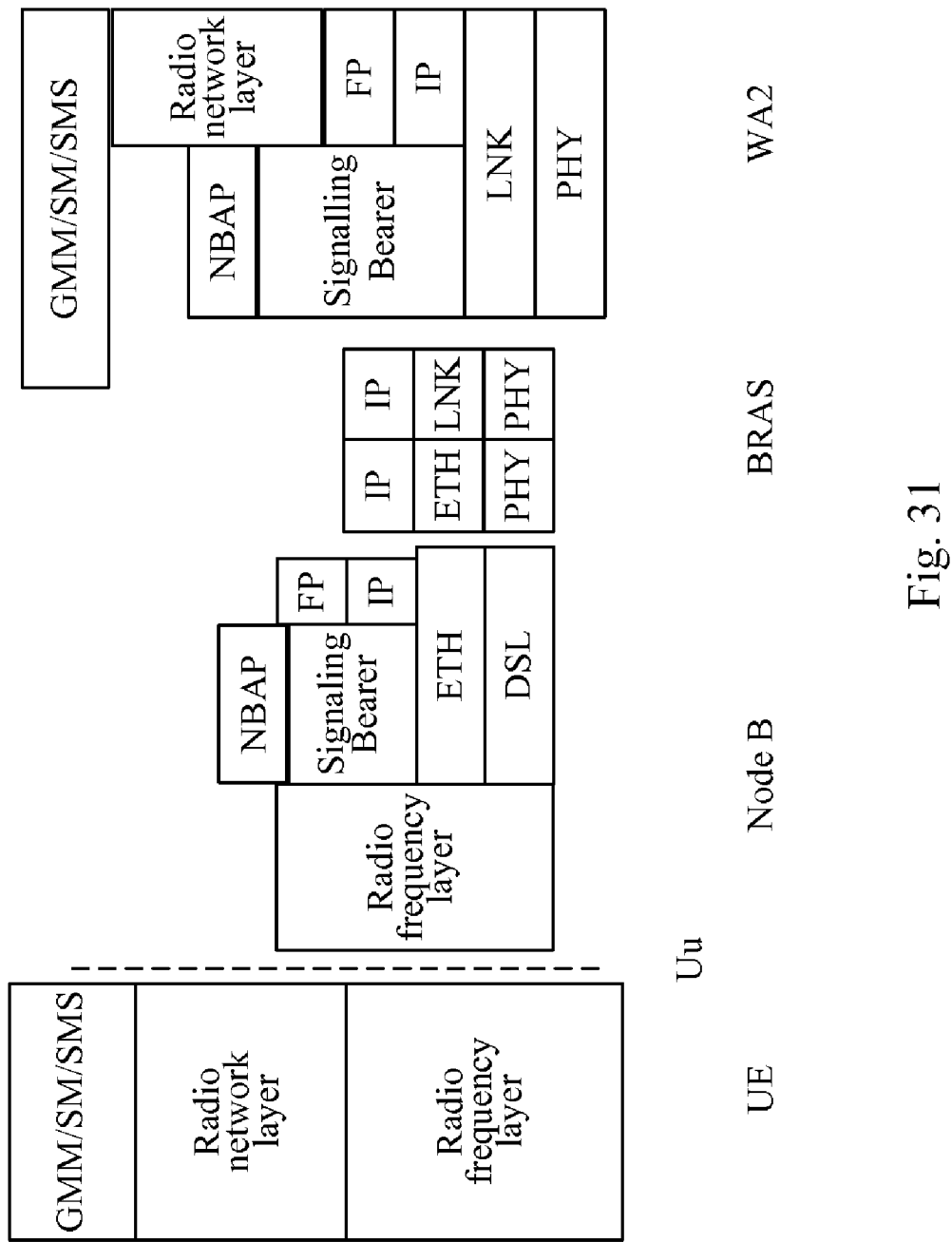

FIGS. 30 and 31 show the structures of the protocol stacks of the user plane and control plane respectively in Mode (3) in the various embodiments as shown in FIG. 25a. The difference between the protocol stacks shown in FIGS. 30 and 31 and the protocol stacks shown in FIGS. 26 and 27 is that, WA2 is equivalent to an RNC, an SGSN and a GGSN in function. In this way, the processing of SGSN and GGSN is not needed for the CN, and other processes are as normal. The change of the structure of the protocol stack makes the processing steps change accordingly. In the following, explanations of the differences from FIGS. 26 and 27 are given, and the steps that are the same are omitted.

For the user plane data on the uplink, WA2 receives data from PHY, de-encapsulates the data in LNK to obtain an FP/IP frame, and converts the FP/IP frame into an FP frame. Because the FP/IP frame of the framing protocol between the Iub interfaces of Node B and WA2 is borne on the convergence network in the DSL network, it can be considered as WA2 obtaining the FP/IP frame from the Iub interface. WA2 then de-encapsulates the FP/IP frame to obtain the packet in the RNL. WA2 routes the packet to an external network through the CN.

In the CN, SGSN and GGSN processing is not performed, and routing is done.

Similarly, UE receives a packets sent from the CN to the UE by a reversed procedure.

For the control plane data on the uplink, WA2 receives data through PHY, de-encapsulates the data in LINK to obtain a FP/IP frame or signaling bearer layer data. For the FP/IP frame, an IP header is removed to obtain the FP frame, and for signaling bearer data, SCTP and IP processing are done to obtain an NBAP frame. Because the FP/IP frame or NBAP frame of the framing protocol between the Iub interfaces of Node B and WA2 are borne on the convergence network of the DSL network, it can be considered as WA2 obtaining the FP/IP frame or NBAP frame from the Iub interface. If WA2 receives an NBAP frame, WA2 processes the NBAP frame accordingly. If WA2 receives an FP/IP frame, WA2 de-encapsulates the FP/IP frame to obtain a packet in RNL. After processing in the RNL layer, WA2 obtains the signaling message of the UE, such as a GMM, SM, SMS message, or RRC layer signaling message, and processes the messages accordingly, such as connection establishment and measurement reports. In this way, WA2 completes the control plane functions of RNC, SGSN and GGSN.

In the CN, SGSN and GGSN processing is not performed, and routing is done.

Similarly, UE receives a signaling message sent from the CN to the UE by a reversed procedure.

As shown in FIG. 25b, WA1 is configured in the base station BS used for the control and management of the radio access. The BS connects with the reference point V in the DSL network through WA1, relays the data in the radio communication network to the wired network via the BRAS, passing through the convergence network in the DSL network. The BRAS in the wired network relays the data in the DSL network to the core network through the reference point A10. Therefore, the interconnection between the wired network and the radio network is achieved. In this interconnection mode, the network elements BS and WA1 can be logically separated or integrated.

For FIG. 25b, there are further two implementation modes as follows.

Mode (4): WA1 is equivalent to an RNC in function, written as WA1=RNC.

Mode (5): WA1 is equivalent to an RNC and an SGSN in function, written as WA2=RNC+SGSN.

The two modes are described respectively from the perspective of protocol stacks as follows.

Figure 32:
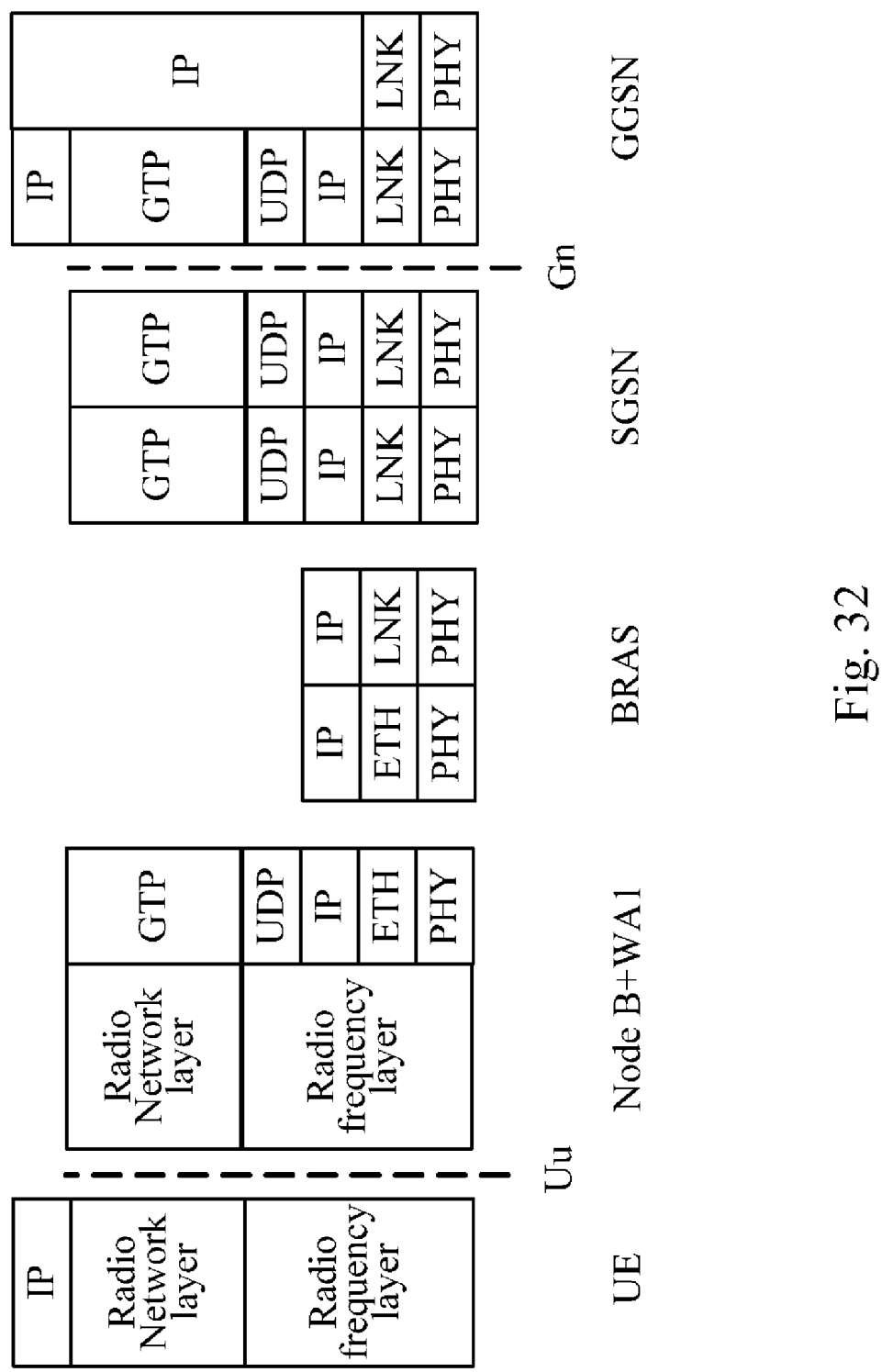
FIG. 32 is a schematic illustrating the user plane protocol stack according to Mode 4 of the various embodiments shown in FIG. 25b.
Figure 33:
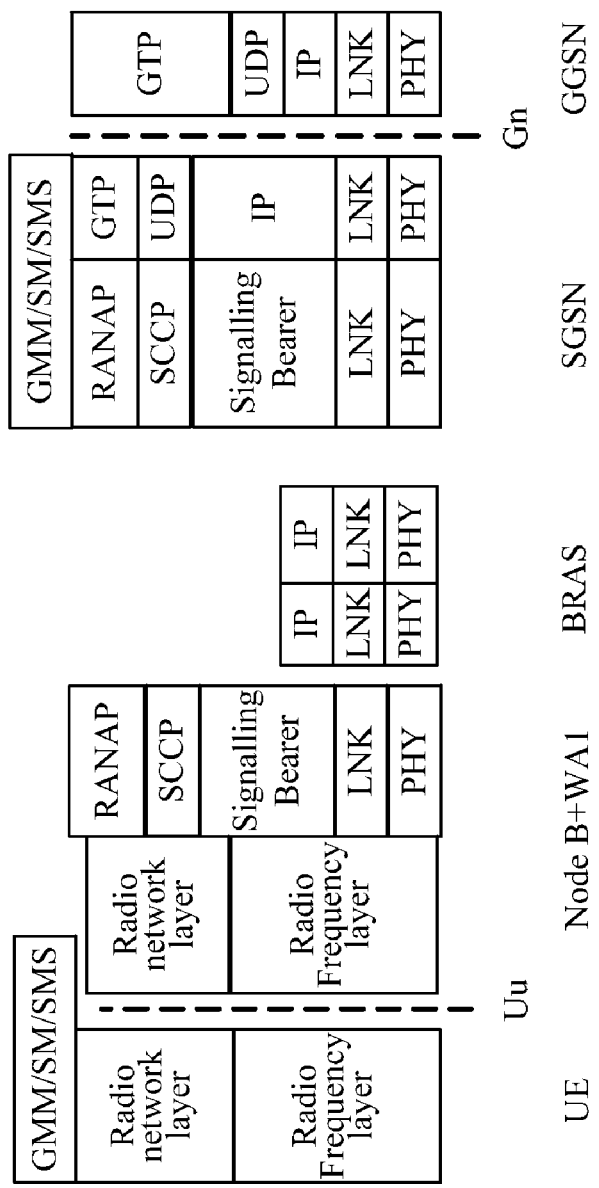
FIG. 33 is a schematic illustrating the control plane protocol stack according to Mode 4 of the various embodiments shown in FIG. 25b.

FIGS. 32 and 33 show the structures of the protocol stacks of the user plane and control plane respectively in Mode (4) in the various embodiments as shown in FIG. 25b. In various embodiments, WA1 is configured in Node B. A Node B with a WA1 is referred to as Node B+WA1.

For the user plane data on the uplink, the data of the application layer of the UE is encapsulated into a packet and sent to the RNL, and the packet may be an IP packet or a PPP packet of the user. RNL compresses the header of the packet, adds a header, such as RLC/MAC header, according to the protocol, and sends the packet to the RFL in the physical layer. RFL encodes and modulates the packet and sends the packet to UTRAN via the Uu interface. Because WA1 is equivalent to an RNC in function, after receiving packets, the RFL in the Node B+WA1 in UTRAN removes the protocol header, reassembles the packet and decompresses the header, and forwards the packet to the CN via GTP tunnel. The GTP tunnel protocol, UDP and IP between the WA1 in Node B and the CN are borne on the convergence network in the DSL network. For the protocol stack shown in FIG. 32, the detailed implementation procedure is as follows.

Node B+WA1 encapsulates a GTP/UDP/IP packet into ETH frames, and sends the frames to the BRAS in the Ethernet PHY, via the convergence network in the DSL network. The BRAS converts the data received in Ethernet PHY to ETH frames, obtains IP packets by processing the Ethernet MAC headers in the ETH frames, re-encapsulates the IP packets in LINK, and sends the encapsulated data to the CN for further processing by bearing the data on the physical layer PHY between the BRAS and the CN.

In the CN, the SGSN performs the radio network layer and transport network layer processing of the Iu interface, receives data from a GTP tunnel and sends the data to the GGSN through a GTP tunnel via the Gn interface. The data received by the GGSN from the GTP tunnel of the Gn interface may be a user IP packet or PPP packet of the UE. The GGSN sends the data in the form of IP packet or PPP packet to an external network via the Gi interface. In other words, in this case, the processing of the CN is similar to that in prior art.

Similarly, UE receives a packet sent from the CN to the UE by a reversed procedure.

For the control plane data on the uplink, the UE encapsulates in the RNL a signaling message, such as a GMM, SM, SMS message or RRC layer signaling message into a packet, the RNL adds a header according to the protocol, such as RLC/MAC header, and sends the packet to the RFL in the physical layer. The RFL encodes and modulates the packet and sends the packet to UTRAN via the Uu interface. After receiving a packet, the RFL in the Node B+WA1 in UTRAN removes the protocol header, reassembles the packet and sends the data to the RRC protocol of the RNL, parses a signaling message and performs corresponding processing, such as connection establishment and measurement reports. For a GMM/SM/SMS message, Node B+WA1 forwards the corresponding message to the CN via the radio network layer (such as NANAP) and transport network layer of the Iu interface. The transport network layer includes SCCP/M3UA/SCTP/IP/LNK/PHY, where M3UA/SCTP/IP is the Signaling Bearer as shown in FIG. 33. The radio network layer (such as NANAP) and the transport network layer (such as SCCP/M3UA/SCTP/IP) of the Iu interface between WA1 in Node B and the CN are borne on the convergence network in the DSL network. For the protocol stack shown in FIG. 33, the detailed implementation procedure is as follows.

Node B+WA1 encapsulates a RANAP/SCCP/M3UA/SCTP/IP packet into ETH frames, and sends the ETH frames to the BRAS in the Ethernet physical layer PHY, via the convergence network in the DSL network. The BRAS converts the data received in Ethernet PHY to ETH frames, obtains IP packets by processing the Ethernet MAC headers in the ETH frames, re-encapsulates the IP packets in LINK, and sends the encapsulated data to the CN for further processing by bearing the data on the physical layer PHY between the BRAS and the CN.

In the CN, the SGSN performs the transport network layer and the radio network layer processing of the Iu interface, obtains a signaling message such as a GMM, SM and SMS from RANAP, and performs subsequent processing according to prior art.

Similarly, UE receives a signaling message sent from the CN to the UE by a reversed procedure.

Figure 34:
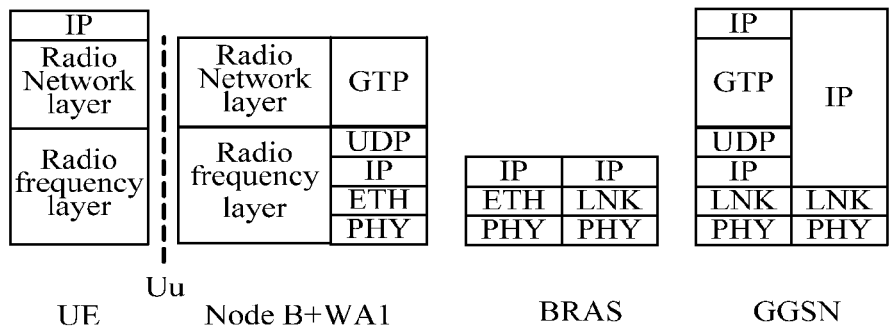
FIG. 34 is a schematic illustrating the user plane protocol stack according to Mode 5 of the various embodiments shown in FIG. 25b.
Figure 35:
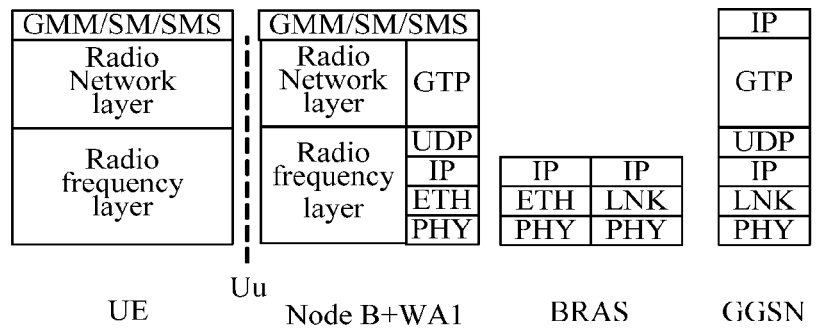
FIG. 35 is a schematic illustrating the control plane protocol stack according to Mode 5 of the various embodiments shown in FIG. 25b.

FIGS. 34 and 35 show the structures of the protocol stacks of the user plane and control plane respectively in Mode (5) in the various embodiments as shown in FIG. 25b. The difference between the protocol stacks shown in FIGS. 34 and 35 and the protocol stacks shown in FIGS. 32 and 33 is that, WA1 is equivalent to an RNC and an SGSN in function. In this way, GGSN processing is needed for the CN, and SGSN processing is not needed. The change of the structure of the protocol stack makes the processing steps change accordingly. In the following, explanations of the differences from FIGS. 32 and 33 are given, and the steps that are the same are omitted.

For the user plane data on the uplink, the UE sends data to UTRAN via the Uu interface. Because WA1 is equivalent to an RNC and an SGSN in function, the RFL in the Node B+WA1 in UTRAN receives the packet, removes the protocol header, reassembles the packet, compresses the header, and forwards the packet to the CN via the Gn interface of the GTP tunnel. The GTP tunnel protocol, UDP and IP between the WA1 and the CN are borne on the convergence network in the DSL network.

In the CN, the GGSN performs protocol stack processing of the Gn interface. The data received from the GTP tunnel may be a user IP packet or PPP packet of the UE, and the GGSN sends the data in the form of IP packet or PPP packet to an external network.

Similarly, UE receives a packets sent from the CN to the UE by a reversed procedure.

For the control plane data on the uplink, the UE sends a signaling message to the UTRAN via the Uu interface. Because WA1 is equivalent to an RNC and an SGSN in function, the RFL of the Node B+WA1 in the UTRAN receives the packet, removes the protocol header, reassembles the packet, sends the data to RNL, and obtains the signaling message of the UE, such as a GMM, SM, SMS message or RRC layer signaling message after the processing at the RNL layer. The user plane GTP tunnel is established, maintained or released via the control plane GTP protocol of the Gn interfaces between Node B+WA1 and the GGSN, and the GTP tunnel protocol, UDP and IP between Node B+WA1 and the GGSN are borne on the convergence network in the DSL network. The processing of the Gn interface protocol stack includes processings of GTP control plane (GTP-C), UDP, IP, LNK, and PHY layers.

Similarly, UE receives a signaling message sent from the CN to the UE by a reversed procedure.

For FIG. 25c, there are further three implementation modes as follows.

Mode (6): WA1 is equivalent to an RNC in function, and WA2 is equivalent to an SGSN in function, written as WA1=RNC, WA2=SGSN.

Mode (7): WA1 is equivalent to an RNC in function, and WA2 is equivalent to a GGSN in function, written as WA1=RNC, WA2=GGSN.

Mode (8): WA1 is equivalent to an RNC and an SGSN in function, and WA2 is equivalent to a GGSN in function, written as WA1=RNC+SGSN, WA2=GGSN.

The three modes are described respectively from the perspective of protocol stacks as follows.

Figure 36:
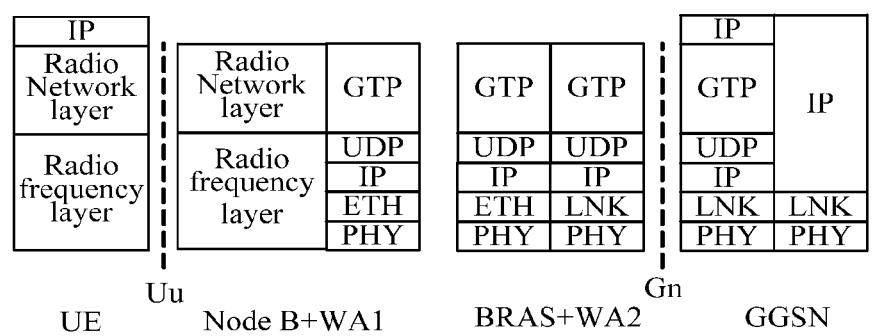
FIG. 36 is a schematic illustrating the user plane protocol stack according to Mode 6 of the various embodiments shown in FIG. 25c.
Figure 37:
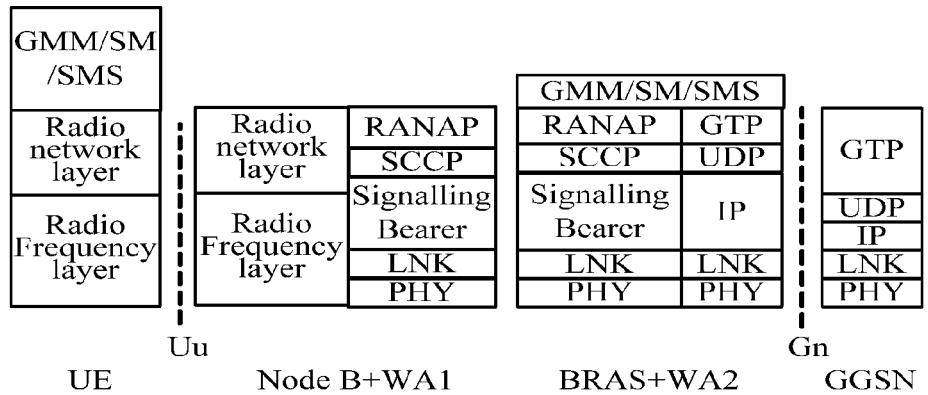
FIG. 37 is a schematic illustrating the control plane protocol stack according to Mode 6 of the various embodiments shown in FIG. 25c.

FIGS. 36 and 37 show the structures of the protocol stacks of the user plane and control plane respectively in Mode (6) in the various embodiments as shown in FIG. 25c. In various embodiments, WA1 is configured within Node B. The Node B with a WA1 is referred to as Node B+WA1. The BRAS and WA2 are configured as one integrated logical entity referred to as BRAS+WA2.

For the user plane data on the uplink, the data of the application layer of the UE is encapsulated into a packet and sent to the RNL, and the packet may be an IP packet or a PPP packet of the user. RNL compresses the header of the packet, adds a header according to the protocol, such as RLC/MAC header, and sends the packet to the RFL in the physical layer. RFL encodes and modulates the packet and sends the packet to UTRAN via the Uu interface. Because WA1 is equivalent to an RNC in function, WA2 is equivalent to an SGSN in function, after the RFL in Node B+WA1 in the UTRAN receives the packet, the RFL removes the protocol header, and after reassembly and header compression, the RFL sends the packet to the BRAS+WA2 via the GTP tunnel on the Iu interface.

Node B+WA1 encapsulates a GTP/UDP/IP frame into Ethernet ETH frames which are sent to the BRAS+WA2 for further processing.

The BRAS+WA2 obtains ETH frames from Ethernet PHY, obtains IP packets after processing the Ethernet MAC headers in the ETH frames, obtains UDP packets after IP routing, and then the BRAS+WA2 receives data from the GTP tunnel on the Iu interface and sends the data to the CN via the GTP tunnel on the Gn interface.

In the CN, the data received by the GGSN from the GTP tunnel on the Gn interface may be a user IP packet or PPP packet of the UE. The GGSN sends the data in the form of IP packet or PPP packet to an external network via the Gi interface. For DSL data services, the BRAS+WA2 performs IP/LINK/PHY processing on the data.

Similarly, UE receives a packet sent from the CN to the UE by a reversed procedure.

For the control plane data on the uplink, the UE encapsulates in the RNL the signaling message, such as a GMM, SM, SMS message or RRC layer signaling message into a packet. The RNL adds a header according to the protocol, such as RLC/MAC header, and sends the packet to the RFL in the physical layer. The RFL encodes and modulates the packet and sends the packet to UTRAN via the Uu interface. In response to a packet, the RFL in the Node B+WA1 in UTRAN removes the protocol header, reassembles the packet and sends the data to the RRC protocol of the RNL, parses a signaling message and performs corresponding processing, such as connection establishment and measurement reports. For a GMM/SM/SMS message, Node B+WA1 forwards the corresponding message to Node B+WA2 via the radio network layer (such as NANAP) and transport network layer of the Iu interface. The transport network layer includes SCCP/ M3UA/SCTP/IP/LNK/PHY, where M3UA/SCTP/IP is the Signaling Bearer as shown in FIG. 37.

Node B+WA1 encapsulates a RANAP/SCCP/M3UA/ SCTP/IP frame into Ethernet ETH frames, and sends the ETH frames to the BRAS+WA2 for further processing by bearing the ETH frames on the Ethernet PHY.

The BRAS+WA2 obtains ETH frames from Ethernet PHY, obtains IP packets after processing the Ethernet MAC headers in the ETH frames, obtains UDP packets after IP routing, and then the BRAS+WA2 performs transport network layer and radio network layer processing of the Iu interface, and obtains the GMM/SM/SMS messages from RANAP. For DSL data services, the BRAS+WA2 performs IP/LINK/PHY processing on the data.

Similarly, UE receives a signaling message sent from the CN to the UE by a reversed procedure.

Figure 38:
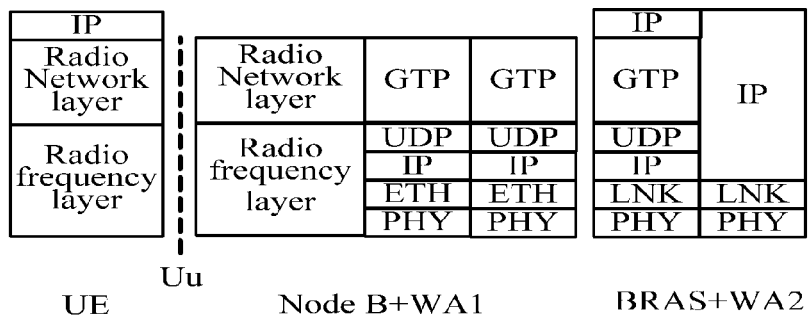
FIG. 38 is a schematic illustrating the user plane protocol stack according to Mode 7 of the various embodiments shown in FIG. 25c.
Figure 39:
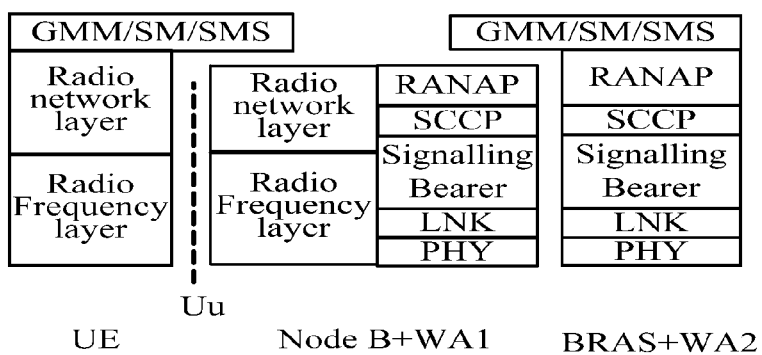
FIG. 39 is a schematic illustrating the control plane protocol stack according to Mode 7 of the various embodiments shown in FIG. 25c.

FIGS. 38 and 39 show the structures of the protocol stacks of the user plane and control plane respectively in Mode (7) in the various embodiments as shown in FIG. 25c. The difference between the protocol stacks shown in FIGS. 38 and 39 and the protocol stacks shown in FIGS. 36 and 37 is that, WA2 is equivalent to an SGSN and a GGSN in function. In this way, SGSN or GGSN processing is not needed. The change of the structure of the protocol stack makes the processing steps change accordingly. In the following, explanations of the differences from FIGS. 36 and 37 are given, and the steps that are the same are omitted.

For the user plane data on the uplink, the BRAS+WA2 obtains ETH frames after processing in Ethernet PHY, obtains IP packets after processing Ethernet MAC headers in the ETH frames, obtains UDP packets after IP routing, and then the BRAS+WA2 receives packets from the GTP tunnel on the Iu interface, processes the data in the transport network layer and the radio network layer of the Iu interface, obtains IP packets or PPP packets of the UE, and sends the packets to an external network via the network elements in the CN. The processing of the transport network layer of the Iu interface includes processings of GTP user plane (GTP-U), UDP, IP, LNK, and PHY layers. The radio network layer of the Iu interface is the Iu UP protocol, which is used for transmitting user data related to RAB.

In the CN, SGSN and GGSN processing is not performed, and routing is done.

Similarly, UE receives a packet sent from the CN to the UE by a reversed procedure.

For the control plane data on the uplink, the BRAS+WA2 obtains ETH frames after Ethernet PHY processing, the BRAS+WA2 de-encapsulates the data in LNK to obtain data in the signaling bearing layer, converts the data into SCCP frames. Because the SCCP framing protocol of the Iu interfaces between WA1 and WA2 is borne on the DSL network, it can be considered as WA2 obtaining the SCCP frames from the Iu interface. WA2 then de-encapsulates the SCCP frames to obtain packets in RNL, such as RANAP. WA2 processes the packets according to RANAP protocol and obtains the a signaling message of the UE, such as a GMM, SM, and SMS message. The processing of the transport network layer of the Iu interface includes processings of SCCP, signaling bearer, LNK and PHY. The processing of the radio network layer of the Iu interface includes RANAP processing.

In the CN, SGSN and GGSN processing is not performed, and routing is done.

Similarly, UE receives a signaling message sent from the CN to the UE by a reversed procedure.

Figure 40:
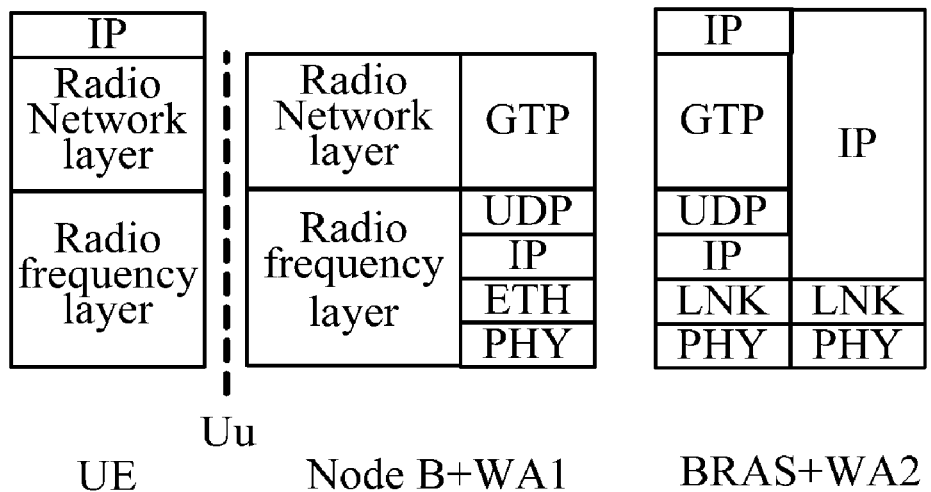
FIG. 40 is a schematic illustrating the user plane protocol stack according to Mode 8 of the various embodiments shown in FIG. 25c.
Figure 41:
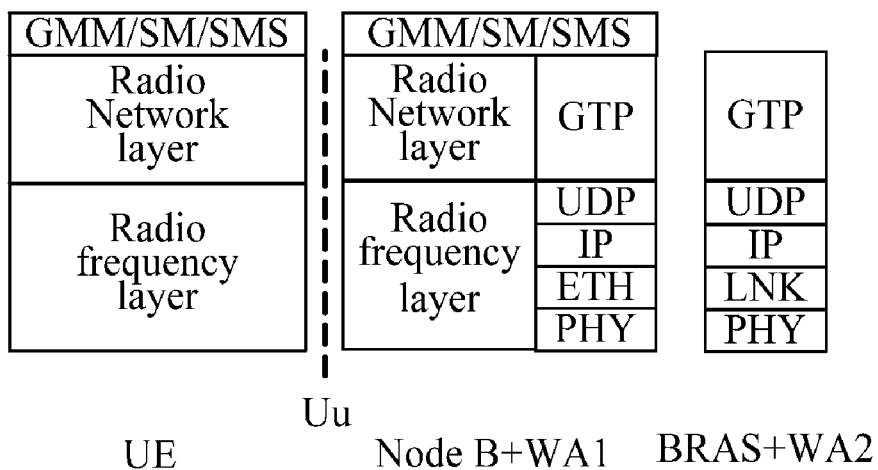
FIG. 41 is a schematic illustrating the control plane protocol stack according to Mode 8 of the various embodiments shown in FIG. 25c.
Figure 42:
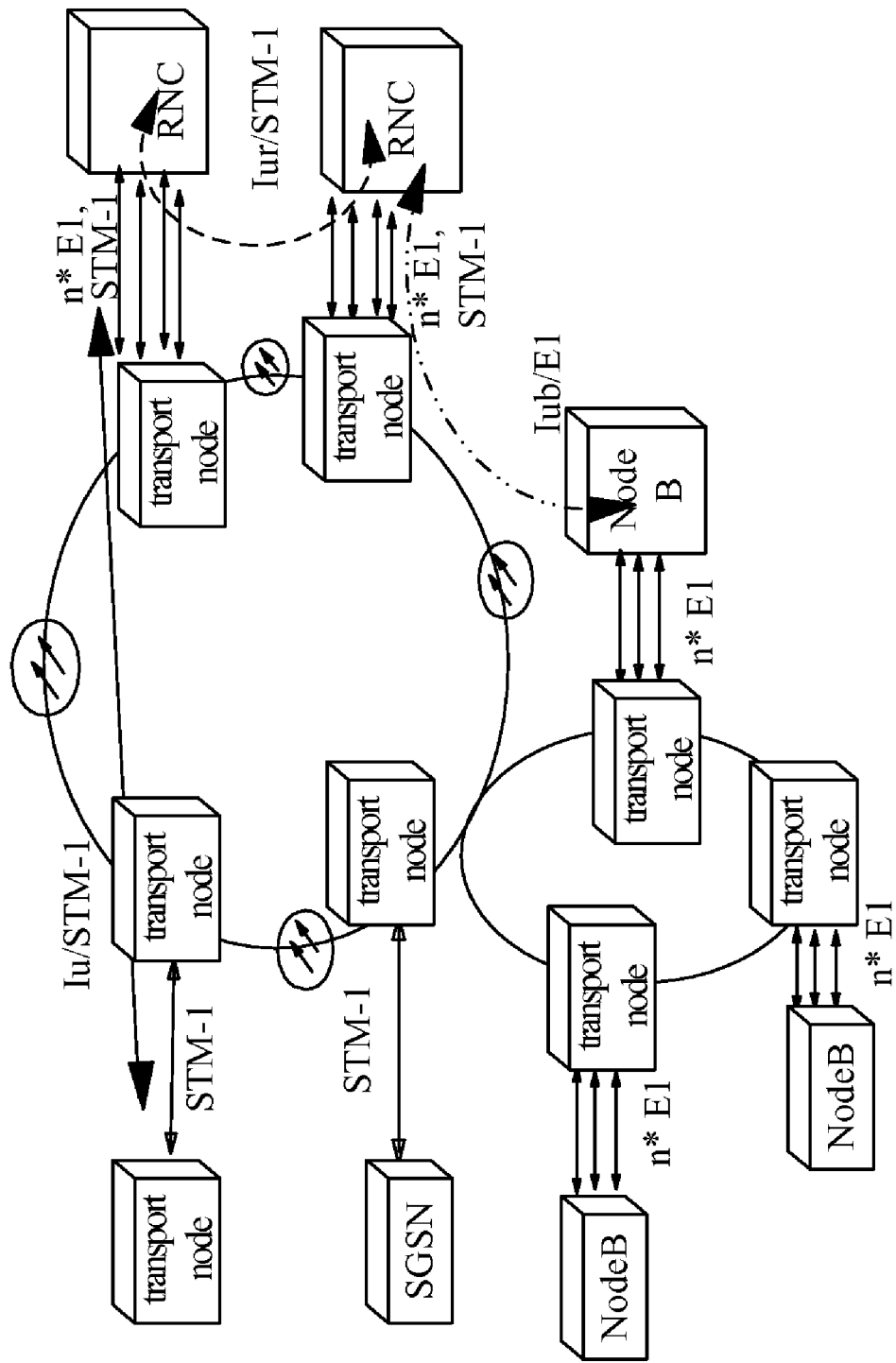
FIG. 42 is a schematic illustrating E1 networking at Iub interface of a WCDMA network in the prior art.

FIGS. 40 and 41 show the structures of the protocol stacks of the user plane and control plane respectively in Mode (8) in the various embodiments as shown in FIG. 25c. The difference between the protocol stacks shown in FIGS. 40 and 41 and the protocol stacks shown in FIGS. 38 and 39 is that, WA1 is equivalent to an RNC and an SGSN in function, and WA2 is equivalent to a GGSN in function. In this way, SGSN or GGSN processing is not needed for the CN. The change of the structure of the protocol stack makes the processing steps change accordingly. In the following, explanations of the differences from FIGS. 38 and 39 are given, and the steps that are the same are omitted.

For the user plane data on the uplink, the UE sends data to UTRAN via the Uu interface. Because WA1 is equivalent to an RNC and an SGSN in function, the RFL in the Node B+WA1 in UTRAN receives the packet, removes the protocol header, reassembles the packet, decompresses the header, and forwards the packet to the BRAS+WA2 via the Gn interface of the GTP tunnel. The GTP tunnel protocol, UDP and IP between the WA1 and WA2 are borne on the convergence network in the DSL network.

The BRAS+WA2 performs protocol stack processing of the Gn interface. The data received from the GTP tunnel may be a user IP packet or PPP packet of the UE, and the BRAS+ WA2 sends the data in the form of IP packet or PPP packet to the CN.

In the CN, SGSN and GGSN processing is not performed, and routing is done.

Similarly, UE receives a packets sent from the CN to the UE by a reversed procedure.

For the control plane data on the uplink, the UE sends a signaling message to a UTRAN via the Uu interface, because WA1 is equivalent to an RNC and an SGSN in function, the RFL of the Node B+WA1 in the UTRAN receives the packet, removes the protocol header, reassembles the packet, sends the data to RNL. The BRAS+WA2 obtains a signaling message of the UE, such as a GMM, SM, SMS message or RRC layer signaling message after the processing at the RNL layer. The user plane GTP tunnel between Node B+WA1 and the BRAS+WA2 is established, maintained or released through the Gn interface control plane protocol. The processing of the Gn interface protocol stack includes processings of GTP control plane (GTP-C), UDP, IP, LNK, and PHY layers.

In the CN, SGSN and GGSN processing is not performed, and routing is done.

Furthermore, for the various embodiments shown in FIGS. 36-41, the BRAS and WA2 can be independent of each other. In other words, the BRAS and WA2 are two independent logical entities. Furthermore, for the various embodiments shown in FIGS. 32-41, Node B and WA1 can be independent of each other. In other words, Node B and WA1 are two independent logical entities.

The explanation above takes an example on the basis of WCDMA. For other networks, such as GSM and WiMAX, the processing is similar to that in WCDMA, except that the names of the logical entities that perform the operations will change accordingly. It can be seen that, the various embodiments of the present disclosure actually set up a first logic unit and a second logic unit. The first logic unit and the DSL Modem in the DSL network form a first processing unit. The second logic unit and the BRAS in the DSL network form a second processing unit. The radio communication network data transmitted between the first processing unit and the second processing unit is borne on the DSL network. Alternatively, the radio communication network data transmitted between the first logic unit and the second processing unit is borne on the DSL network.

For 2G or 3G radio communication networks, the first logic unit is a base station, and the second logic unit is a pre-configured second wireless adaptor WA2 and the core network. Alternatively, the first logic unit is a base station and a pre-configured first wireless adaptor WA1, and the second logic unit is the core network. Alternatively, the first logic unit is a base station and a pre-configured first wireless adaptor WA1, and the second logic unit is a core network and a pre-configured second wireless adaptor WA2.

For WiMAX radio communication networks, the first logic unit is a base station, and the second logic unit is a pre-configured second wireless adaptor WA2 and CSN. Alternatively, the first logic unit is a base station and a pre-configured first wireless adaptor WA1, and the second logic unit is CSN. Alternatively, the first logic unit is a base station and a pre-configured first wireless adaptor WA1, and the second logic unit is a CSN and a pre-configured second wireless adaptor WA2.

For systems interconnecting a radio communication network and a DSL network, because the x Digital Subscriber Line (xDSL) has the advantages of convenient access, rich transmission resource, low transmission cost, and high transmission rate compared with E1 or T1, an embodiment of the present disclosure is to make a base station implement transmission by xDSL. The transmission rate of the current xDSL technology is as below.

Single-pair High-speed Digital Subscriber Line (SHDSL) provides a bit rate of 2.3 Mbps for both the uplink and the downlink on a single pair of twisted pair line.

For Asymmetric Digital Subscriber Line (ADSL), when the transmission distance reaches 15 thousand feet, on the single pair of twisted pair line, the downlink bit rate can reach 8 Mbps and the uplink can reach 640 kbps; whereas the downlink bit rate of ADSL2+ can reach 24 Mbps.

Very High-speed Digital Subscriber Line (VDSL) has a relatively shorter transmission distance, but within a transmission distance of 1 to 3 kft, on a single pair of twisted pair lines, the downlink bit rate of symmetric VDSL can reach 52 Mbps, and both the uplink and downlink bit rate of asymmetric VDSL can reach 26 Mbps; the bit rates of VDSL2 and VDSL+ can reach more than 100 Mbps.

As proposed in the various embodiments of the present disclosure, wireless or mobile networks based on DSL bearer (Wireless or Mobile over DSL) make use of the xDSL transmission technology as the transmission technology of the base station. In this way, the transmission rate of the base stations can be improved greatly, the construction of 3G or 2G or WiMAX access network can fully utilize the lines that are already deployed by existing DSL networks, so that the construction cost of the 3G or 2G or WiMAX access networks can be reduced.

Figure 43:
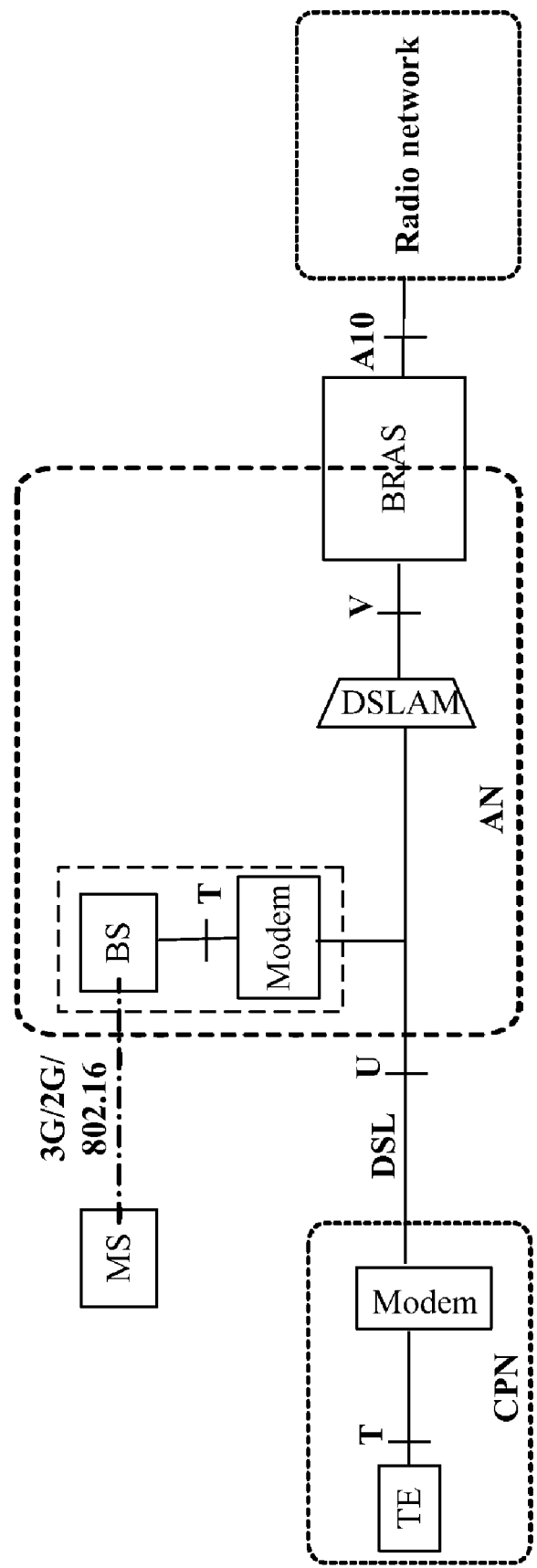
FIG. 43 is a networking schematic illustrating the interconnection between a DSL network and a radio communication network according to various embodiments of the present disclosure.

FIG. 43 illustrates the interconnection between a radio communication network and a DSL network, implemented according to the various embodiments of the present disclosure. In this system, the DSL network is interconnected with the base stations of the radio communication network. The base stations in the radio communication network, after receiving data from a user station by a method as specified in the 2G, 3G or 802.16 standards, sends the data via the DSL Modem to the DSL network. In this way, the interconnection between the base stations and the DSL network is achieved. The data from the DSL network can be relayed into the radio communication network through reference point A10. In this way, the interconnection from the wired network to the radio network is achieved. The following description relates to the system that interconnects a radio communication network and the digital subscriber line network.

In various embodiments of the present disclosure, for 2G, 2.5G and 3G networks, the functionality of the RAN is decomposed. The original wireless interface protocols, such as part of the radio network layer (RNL) protocol stack, radio resource control (RRC), which are the items with dots in Table 1, PDCP, broadcast and multicast control (BMC), RLC, and MAC are moved down to the base station. A base station controller unit is added in the various embodiments of the present disclosure. The base station controller unit is adapted to provide the moving down function. The base station in the various embodiments has a different function from a base station in prior art. The functions of the base station in prior art and the base station as described in the various embodiments of the present disclosure are as shown in Table 1.

TABLE 1

| Function | BS function in prior art | BS function in various embodiments of this disclosure | BSC function of the BS in various embodiments of this disclosure |
|---|---|---|---|
| Physical layer (PHY) | Mandatory | Mandatory | |
| Media Access Control (MAC) | | Mandatory | Mandatory |
| Radio Link Control (RLC) | | Mandatory | Mandatory |
| Broadcast or Multicast Control (BMC) | | Optional | Optional |
| Packet Data Convergence Protocol (PDCP) | | Mandatory | Mandatory |
| Radio Resource Control (RRC) | | | |
| Cell Specified Radio Resource Management (CS-RRM) | | Mandatory | Mandatory |
| Handover (HO Control) | | Mandatory | Mandatory |
| Admission Control | | Optional | Optional |
| Cell Control | | Optional | Optional |
| Quality of Service (QoS) Scheduling | | Optional | Optional |

In various embodiments of the present disclosure, for a WiMAX network, the functionality of the RAN is decomposed. The base station controller unit in WiMAX base stations provides part of the functions of ASN, which mainly include Handover Control, Data Path Function (Data Path Fn), and Radio Resource Management. The Handover Control realizes the control for network handover for the users, and the control and agent of radio resources realize the allocation of radio resources. Besides, other functions, such as Location Register, Service Flow Authentication and Management, Context Function, Robust Header Compression (ROHC), Key Management, Paging Control, DHCP Relay, Mobile IP Foreign Agent (MIP FA), Proxy Mobile IP Client (PMIP Client), and Authentication Relay can be added into the base station controller unit. The functions of the base station controller unit of the WiMAX base station as described in various embodiments of the present disclosure are shown in Table 2.

TABLE 2

| Function | Functions of base station controller unit of the WiMAX BS in various embodiments of this disclosure |
|---|---|
| Data Path Fn | Mandatory |
| Handover Control | Mandatory |
| Radio Resource Management | Mandatory |
| Location Register | Optional |
| Service Flow Authentication and Management | Optional |
| Context Function | Optional |
| Robust Header Compression (ROHC) | Optional |
| Key Management | Optional |
| Paging Control | Optional |
| DHCP Relay | Optional |
| Mobile IP Foreign Agent (MIP FA) | Optional |
| Proxy Mobile IP Client (PMIP Client) | Optional |
| Authentication Relay | Optional |

The system for interconnecting the radio communication network and the DSL network will be described in detail with reference to the accompany drawings. The DSL network is interconnected with the base stations in the radio communication network. The base stations described in various embodiments of the present disclosure can provide the same function as the base stations in prior art, i.e., these base stations do not contain base station control unit, or they can provide different functions from the base stations in prior art, i.e., these base stations contain the function of base station controller units.

Figure 44:
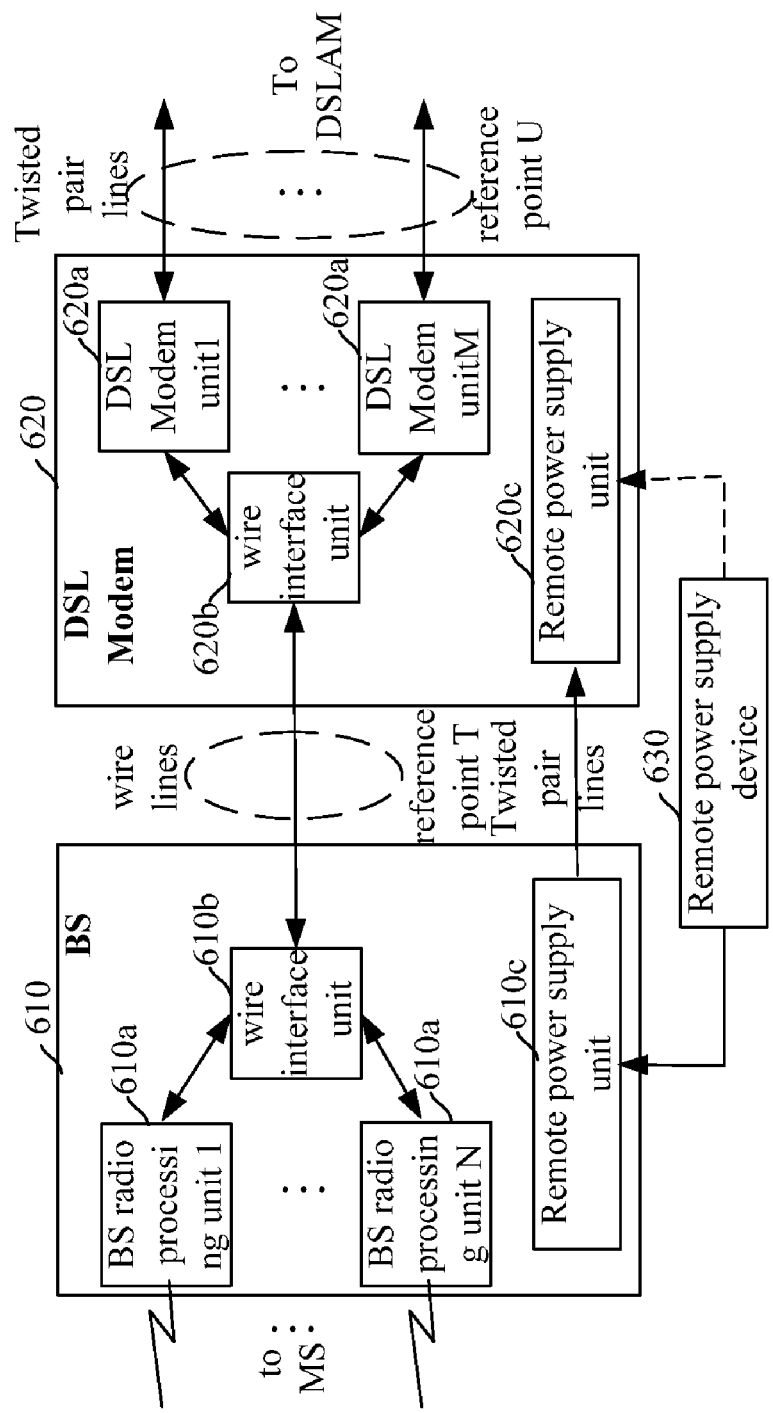
FIG. 44 is a schematic illustrating a system according to Embodiment 7 of the present disclosure.

FIG. 44 illustrates the system structure of various embodiments of the present disclosure. The various embodiments relate to a system for the interconnection between a radio communication network and a DSL network. In the system, the DSL network is interconnected with the base stations of the radio communication network. The system includes a base station 610 and a Digital Subscriber Line (DSL) network, where the DSL network includes a reference point T, a DSL Modulation and Demodulation device 620, a reference point U and an access point DSLAM. The base station 610 is connected with the DSL Modem 620 at the reference point T by one or more pair of wire lines, which is adapted to allow a user station to access, and further to forward data from the user station to the DSL Modem 620 or from the DSL Modem 620 to the user station. The DSL Modem 620 is connected with the DSLAM at the reference point U by one or more pair of twisted pair lines and is adapted to modulate data from the base station 610 according to DOCSIS and transmit the data processed to the DSLAM. Or, the DSL Modem 620 is adapted to demodulate data from the DSLAM according to DOCSIS and transmit the data demodulated to the base station 610.

The components of the base station 610 and the components of the DSL Modem 620 are further described in detail as follows.

The base station 610 includes a wire interface unit 610b, and at least one base station radio processing unit 610a.

Each of the base station radio processing units 610a is adapted to process radio access for a user station, and further to forward data from the user station to the wire interface unit 610b of the base station 610. Or each of the base station radio processing units 610 is adapted to forward data from the wire interface unit 610b in the base station 610 to the user station. Each base station radio processing unit 610a includes an antenna, a radio processing module, an intermediate frequency processing module, a base-band processing module, a radio data link layer processing module, and processing modules for layers above the radio link layer, which is mainly adapted to provide radio access processing.

The wire interface unit 610 in the base station 610 is connected to the DSL Modem 620 at the reference point T by one or more pairs of wire lines, processes data from the base station radio processing unit 610a in the base station 610 for wire interface transmission, and forwards the data to the DSL Modem 620. Or, the wire interface unit 610 processes data from the DSL Modem 620 for wired arrival, and forwards the data to the base station radio processing unit 610a. In transmissions on the basis of layer-3 routing modes, the wire interface unit 610b supports processing in IP layer, data link layer and physical layer. In transmissions on the basis of layer-2 bridging modes, the wire interface unit 610b supports data link layer and physical layer processing. For example, if the wire interface unit 610b is an Ethernet interface processing unit, the wire line is the Ethernet wire line, and the data link layer is the Ethernet MAC layer, and the physical layer is the Ethernet PHY layer.

DSL Modem 620 includes a wire interface unit 620b, and one or more DSL Modem units 620a. The wire interface unit 620b contained in the DSL Modem 620 is connected to the base station 610 at the reference point T, and is adapted to receive data from the base station 610, process the data for wire interface reception and transmit the data processed to the DSL Modem unit 620a. Or, the wire interface unit 620b is adapted to process data from the DSL Modem unit 620a for wire interface transmission and transmit the data to the base station module 610. In transmissions on the basis of layer-3 routing modes, the wire interface unit 620b supports processing in IP layer, data link layer and physical layer. In transmissions on the basis of layer-2 bridging modes, the wire interface unit 620b supports data link layer and physical layer processing. For example, if the wire interface unit 620b is an Ethernet interface processing unit, the wire line is the Ethernet wire line, and the data link layer is the Ethernet MAC layer, and the physical layer is the Ethernet PHY layer.

The DSL Modem unit 620a of the DSL Modem 620 is connected with DSLAM at the reference point U by one or more pairs of twisted pair lines, which modulates the data from wire interface unit 620b according to DOCSIS and transmits the data processed to DSLAM. Or, the DSL Modem unit 620a demodulates data from the DSLAM according to DOCSIS and transmits the data demodulated to the wire interface unit 620b.

Figure 45:
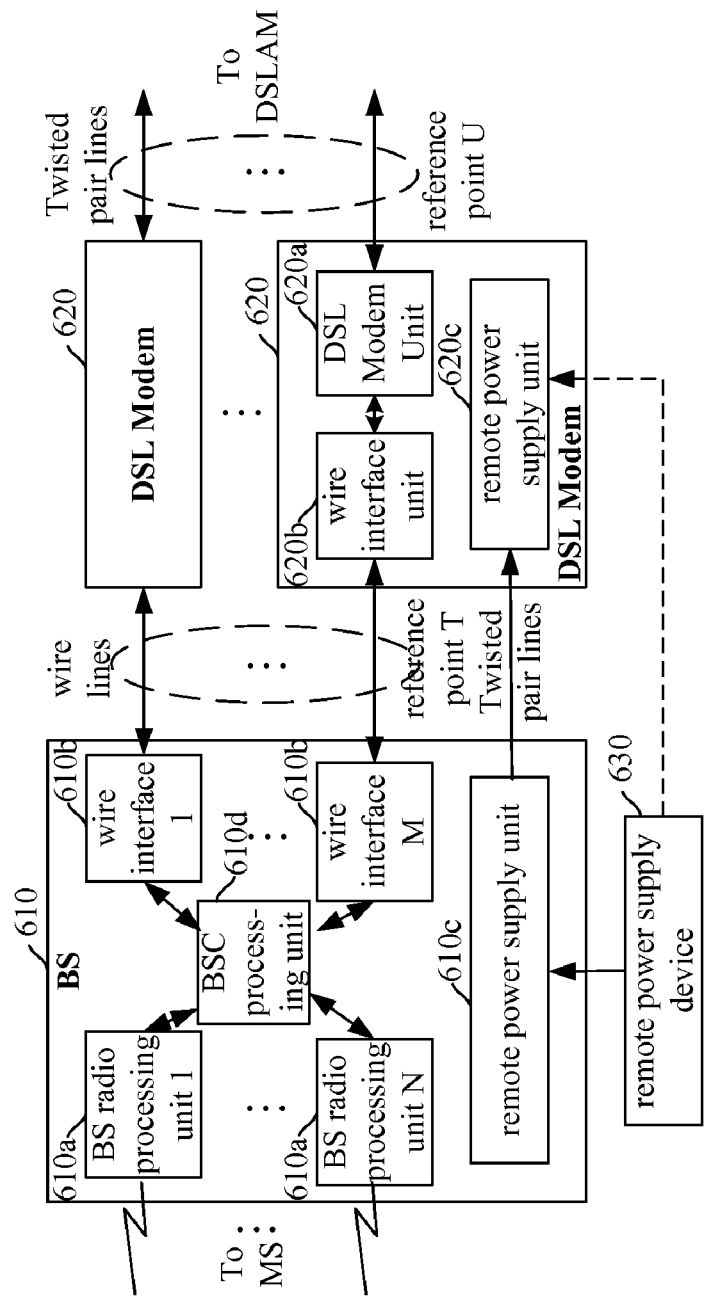
FIG. 45 is a schematic illustrating a system according to Embodiment 8 of the present disclosure.

FIG. 45 illustrates the system structure of various embodiments of the present disclosure. The overall connection relationship is similar to that of various embodiments as shown in FIG. 44, but the detailed realization is different, and the main difference is that the structure in the base stations is changed, and the system includes more than one DSL Modems. In the following only the differences are described.

The base station includes one or more base station radio processing units 610a, at least one wire interface unit 610b, and a base station controller processing unit 610d.

Each of the base station radio processing unit 610a is adapted to process radio access for a user station, and further to forward data from the user station to the base station controller processing unit 610d of the base station or from the base station controller processing unit 610d in the base station to the user station. Each base station radio processing unit 610a includes an antenna, a radio processing module, an intermediate frequency processing module, a base-band processing module, a radio data link layer processing module, and processing modules for layers above the radio link layer.

The base station controller processing unit 610d processes data from each base station radio processing unit 610a for uplink transmission, and transmits the data processed to the wire interface unit 610*b* or a base station radio processing unit 610*a*. Or, the base station controller processing unit 610*d* processes data from the wire interface unit 610*b* for downlink transmission and transmits the data processed to the base station radio processing unit 610*a*.

The wire interface unit 610*b* in the base station 610 is connected to a DSL Modem 620 at a reference point T by one or more pairs of wire lines, processes data from the base station controller processing unit 610*d* in the base station 610 for wire interface transmission, and forwards the data processed to the DSL Modem 620. Or, the wire interface unit 610 processes data from DSL Modem 620 for wired arrival, and forwards the data to the base station controller processing unit 610*d*.

In various embodiments, the system that realizes the interconnection between the radio communication network and the Digital Subscriber Line network includes at least one DSL Modem 620. Each of the DSL Modem 620 includes a wire interface unit 610*b* and a DSL Modem unit 620*a*.

The wire interface unit 610*b* in each of the DSL Modems 620 is connected to the base station 610 at a reference point T, and is adapted to receive data from the base station 610, process the data for wire interface reception and transmit the data processed to DSL Modem unit 620*a*. Or, the wire interface unit 610*b* is adapted to process data from the DSL Modem unit 620*a* for wire interface transmission, and transmit the data processed to the base station module 610.

The DSL Modem unit 620*a* of each of the DSL Modems 620 is connected with a DSLAM at a reference point U by a pair of twisted pair lines, modulates the data from wire interface unit 610*b* according to DOCSIS and transmits the data processed to DSLAM. Or, the DSL Modem unit 620*a* demodulates data from the DSLAM according to DOCSIS and transmits the data demodulated to the wire interface unit 610*b*.

Similar to the description above, in transmissions on the basis of layer-3 routing modes, the wire interface unit 610*b* and the wire interface unit 620*b* both support processing in IP layer, data link layer and physical layer. In transmissions on the basis of layer-2 bridging modes, the wire interface unit 610*b* and the wire interface unit 620*b* both support data link layer and physical layer processing. For example, if the wire interface unit is an Ethernet interface processing unit, the wire line is the Ethernet wire line, and the data link layer is the Ethernet MAC layer, and the physical layer is the Ethernet PHY layer.

The system as shown in FIGS. 44 and 45 can further include remote power supply unit 630. The remote power supply device 630 is adapted to convert the mains such as 110V or 220V input voltage or low voltage DC such as −48~−60V DC, to a high voltage output DC current, such as 270V DC, and provide power to DSL Modem 620 or base station 610 remotely by wire lines. The distance for remote power supply depends on the diameter of the wire lines, number of pairs, energy consumption of outdoor base station units, and the output voltage of the remote power supply unit, and usually a remote power supply distance of 2 to 5 kilometers can be achieved. The remote power supply unit 630 can be integrated into the base station, or built as an independent device.

When a remote power supply unit 630 provides power to a base station 610, the base station 610 further includes a remote power supply unit 610*c*.

The remote power supply unit 610*c* in a base station 610 is adapted to receive the high voltage DC from the remote power supply device 630, convert the high voltage DC to low voltage DC, and supply local power to the remote power supply unit 610*c* in the base station 610. Or, the remote power supply unit 610*c* is adapted to receive high voltage DC from the remote power supply device 630, relay the high voltage DC to the base station 610 at the next level, or relay to the DSL Modem 620 at the next level that is connected to the local base station 610. Or, the remote power supply unit 610*c* is adapted to communicate with the remote power supply device 630 as an out-of-band management channel for the base station 610, and pass monitoring warning messages to the base station 610. It would allow easier device management and problem isolation, and is advantageous for operations such as remote maintenance.

When a remote power supply unit 630 provides power to a DSL Modem 620, the DSL Modem 620 further includes a power supply unit 620*c*. The remote power supply unit 610*c* in a DSL Modem 620 is adapted to receive the high voltage DC from the remote power supply device 630 or the remote power supply unit 610*c* within the base station 610, convert the high voltage DC to low voltage DC, and supply local power to the DSL Modem 620. Alternatively, the remote power supply unit 620*c* is adapted to receive high voltage DC from the remote power supply device 630 and relay the high voltage DC to the DSL Modem 620 at the next level. Or, the remote power supply unit 620*c* is adapted to communicate with the remote power supply device 630 as an out-of-band management channel for the DSL Modem 260 and pass monitoring warning messages to the DSL Modem 260. This would allow easier device management and problem isolation, and is advantageous for operations such as remote maintenance.

For various embodiments shown in FIG. 44, there are variant embodiments as below.

The base station 610 can also include more than one wire interface unit 610*b*, and each base station radio processing unit 610*a* can forward data received from user stations to any of the wire interface units 610*b*.

There may be more than one DSL Modem 620, the structure of which is the same as the DSL Modem 620 shown in FIG. 45.

For various embodiments shown in FIG. 44, the two variants can exist independently, or co-exist.

For various embodiments shown in FIG. 45, there are variant embodiments as below.

The base station 610 has one wire interface unit 610*b*, i.e., the base station controller unit 610*d* is connected to one wire interface unit 610*b*. In this case, the process does not change, except that all the processing will pass the wire interface unit 610*b*.

There may be a single DSL Modem 620, the structure of which is the same as the DSL Modem 620 shown in FIG. 44.

For various embodiments shown in FIG. 45, the two variants can exist independently, or co-exist.

Figure 46:
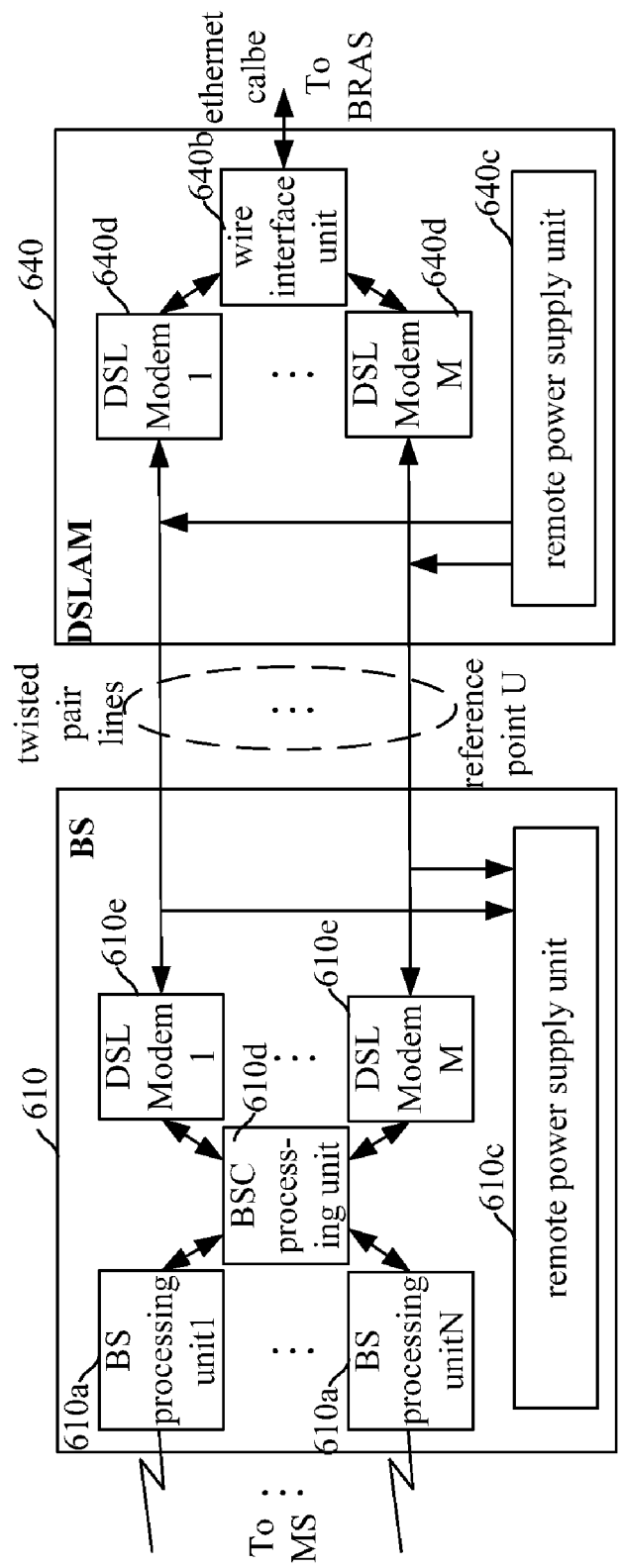
FIG. 46 is a schematic illustrating a system according to Embodiment 9 of the present disclosure.

FIG. 46 illustrates the system structure of various embodiments of the present disclosure. This embodiment relates to a system for the interconnection between a radio communication network and a DSL network. In this system, the DSL network is interconnected with the base stations of the radio communication network. This system includes base station 610 and a Digital Subscriber Line (DSL) network, the BRAS and the reference point V. The DSL network contains a reference point U and the access point DSLAM 640.

The base station 610 is connected to the DSLAM 640 at the reference point U by one or more pairs of twisted pair lines, and is further adapted to process access of the user station and forward data from the user station to the DSLAM 640. Or, the base station 610 is adapted to forward data from the DSLAM

640 to the user station. The DSLAM 640 is connected to the BRAS by one or more pairs of twisted pair lines, and is adapted to forward data from the base station 610 to the DSLAM 640 after demodulation according to DOCSIS or from the BRASS to the base station 610 after modulation according to DOCSIS.

The base station 610 includes at least one base station radio processing unit 610a, a base station DSL Modem unit 610e, and a base station controller processing unit 610d.

Each base station radio processing unit 610a in the base station 610 is adapted to process radio access for a user station, and further to forward data from the user station to the base station controller processing unit 610d of the base station or from the base station controller processing unit 610d in the base station to the user station.

The base station controller processing unit 610d in the base station 610 processes data from each base station radio processing unit 610a for uplink transmission, and transmits the data processed to the DSL Modem unit 610e. Or, the base station controller processing unit 610d processes data from the DSL Modem unit 610e for downlink transmission and transmits the data processed to a base station radio processing unit 610a.

Each base station DSL Modem unit 610e in the base station 610 is connected with the DSLAM 640 at the reference point U by a pair of twisted pair lines, forwards data from the base station controller processing unit 610d within the local base station 610 to the DSLAM 640 after modulation according to DOCSIS. Or, the base station DSL Modem unit 610e forwards data from the DSLAM 640 to base station controller processing unit 610d after demodulation according to DOCSIS.

The DSLAM 640 includes at least one DSL Modem unit 640d and one wire interface unit 640b.

The DSL Modem unit 640d in the DSLAM 640 demodulates data from the base station 610 according to DOCSIS and transmits the data demodulated to the wire interface unit 640b. Or, the DSL Modem unit 640d modulates data from the wire interface unit 640b according to DOCSIS and transmits the data modulated to the base station 610.

The wire interface 640b in the DSLAM 640 is connected to the BRAS at a reference point V by one or more pairs of twisted pair lines, and is adapted to receive data from DSL Modem unit 640d, process the data for wire interface transmission and transmit the data to the BRAS. Or, the wire interface 640b processes data received from the BRAS for wire interface reception and transmit the data to the DSL Modem unit 640d.

In the various embodiments, the base station 610 can further include a remote power supply unit 610c. Meanwhile, the DSLAM 640 further includes a remote power supply unit 640c. The remote power supply unit 640c in the DSLAM 640 is adapted to convert mains, such as 101V/220V AC, or low voltage DC input such as −48V to −60V DC, to high voltage DC, such as 270V DC, and transfer the high voltage DC to the remote power supply unit 610c in the base station unit 610. Or, the remote power supply unit 640c in the DSLAM 640 can be used as an out-of-band management channel for the DSLAM 640 to transfer monitoring and warning messages. This would allow easier device management and problem isolation, and is advantageous for operations such as remote maintenance. The distance for remote power supply depends on the diameter of the wire lines, number of pairs, energy consumption of outdoor base station units, and the output voltage of the remote power supply unit, and usually a remote power supply distance of 2 to 5 kilometers can be achieved.

The remote power supply unit 610c in the base station 610 is adapted to convert the received high voltage DC to low voltage DC, and provide local power supply to the base station 610. Or, the remote power supply unit 610c in the base station 610 is adapted to relay the received high voltage DC to the base station 610 at the next level. Or, the remote power supply unit 610c in the base station 610 is used as an out-of-band management channel for the base station 610 to transfer monitoring and warning messages. This would allow easier device management and problem isolation, and is advantageous for operations such as remote maintenance.

According to Tables 1 and 2, the base station control process for uplink and downlink done by the base station processing unit 610d as shown in FIGS. 45 and 46 includes the following functions.

For WCDMA, GSM, GPRS and TD-SCDMA networks, the uplink and downlink base station control processing includes all functions of an RNC or BSC.

For CDMA2000 networks, the uplink and downlink base station control process includes all functions of BSC and PCF, or includes functions of BSC.

For an enhanced 3G network, the uplink and downlink base station control processing at least includes functions of Media Access Control, Radio Link Control, Packet Data Convergence Protocol, Cell-specific Radio Resource Management, and Handover Control; In this case the uplink and downlink base station control processing can further include functions of Broadcast or Multicast Control, Admission Control, Cell Control, and QoS Scheduling.

For WiMAX networks, the uplink and downlink base station control at least includes functions of Handover Control, Path Function, and Radio Resource Management; In this case the uplink and downlink base station control processing can further include functions of Location Register, Service Flow Authentication and Management, Context Function, Robust Header Compression, Key Management, Paging Control, Relay, Mobile IP Foreign Agent, Proxy Mobile IP Client, and Authentication Relay.

For various embodiments as shown in FIG. 46, there can also be a remote power supply device. The remote power supply device is used for converting the input from the mains or DC input to high voltage DC output and transferring the current to the DSLAM 640 through wire lines. This is the case where the remote power supply device and the DSLAM 640 are independent, whereas what is shown in FIG. 46 is the case where the remote power supply unit is integrated into the DSLAM.

For all the various embodiments, the base station 610 can be located in any network as specified by 2G, 2.5G, 3G or 802.16 protocol specifications. If the base station 610 is located in a 2G, 2.5G or 3G network, the user stations are mobile terminals. If the base station 610 is located in a network specified by the 802.16 protocol, the user station is a mobile terminal or a fixed terminal.

For all the various embodiments, the data is either user data or control signaling, and the data included in data packets or frames.

The foregoing description is only preferred various embodiments of the present disclosure and is not for use in limiting the protection scope thereof.

What is claimed is:

1. A method for interconnecting a Digital Subscriber Line (DSL) network and a radio communication network, comprising:

setting a first logic unit in the radio communication network to interconnect with a DSL Modem in the DSL network at a reference point T, wherein the first logic unit and the DSL Modem in the DSL network constitute a first processing unit;

setting a second logic unit in the radio communication network to interconnect with an edge node in the DSL network at a reference point A10, wherein the second logic unit and the edge node in the DSL network constitute a second processing unit; and carrying data of the radio communication network between the first processing unit and the second processing unit over the DSL network;

wherein the carrying data of radio communication network between the first processing unit and the second processing unit over the DSL network comprises:

converting, by the first processing unit, data from a user station into data suitable for transmission over DSL network, sending the data of the radio communication network to the second processing unit over the DSL network, and sending, by the second processing unit, the data to an external network;

receiving, by the second processing unit, data from the external network, sending the data of radio communication network to the first processing unit over the DSL network, and sending, by the first processing unit, the data to the user station.

2. The method of claim 1, wherein
the radio communication network is a 2G or 3G radio communication network; the first logic unit is a base station; the second logic unit is a preset second wireless adaptor (WA2) and a core network.

3. The method of claim 1, wherein
the radio communication network is a 2G or 3G radio communication network; the first logic unit is a base station and a preset first wireless adaptor (WA1); the second logic unit is a core network.

4. The method of claim 1, wherein
the radio communication network is a 2G or 3G radio communication network; the first logic unit is a base station and a preset first wireless adaptor (WA1); the second logic unit is a core network and a preset second wireless adaptor(WA2).

5. The method of claim 1, wherein
the radio communication network is a Worldwide Interoperability for Microwave Access(WiMAX) radio communication network; the first logic unit is a base station; the second logic unit is a preset second wireless adaptor (WA2) and a Connectivity Service Network (CSN).

6. The method of claim 1, wherein
the radio communication network is a WiMAX radio communication network; the first logic unit is a base station and a preset first wireless adaptor (WA1); the second logic unit is a CSN.

7. The method of claim 1, wherein
the radio communication network is a WiMAX radio communication network; the first logic unit is a base station and a preset first wireless adaptor (WA1); the second logic unit is a CSN and a preset second wireless adaptor (WA2).

8. The method of claim 1, wherein the data of radio communication network is transmitted on the layer-2 or layer-3 of the access point DSL Access Multiplexer (DSLAM) in the DSL network and the edge node in the DSL network.

9. A method for interconnecting a Digital Subscriber Line (DSL) network and a radio communication network, comprising:

setting a first logic unit in the radio communication network to interconnect with an Ethernet convergence reference point V in the DSL network;

setting a second logic unit in the radio communication network to interconnect with an edge node in the DSL network at a reference point A10, wherein the second logic unit and the edge node in the DSL network constitute a second processing unit; and carrying data of the radio communication network between the first logic unit and the second processing unit over a convergence network of the DSL network;

wherein carrying the data of the radio communication network between the first logic unit and the second processing unit over the convergence network of the DSL network comprises:

converting, by the first logic unit, data from a user station into data suitable for transmission over the convergence network of the DSL network, sending the data to the second processing unit, and sending, by the second processing unit, the data to an external network;

sending, by the second processing unit, data from an external network to the first logic unit over the convergence network of the DSL network, converting, by the first logic unit, the data of the convergence network of the DSL network into data of radio network and sending the data of radio network to the user station.

10. The method of claim 9, wherein the edge node in the DSL network is one of a Broadband Remote Access Server (BRAS), a Broad Network Gateway (BNG) and an Edge Router (ER).

11. The method of claim 9, wherein
the radio communication network is a 2G or 3G radio communication network; the first logic unit is a base station and a preset first wireless adaptor (WA1); the second logic unit is an edge node in the DSL network and a preset second wireless adaptor (WA2).

12. The method of claim 9, wherein
the radio communication network is a Worldwide Interoperability for Microwave Access (WiMAX) radio communication network; the first logic unit is a base station and a preset first wireless adaptor (WA1); the second logic unit is a Connectivity Service Network (CSN).

13. The method of claim 9, wherein
the radio communication network is a WiMAX radio communication network; the first logic unit is a base station and a preset first wireless adaptor (WA1); the second logic unit is a CSN and a preset second wireless adaptor (WA2).

14. A system for interconnecting a DSL network and a radio communication network, wherein the DSL network is interconnected with a base station in the radio communication network; the system comprises the base station and a DSL network with a DSL Modem and a DSL Access Multiplexer(DSLAM) wherein the base station is configured to interconnect with the DSL Modem via a wire line for processing access of a user station, and is further configured to transmit the data from the user station to the DSL Modem or transmitting the data from the DSL Modem to the user station; and the DSL Modem is configured to interconnect with the DSLAM via twisted pair lines, and is further configured to transmit the data from the base station to the DSLAM after modulation or transmit the data from the DSLAM to the base station after demodulation;

wherein the base station includes at least one wire interface unit and at least one base station radio processing unit;

the base station radio processing unit in the base station is configured to process access of the user station and is further configured to send data from the user station to the wire interface unit in the base station or send data from the wire interface unit in the base station to the user station; and the wire interface unit in the base station is configured to interconnect with the DSL Modem via a wire line, and is further configured to send data from the base station radio processing unit in the base station to the DSL Modem after processing the data for wire interface transmission, or send data from the DSL Modem to the base station radio processing unit after processing the data for wire interface receiving.

15. The system of claim 14, wherein the data includes user data or control signaling, and the data is included in data packets or frames.

16. The system of claim 14, wherein the wire line is Ethernet wire line.

17. A system for interconnecting a DSL network and a radio communication network, wherein the DSL network is interconnected with a base station in the radio communication network; the system comprising the base station, a DSL network with a DSL Access Multiplexer (DSLAM) and an edge node, wherein the base station is configured to interconnect with the DSLAM via twisted pair lines for processing access of a user station and is further configured to transmit data from the user station to the DSLAM or transmit data from the DSLAM to the user station; and the DSLAM is configured to interconnect with the edge node in the DSL network via a wire line and is further configured to transmit data from the base station to the edge node in the DSL network after demodulation or transmit data from the edge node in the DSL network to the base station after modulation;

wherein the base station includes at least one base station radio processing unit, at least one base station DSL Modem unit and a base station controller processing unit; and the base station radio processing unit in the base station is configured to process access of a user station, and is further configured to send data from the user station to the base station controller processing unit in the base station or send data from the base station controller processing unit to the user station;

the base station controller unit in the base station is configured to send the data from the base station radio processing unit to the base station DSL Modem unit after processing the data for uplink base station control, or send the data from the base station DSL Modem unit to the base station radio processing unit after processing the data for downlink base station control;

the base station DSL Modem unit in the base station is configured to interconnect with the DSLAM via twisted pair lines, and is further configured to send data from the base station controller processing unit in the base station to the DSLAM after modulation, or from the DSLAM to the base station controller processing unit after demodulation.

18. The system of claim 17, wherein the edge node in the DSL network is a Broadband Remote Access Server (BRAS), or a Broad Network Gateway (BNG), or an Edge Router (ER).

19. The system of claim 17, wherein the data includes user data or control signaling, and the data is included in data packets or frames.

* * * * *